(12) United States Patent
Maim

(10) Patent No.: US 8,495,099 B2
(45) Date of Patent: Jul. 23, 2013

(54) METHOD OF MANIPULATING INFORMATION OBJECTS AND OF ACCESSING SUCH OBJECTS IN A COMPUTER ENVIRONMENT

(76) Inventor: Enrico Maim, Paris (FR)

( * ) Notice: Subject to any disclaimer, the term of this patent is extended or adjusted under 35 U.S.C. 154(b) by 539 days.

(21) Appl. No.: 11/667,936

(22) PCT Filed: Oct. 25, 2004

(86) PCT No.: PCT/FR2004/002745
§ 371 (c)(1),
(2), (4) Date: Sep. 30, 2008

(87) PCT Pub. No.: WO2005/045698
PCT Pub. Date: May 19, 2005

(65) Prior Publication Data
US 2009/0083314 A1    Mar. 26, 2009

(30) Foreign Application Priority Data

Oct. 24, 2003 (FR) ...................................... 03 12457
May 7, 2004 (FR) ...................................... 04 04936

(51) Int. Cl.
*G06F 17/30* (2006.01)
(52) U.S. Cl.
USPC .......................................... 707/794; 707/695

(58) Field of Classification Search
USPC .................................. 707/794, 695, 999.203
See application file for complete search history.

(56) References Cited

U.S. PATENT DOCUMENTS

| | | | |
|---|---|---|---|
| 5,875,446 A * | 2/1999 | Brown et al. ........... | 707/999.003 |
| 5,946,699 A * | 8/1999 | Sawashima et al. ... | 707/999.203 |
| 6,425,016 B1 * | 7/2002 | Banavar et al. ................ | 719/310 |
| 7,210,096 B2 * | 4/2007 | Kearney ......................... | 715/234 |
| 2002/0065848 A1 * | 5/2002 | Walker et al. .................. | 707/511 |
| 2003/0145020 A1 * | 7/2003 | Ngo et al. ...................... | 707/201 |
| 2004/0039848 A1 * | 2/2004 | Estrada et al. ................. | 709/315 |

* cited by examiner

*Primary Examiner* — Yuk Ting Choi
(74) *Attorney, Agent, or Firm* — Blakely Sokoloff Taylor & Zafman

(57) ABSTRACT

A method is described which is used in a computer environment in order to produce a current view from at least one source information object that can vary. The method is characterized in that it includes the following steps: a reference of the view in relation to the source information object is established and stored; a user implements at least one information object modification tool in order to produce a transformed information object from the source information object; a difference information set that is representative of the modification actions performed by the user with the tool(s) is recorded in a memory element; and a current view is produced from the current version of each source information object and said difference information set.

36 Claims, 26 Drawing Sheets

Legend:
(the "states" of elements are described later)
R means state = rejected;
C means state = created;
I means state = imported;
MF means "ModifiedFrom" reference (which is also described later);
A means state = accepted (note that an element must be explicitly accepted, modified or rejected of it is to be used as a reference to locate another element).

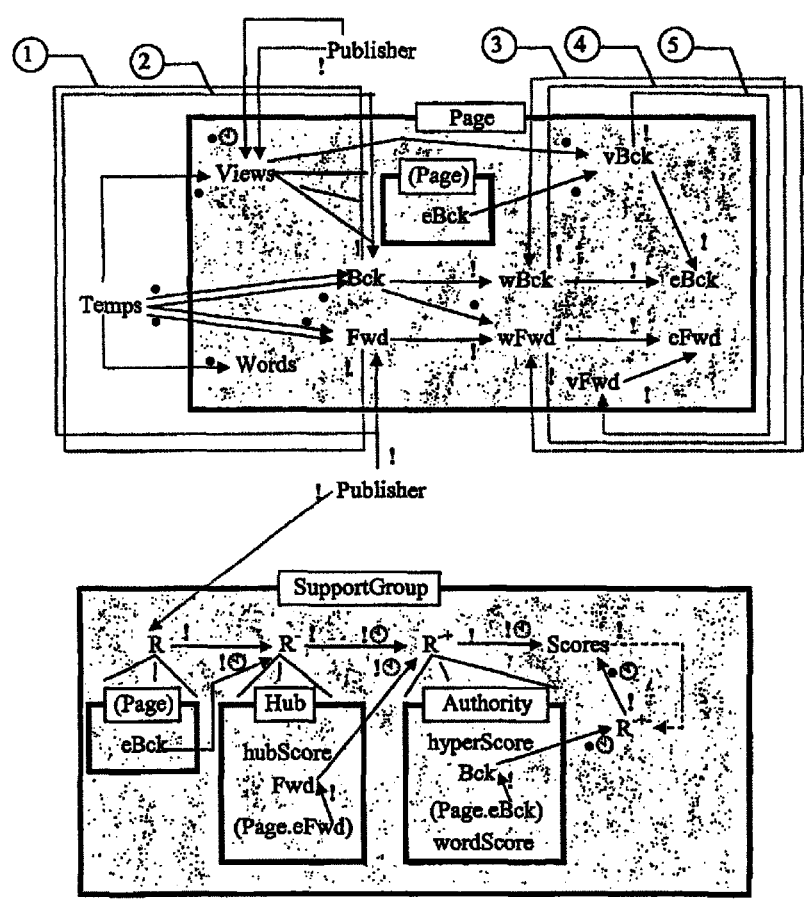

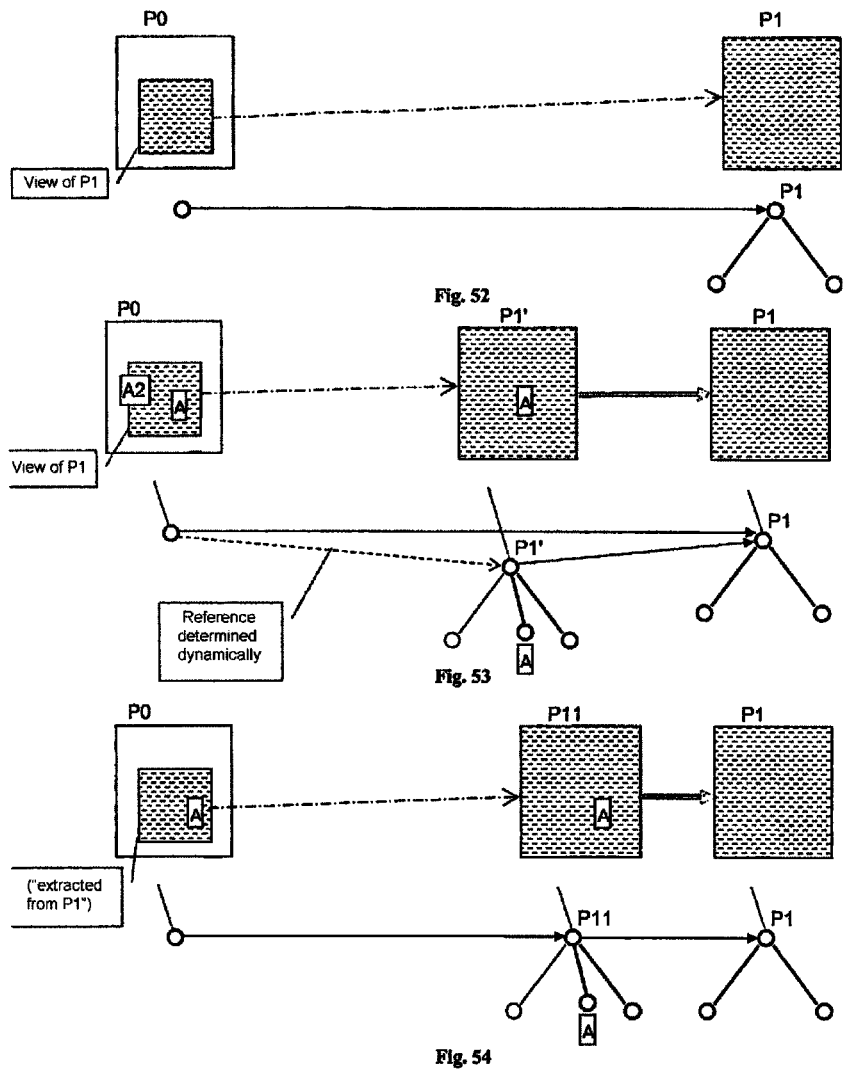

METHOD OF MANIPULATING INFORMATION OBJECTS AND OF ACCESSING SUCH OBJECTS IN A COMPUTER ENVIRONMENT

This is a non-provisional application claiming the benefit of International application number PCT/FR2004/002745 filed Oct. 25, 2004.

BACKGROUND OF THE INVENTION

1. Field of the Invention

The invention relates in general to techniques for manipulating data objects (Web pages, files, parts of files, etc.) and browsing among these data objects.

2. Description of Related Art

In particular, it is aimed at divulging methods in which a user can customise "source" data objects and in which changes that occur in the source data object(s) and also in the customisation that he made, can appear in a current view every time that said user access such an object.

This invention also relates in general to methods used in a data processing environment or data processing system to allocate relevance scores to data objects or resources, and methods to access resources in a data processing environment or data processing system based on such relevance scores.

Conventional file filing and organisation methods can quickly reach their limits in modern data processing environments that a user can use to be able to quickly access an enormous quantity of resources, and particularly remote resources such as Web pages, and also to access very large quantities of personal resources. Similarly, methods of searching for information of interest (search engines, etc.) are usually limited to text type resources and suffer from the limits and ambiguities of the language.

It is found that the only way to overcome these limitations is to have an environment for creating and maintaining relevance relationships between local or remote resources that are created, viewed and modified, etc, so that a user can either find a resource in which he is interested by accessing resources that are relevant to it, or find new resources in the same manner.

BRIEF SUMMARY OF THE INVENTION

Therefore, the main purpose of the invention is to enable a user to create "relevance relationships" between a primary resource[1] and other resources, so as to be able to find the primary resource simply by accessing at least one resource that is relevant to the primary resource.

[1]Resource means information resource. A relevance relationship between two resources means a relationship indicating their relative relevance (with respect to each other).

It will be noted here that one (or more) resource(s) relevant to the primary resource may be not only one (or more) of said other resources that the user has related to the primary resource, but also one (or more) resource(s) with a relevance relationship with the primary resource created by another user in a network of relevance relationships shared between these two users, one (or more) resource(s) for which the primary resource is automatically considered to be relevant using inference rules[2] that are applicable to the relevance relationships thus created,

[2](that are configured by default and/or for which parameters are set by the user)

one (or more) resources for which the primary resource has a high relevance score that was determined automatically by the method, by using relevance relationships with relevance score propagation capacities (pipes)[3] from one resource to the other.

[3]In the remainder of this description, a pipe between two resources refers to an aptitude to propagate a score representing the relevance of one resource to the other. The propagation capacity is called the pipe width.

One purpose of the invention is for the method to use, in addition to relevance relationships created by users themselves, relevance score propagation pipes created automatically from interrelations and resource contents. Thus, one method according to the invention is designed to automatically create the following pipes:

between co-cited resources[4], between resources related by hypertext links, between resources with similar word distributions,

[4](co-cited, for example by hypertext links directed towards them and placed in the same Web page)

and possibly also by combining with pipes determined using other methods of calculating relevance between resources.

In particular, these pipes are created between Web resources in which users may be interested.

Another aim is to divulge mechanisms in which users can create relevance score propagation pipes (or relevance relationships) between Web resources and private resources (for example company documents) and thus to propagate relevance scores (calculated by analysing the structure of links and content) of Web resources to these private resources.

Thus, by using all these relevance score propagation pipes, the invention is intended to enable the user to:

find primary resources;

since the user wants to share a network (relevance relationships and relevance score propagation pipes) with other users, the method is intended to provide the user with means of discovering primary resources expressly linked by other users within the shared network;

finally, the method also allows the user to discover other relevant resources among the private or public resources (e.g. on the Web) to which good scores are propagated through automatically placed pipes.

In particular, this invention also aims to propose techniques in which a user can modify a source data object (for example he can associate annotations with it or he can customise part of it) and record the modifications as a page derived from the original page.

The invention also aims to assure that the page derived from the original page is spontaneously displayed by the system when the user revisits the original page.

In another aspect, the invention aims to make use of links located in Web pages to determine the degree of relevance of pages with respect to each other and with respect to the user's browsing context.

Thus, for each visited page, the invention aims to present the most relevant derived page to the user with annotations associated with other relevant pages and links to other relevant pages.

Another purpose of the invention is that an annotation can for example be a link to a data resource such as a file, and the user can find data resources easily by putting himself in their relevance context: when the user is browsing and approaches the context of the resource that he is looking for, the system spontaneously proposes it to him.

Thus more globally, the invention aims at using the system forming an "associative memory" for the user.

Finally, the invention is intended to facilitate manipulation of data objects by allowing selections of parts of data objects made in a user graphic interface and that can subsequently be manipulated themselves, for example to perform some of the other objectives mentioned above.

According to a first aspect, the invention describes a method implemented in a data processing environment to produce a current view from at least one source data object that can vary, characterised in that it comprises the following steps:

- determining and memorizing a reference of the view to the source data object,
- application by the user of at least one tool for modifying data objects, to produce a transformed data object from the source data object,
- saving a set of difference data in a memory, representing the effect of the modification actions made by the user using one or more tools, and
- generating a current view from the current version of the source data object and said set of difference data.

Some preferred but non-limitative aspects of this method are:

- the tool to modify a data object comprises a document editing program.
- the editing program is able to generate a log of the modifications made to each document, and the saving step is implemented using the log data.
- the data object modification tool comprises a plurality of modification operators which can be individually selected by the user.
- the method is used on a source data object itself consisting of a current view generated by a prior use of the same method.
- the current view is generated within a larger data object containing said view.
- the object includes several views and the method is repeated for each of the current views to be generated.
- the current view has a reference to the source data object, said reference being associated with a container.
- the reference consists of a hypertext link.
- the method also includes a step to determine and memorise a relationship between a data object containing said view directly or indirectly, and the source data object.
- said relationship is a semantic equivalence relationship.
- the method also includes a step to set up and memorise a relationship between the view and the source data object.
- the relationship is a semantic relationship.
- the method also includes implementation of an inference method based on a plurality of semantic relationships between views and source data objects.
- the source data object is derived from another data object.
- the reference of the view to the source data object is composed of a query (request) in response to which one or several source data objects are delivered.
- the query is a request applied to a search engine, the search engine delivering the source data object(s).
- the query is composed of a group of data objects, and the method comprises a step to search at least one other data object with the best relevance score with respect to said group.
- the method includes a step to memorise the generated current view and said set of difference data contains one or more pointers towards one or several data objects, for which the content and position are contained in the current view.
- said data objects are structured in hierarchical sub-objects, and if said set of difference data contains a difference data concerning part of an object, then the step to generate the current view maintains the most recent version of the smallest sub-object containing such part of an object.
- said difference data concerning part of an object includes an object attribute change data.
- said attribute is an object name.
- said difference data concerning part of an object comprises data about an object position.
- if the source data object comprises several sub-objects, the method is implemented once for each sub-object.
- the set of difference data for an object comprising a plurality of sub-objects contains modified/non modified attributes for each of these objects.
- each data object has an object identifier.
- each object identifier is unique in the data processing environment.
- the step to produce a current view refers to a modification identifier.
- each modification identifier is unique in the data processing environment.
- each current view has at least one composite identifier comprising a modification identifier and an object identification, to which the modification by the corresponding set of difference data applies.
- a current view has an identifier referring to a plurality of modification identifiers and a plurality of object identifiers to which the modifications by the corresponding difference data sets apply.
- if a source data object is itself derived from application of a set of difference data to an other source data object, then a corresponding composite identifier comprises an object identifier held by said other source data object and a double identifier of sets of difference data.

A second aspect of the invention divulges a method implemented in a data processing environment to allocate relevance scores to data objects, characterised in that it includes the following steps:

- allocating a capacity (pipe) to propagate a relevance score from one data object to the other, to at least some pairs of data objects,
- allocating a relevance score to at least one data object, and
- for at least one other data object, calculating a relevance score from the relevance scores of data objects having a propagation capacity with said other data object, and values (pipe widths) of said propagation capacities.

Some preferred but non-limitative aspects of this method are:

- a propagation capacity, possibly equal to zero, is allocated to each pair of data objects.
- at least some data objects are connected to each other by links from citing data object to cited data object, and the propagation capacity between two data objects is calculated using as criterion the number of citing data objects (citing them) common to these two data objects.
- at least some data objects are connected to each other by links from citing data object to cited data object, and the propagation capacity between two data objects is calculated using as criterion the existence of a link between these two data objects.

at least some data objects have a text content, and the propagation capacity between two such data objects is calculated using as criterion the word distribution in these two data objects.

the propagation capacity between two data objects is calculated using as criterion the relationship between data objects determined by the user.

the relationship between data objects set up by the user is derived from sorting or grouping data objects made by the user.

the propagation capacity between two data objects is calculated from a combination of at least two criteria.

the calculation step comprises a sum of relevance scores weighted with propagation capacities.

propagation capacities are normalised.

the method includes a step in which the user determines a propagation capacity between two data objects in a pair.

two propagation capacities are allocated to each pair of data objects, one in a first direction and the other in the opposite direction.

the method is used a priori on a sub-set of data objects representative of a larger set of data objects to predetermine intermediate values subsequently used to calculate relevance scores.

The invention also proposes a method of accessing data objects in a data processing environment, characterised in that it comprises:

determining a group of initial data objects, implementing the method as defined above to identify other data objects having the highest relevance scores for the group of initial data objects, and displaying elements representing said identified data objects for user access thereto.

Some preferred but non-limitative aspects of this method are:

the method comprises the prior step consisting of implementing a search method to produce the group of initial data objects.

the group of initial data objects is produced from a manual and/or automated classification of data objects in an operating system of the data processing environment or in a data processing application.

the method also comprises:

determining a fine-tuned relevance relationship between at least one of the identified data objects and at least one of the initial data objects, and graphically representing said fine-tuned relevance relationships.

the display step comprises:

determining the existence of non zero propagation capacities between the initial data objects and said identified data objects, and graphically representing links between said identified data objects and initial data objects as a function of propagation capacities.

the method also comprises:

determining the existence of a zero propagation capacity between at least one initial data object and an identified data object, and modifying this zero propagation capacity into a non-zero propagation capacity.

said modification step is made as a function of the relevance score of the identified data object with respect to the initial data object.

the set of data objects is formed by a basic network comprising data objects and corresponding propagation capacities, and by modifications/additions/deletions made to this basic network to form a modified network, and the method defined above is implemented from the group of initial data objects and said modification/addition/deletion data.

The invention also divulges a method of accessing data objects in a data processing environment, characterised in that it comprises:

implementing the method as defined above to determine absolute relevance scores for the set of data objects, implementing a search method using a request, sorting data objects which satisfy said request as a function of their absolute relevance score, and displaying elements representing sorted data objects for user access thereto.

The invention also divulges a method of accessing data objects in a data processing environment, characterised in that it comprises:

determining a group of initial data objects, implementing a method of calculating relevance scores to identify other data objects with the highest relevance scores for the group of initial data objects, creating an additional data object representing the group of initial data objects, and creating propagation capacities determined as a function of said relevance scores between identified data objects and the additional data object.

Some preferred but non limitative aspects of this method are:

the method of calculating relevance scores is conforming with the second aspect of the invention mentioned above.

the method is applied to a set of data objects comprising additional data objects determined by the method as defined above, and the relevance score for a data object belonging to a group of initial data objects for which an additional data object was created, is calculated taking account of the relevance score calculated for this additional data object.

said calculation of a relevance score for a data object belonging to a group of initial data objects for which an additional data object was created, is made taking account only of the relevance score calculated for this additional data object.

the group of initial data objects is produced from a request applied to a database, and the additional data object represents and contains said request.

The invention also proposes a method used in a data processing environment comprising data objects with references to other data objects, and in particular having first contents with at least one reference to a second content such as a link to the second content or such as a transclusion of the second content, for management of such references as a function of the existence of modifications made to the data objects by the user, characterised in that it comprises the following steps:

the user views a second current content through a reference held by a first content, in a mode enabling modification of said second content, when said second content is modified in said mode, a new version of the second content is created and said reference is replaced by a reference to this new version.

Some preferred but non limitative aspects of this method are as follows:

said reference is a request such as a request in a standard language, to a database.

said new version of the second content is represented by a structure of markers containing the differences between said new version of the second content and said current second content, to thus present a second content to the user in which said differences have been applied to the current version of the second content.

The invention also proposes a method implemented in a data processing environment to selectively access a derived data object created in the data processing environment starting from an initial data object, characterised in that it comprises the following steps:

(a) determining relevance scores of the initial data object and the derived data object using a given mechanism for determining relevance;

(b) in relation to access by a user to the initial data object, provide or do not provide the user with information about the existence of the derived data object or with access to said derived data object, as a function of said relevance scores.

Some preferred but non limitative aspects of this method are as follows:

- step (a) also determines a relevance score for at least one other data object, and step (b) also comprises supplying or not supplying the user with information about the existence of said other data object, or with access to said other data object, as a function of said relevance scores.
- step (a) also produces a relevance score for at least one other data object, and the method also comprises a step (c) related to access to the initial data object or the derived data object, to supply or not supply the user with information about the existence of said other data object, as a function of said relevance scores.
- step (a) also produces a relevance score of at least one other data object, and the method also comprises a step (c) related to access to the initial data object or the derived data object, to display or not display at least a part (annotation) of the content of said other data object, as a function of said relevance scores.
- step (b) is applied as a function of whether or not a modification has been made to said derived data object or initial data object since it was previously supplied to the user.
- step (c) is applied as a function of whether or not a modification has been made to said other data object since it was previously supplied to the user.
- the initial data objects being connected by directional links and together form an initial oriented graph, the method also comprises a step consisting of constructing a virtual derived graph formed from the initial oriented graph and virtual links starting from data objects citing the initial data object and directed towards the derived data object, and the relevance scores are produced based on said virtual derived graph.
- the derived data object is obtained by modifying the initial data object.
- the derived data object is a data object with at least one view to at least one part of the initial data object.
- the derived data object is a data object with at least one copy of at least one part of the initial data object.
- if the derived data object is obtained from an initial data object that is itself another data object derived from another initial data object, the step to construct the virtual derived graph also takes account of virtual links starting from data objects citing said other initial data object and directed towards said other derived data object.
- if the derived data object has several views to several initial data objects, the step to construct the virtual derived graph takes account of virtual links starting from data objects citing the corresponding initial data objects and directed towards the derived data object.

This invention also divulges a method used in a data processing environment to obtain customised access to data objects, said data objects comprising initial data objects connected together by oriented links to form an initial structure, characterised in that it comprises steps consisting of:

(a) creating data objects added to the initial data objects, to form a derived structure, (b) memorising the derived structure in the form of a reference to the initial structure, added data objects and links between the initial structure and the added data objects, (c) memorising specific search data for relevant data objects, in association with the derived structure, (d) searching for relevant data objects in the derived structure, using specific search data.

Some preferred but non limitative aspects of this method are as follows:

- specific search data comprise centre of interest data.
- steps (a) to (c) are used repeatedly to form a plurality of derived structures by adding data objects to the initial structure or to previously existing derived structures.
- step (c) to memorise specific search data is done in the form of a reference to specific search data already associated with the structure or a previously existing derived structure, and added specific search data
- the derived structures themselves are organised as a graph.
- the derived structures graph is a tree.

The invention also divulges a method used in a data processing environment to selectively access one among a plurality of data objects starting from an initial data object, characterised in that it comprises the following steps:

(a) produce relevance scores for the initial data object and other data objects using a given mechanism to determine the relevance, said other data objects comprising independent data objects and data objects derived from the initial data object and/or these independent data objects, (b) when a user accesses the initial data object, supply or do not supply the user with information about the existence of another data object or with an access to said other data object, as a function of said relevance scores.

Some preferred but non-limitative aspects of this method are as follows:

- step (b) is or is not applied as a function of whether or not a modification has been made to said other data object since the last time that it was supplied to the user.
- the mechanism to determine relevance is based on analyses of links between data objects, at least one of the derived data objects is obtained by reproduction of an initial data object or by insertion of a view or a copy of the said complete initial data object, into an arbitrary data object, and the method includes a step to create virtual links directed towards said derived data object starting from each data object with a link directed towards the initial data object considered.
- the mechanism to determine relevance is based on analyses of links between data objects, at least one of the derived data objects is obtained by insertion of a view or a copy of only part of an initial data object, into an arbitrary data object, this part being or itself containing a view or a copy of the complete indirect initial data object, and the method includes a step to create a virtual link directed towards said derived data object starting from each data object with a link directed towards the indirect initial data object considered.
- the method also comprises a step to display or not display at least part (annotation) of the content of a third data object, in relation to the access to the initial data object or to another data object, as a function of said relevance scores.

the display step is also applied if a modification was made to the third data object since the last time it was displayed.

This invention also includes a method applied in a networked data processing environment to display a customised data object obtained starting from an initial data object, characterised in that it includes the following steps:

load the original data object from a site that supplies said original data object to the user, save a working data object obtained from a copy of the original data object, in a memory, use tools for modifying the data object, to produce a modified data object from said working data object, save a set of data representative of differences between the original data object or the working data object, and the modified data object, in a memory and during a subsequent access to the original data object, generate a new modified data object starting from the current version of the original data object and said set of data representative of said differences.

The following is a preferred but non-limitative aspect of this method:

the working data object comprises a plurality of contents belonging to the original data object and identifiers allocated to the corresponding contents, and the differences represented by said set of data are differences given identifier by identifier.

Finally, the invention describes a method for handling data using a graphical user interface, said interface comprising means for selecting a part of given data, characterised in that it comprises a step to convert a selection made using said interface into an object that can be subsequently handled.

Some preferred but non-limitative aspects of this method are:

the conversion step is implemented solely in response to a user instruction triggered by means of a pointing tool used to make the selection.

the method also includes a step to selectively display a visual indicator showing the existence, among the displayed data, of a data object that resulted from a previous conversion made from a selection.

Other preferred characteristics, purposes and advantages of this invention will become clearer after reading the following detailed description of preferred embodiments of the invention given as non-limitative examples and with reference to the appended drawings containing figures including schemes, diagrams, etc., illustrating the invention.

Note that throughout the following description, the terms "method" and "system" will be used essentially indistinguishably, depending particularly on whether reference is being made to actions implemented by the method according to the invention or to the data processing system that supports these actions.

Introduction

We will describe a unified framework and new methods of managing data. These methods are based on concepts of objects and relationships.

The term "object" (or data object[5]) denotes any data resource with an identity. For example:

a computer file an element in a document in XML format a directory a paragraph in a Word document a selection of part of a Word document a Web page an entry in a directory (this entry representing a particular person).

[5]The terms "resource" and "data resource" are also synonymous—for example in URI (Uniform Resource Identifier).

One object can contain other objects thus forming a hierarchy[6].

[6]We will refer to child objects (or sub-objects), descendant objects, parent objects, etc.

The concept of a "relationship" covers all forms of references to one (or a set of) "source object(s)", said reference being associated with a "related object". For example, a relationship may thus be:

a semantic relationship between one object and another. For example:

an "author" relationship of a document (the related object) written by a specific person, towards the object (source object) representing this person;

a semantic relationship from a representation of a legal clause (the related object) to a legal comment on this legal clause (the source object)

a hypertext link in a page (related object) to another page (source object)

an html element <iframe> is a relationship from the object (related object) containing this element to the pointed object (source object)

a shortcut to a directory (source object), placed in another directory (related object)

a hierarchical relationship from a contents object (related object) to its container object (source object), for example in a directories structure.

All data can thus be seen either in the form of an object or in the form of a relationship. The framework is unified in that all objects are treated equally regardless of their nature, and similarly a unified representation of the relationship concept is used.

Thus, we can make a search in response to a user request, and give relevance scores to the returned objects. These results are obtained particularly by propagating scores along relationships (which is why it is advantageous in this description to unify the representation of relationships).

Transclusion

State of the Art

One special case of the relationship is the transclusion (or inclusion by reference[7]. For example, the "img" mark in the HTML language is used to include an image by reference.

[7](in opposition to inclusion by copy)

Another example transclusion is represented by the "Create a link" option in the menu that appears when a drag-drop operation is made on a selection of a part of a Word document, keeping the mouse right button pressed.

A third transclusion example could have been what is possible using the "Create shortcut" function available in Windows operating systems if the shortcut from a directory were a direct view of its contents, in other words if this function could include a view in one directory (R1) of another directory (R2) for which the content can be seen directly (under R1)[8].

[8]In other words, this would have been a transclusion in the current sense of the term, if the contents of directory R2 were presented in a tree structure representation as descendants of directory R1, which is not the case at the moment.

Transclusion consists of creating a view ("the result") of at least one object ("source") placed in an object ("the container")[9]. Source objects may be at a distance from each other. They are identified either directly or implicitly, as a result of a search request[10]. For example, the result of a request to a database can be included in a Word document. In the remaining description, the "source (of a transclusion)" means the "source object or the set of source objects (of said transclusion")".

[9] The term "transclusion" will be written instead of "transclusion result" in the remaining of the description, although this is not strictly correct.
[10] Possibilities of requests will be described later, in the "Information search" section.

When the container is subsequently displayed, a presentation of the source will be visible at the location of the transclusion. In other words, every time that the container object is opened or refreshed[11] manually or automatically, the current version (in other words the most recent version) of the source will be presented at this location. In a more complete implementation, the source object notifies the result object at the time of each modification, so that the result object can synchronise itself.

[11] In other words "updated"

SUMMARY OF THE INVENTION

Existing transclusion offers are limited, particularly because they do not enable a user to modify the result of the transclusion (obviously without altering the content of the source[12]) as if he were modifying a local copy of the source, this result (or rather non modified parts of it) still being kept up to date with respect to the source.

[12] (except by synchronisation of the source from the result, which could obviously be a possible option)

We will use the term "enriched transclusion" to refer to this transclusion operation including modification of the result without losing the link with the source.

One approach to implementing enriched transclusion could be to replace each composite object transclusion by transclusions on its children. This approach has the merit that it is simple and relatively powerful (one can modify and displace objects in the result, and even insert data between transcluded objects), but it is limitative; if a new child is added to the source later on, it will not be added into the result (of the global transclusion); similarly, if a child is subsequently moved, it will not be moved in the result. The following description presents a method that does not have these limitations.

BRIEF DESCRIPTION OF THE DRAWINGS

FIGS. 38 to 45 diagrammatically illustrate the architecture of a complete system used in the invention.

FIGS. 47 to 55 illustrate various derivation cases.

DETAILED DESCRIPTION OF THE INVENTION

Figure 1:
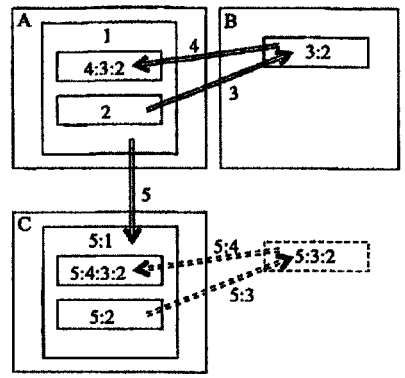
FIG. 1 diagrammatically shows an example of a series of enriched transclusion operations.

FIG. 1 diagrammatically shows an example of a series of enriched transclusion[13] operations. There are three documents, A, B and C respectively. These three documents are initially empty, except for A that contains a section (with identifier equal to 1) in which there is a paragraph (with identifier equal to 2). Firstly, the user transcludes paragraph 2 into document B (transclusion 3). The result of this operation is paragraph 3:2. He then transcludes this paragraph into section 1 in document A, and places it immediately before paragraph 2 (transclusion 4). Finally, he transcludes section 1 (taken in full) into document C (transclusion 5).

Figure 6:
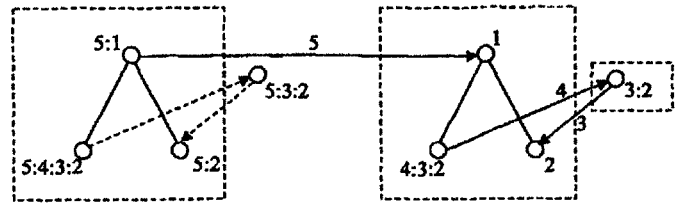
FIG. 6 illustrates an indirect transclusion example.

[13] The same example is presented in FIG. 6 but differently.

As a result, document C contains section 5:1 in which there are paragraphs 5:4:3:2 and 5:2. An additional object 5:3:2 was created but it is invisible for the user. Implicit transclusions 5:3 and 5:4 (to and from this object respectively) were created.

If the user modifies the content of paragraph 2, this modification will be reflected in all other paragraphs. Similarly, if he moves paragraph 2 to put it before paragraph 1, paragraph 5:2 will automatically be placed before paragraph 5:4:3:2.

The user then modifies the content of paragraph 5:2. Due to implicit transclusions 5:3 and 5:4, this modification is reflected in paragraph 5:4:3:2. Since 5:2 is the smallest object encompassing this latter modification, a subsequent modification to paragraph 2 will then no longer be reflected in paragraph 5:2 (through transclusion 5), but only in 4:3:2 (through transclusions 3 and 4). Similarly, a modification of 4:3:2 will no longer be reflected in 5:4:3:2 (through transclusion 5) because transclusions 5:3 and 5:4 (which propagated the result of the modification of 5:2 to 5:4:3:2) take priority (since they are more "local") over transclusion 5.

Let us consider another example. In the directory transclusion example mentioned in the previous section, the enriched transclusion of a view of a directory R2 (for example placed in another directory) would have the advantage that objects (files, sub-directories) can be modified (added, renamed, deleted, etc.) in this view without modifying the content of the source of this view (in other words without modifying the original content of directory R2—see FIG. 2). If a new object is added in R2 later, it will also[14] be added to this view of R2 (as in the simple transclusion). On the other hand (unlike a simple transclusion), if part of the content of an object is modified in this view, the content of the smallest object[15] containing (or equal to) this part will no longer be updated from the source. Thus, when an object (for example a sub-directory of R2) is renamed[16] in this view, if the object corresponding to the source (in other words the corresponding sub-directory in R2) is renamed later on, this renaming will not be reflected in this view, although the actual content of this object will remain up to date in this view. Similarly, objects moved in this view keep their new position, while their corresponding contents are still kept up to date with respect to the source.

[14] (as soon as this view is presented again, updated, or synchronised)
[15] Remember that by definition, an object is a data element that can be identified,
[16] In other words, its child object (or attribute) "name" is modified.

The tools used most frequently at the moment, can be extended to enable functions such as enriched transclusion and addition of relationships.

Figure 2:
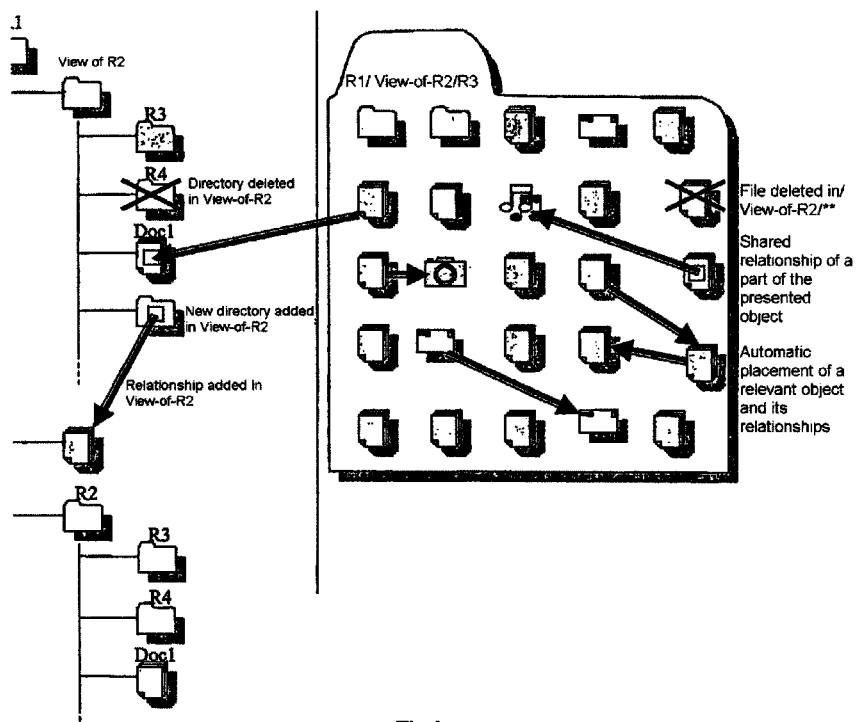
FIG. 2 schematically illustrates a tool enabling transclusion of files and folders.

In particular, the invention includes the implementation of an object editor (or explorer) presenting objects in a tree structure manner (like existing file explorers) that enables firstly enriched transclusions and secondly the creation of relationships between objects (for example to relate a file located in a directory (or a directory view) with another file located in another directory in the same tree structure—see FIG. 2), each relationship optionally producing a relevance score propagation pipe. For example, the type of relationships that the user can create will be "comment" (e.g. such an object is a comment of), "confirm", "contradict", "is against", "is for", "support", "weaken", "cause", "influence", "replace", "recall", "similar", "analogue", "sell" (i.e. a specific object represents data concerning the sale of), "buy", "translate", "explain", "correct", etc. These relationships may for example be presented directly as in FIG. 2, or in the form of clickable links (for example such a clickable annotations) placed on objects.

As also shown in FIG. 2, such an object explorer can present relationships linking an object as a whole with a part of another object. For example, an object not presented explicitly such as a selection of only part of a document (the document itself being represented by an icon[17] in the object editor) may be linked with an object presented explicitly such as another document or a directory. The user will then be able to "zoom" onto the object that is not presented explicitly to refine the presentation granularity.

[17] (with a symbol (a small white square in FIG. 2) indicating that the relationship in question concerns only part of the object).

Furthermore, relevance score propagation pipes are also created (by the user automatically or explicitly as described later in this report) between Web objects (in other words Web pages) in the domain in which the user is interested.

Finally, pipes are placed (automatically, for example by measuring the similarity of the word distribution, or manually by the user) between Web objects and the user's private objects, for example some of which can be transcluded from private objects belonging to other users. Thus, Web object relevance scores propagate on the user's private objects[18]. Private objects and/or Web objects can thus be considered to be relevant and will then be presented to the user as a function of his current browsing context[19] or object exploration context.

[18] (that can include transcluded objects from elsewhere)
[19] Several customisation methods as a function of the browsing context are presented in this report.

Thus, new objects found to be relevant can be automatically presented by an object editor (such as a file explorer described above; for example new documents may be inserted in the view (enriched) of directory R2). Relevance relationships are automatically placed with existing objects in order to indicate how they are relevant (FIG. 2 illustrates automatic placement of a relevant object and its relationships in directory R1/view of-R2/R3).

We will now describe details of these aspects and other associated aspects.

Unless mentioned otherwise, the term "user" is used in this report to refer either to a "user or a computer program". Thus, a "user interface" refers to a "user interface or programming interface".

Enriched Transclusion

The user can choose the manner in which the result of the transclusion must be presented, the trivial case being to insert the entire content. At the other extreme, he may ask to have a single hypertext link (and therefore that the content is only accessible by clicking on the link).

The user can ask that some transformations are made on the content of sources before[20] the content is inserted in the object to the presented. He can choose a transformation in a predetermined list (that he can complete as a function of needs), for example applying a function that selects the first n characters of each source object.

[20] Depending on the case, these transformations can advantageously be done at the source to avoid transferring useless data.

The user can also define transformations to be made by acting directly on the result of the transclusion, using the appropriate content manipulation tool[21] (the tool that he would use if he wished to modify the source). When the user modifies the result of a transclusion directly in this way, the results of the actions that he carries out (one specific element is deleted, the content of another is modified, yet another is moved and modified, etc.) are recorded so that these transformations can be applied automatically the next time that the object is displayed or updated. For example, if the user exchanges two parts of a transcluded object, the two parts will keep their new position when the content of the object is modified at the source, but their content will always correspond to the source content.

[21] (such as Word, see the "Modify the result of a transclusion") section

The current version (or "current view") of a transclusion is the representation of the result of the transclusion as it was presented the last time. This current version is kept and updated by the system each time the user accesses it.

Furthermore, a differences object (or "diff object") is also associated with each transclusion, which indicates the source(s) of this transclusion, and the transformations to be applied to it. The differences object is based on the current version[22] and thus does not need to contain the contents and positions of the objects to be transformed "in extenso".

[22] The differences object refers to objects in the current version (in other words to their corresponding identifiers) to define transformations applied to them.

The following is an example that illustrates how a differences object can be represented:

```
<diff id = "8:1" ref = "document7#7>
    <FirstSentences id = "8:1" count = "3" keepChildren = "true"/>
    <Modify id = "8:2"/>
    <Move id = "8:3"/>
    <Modify id = "8:6:4:3"/>
    <Move id = "8:6:4:3"/>
    <Create id = "9"/>
    <Transclude id = "10:23"/>
</diff>
```

The diff node indicates the source (ref) and the result (id) of the transclusion (or the identifier of the transclusion itself). Note that the source can be identified by a reference or a request.

All children of this diff node then indicate transformations to be applied to the source of the transclusion. The "id" identifiers refer to the current version of the transclusion.

FirstSentences is an operator that selects the first phrases of the content of an object.

Modify indicates that the content of the object must be replaced (the new content being stored in the current version).

Move indicates that the object has been moved (the new position also being stored in the current version).

Create creates a new object (for which the content and any children are located in the current version).

Transclude indicates a new transclusion within the transclusion concerned and therefore refers to another differences object (the id attribute="10:23" being the identifier of the transclusion result (or of the transclusion itself), to which another diff object is associated).

This example shows that a particular object (8:6:4:3) is moved and modified by placing two operators in the differences object. All these operators are implemented in modules and new operator types can be added to the system so as to extend its possibilities. In this example, the user selected FirstSentences in an extendable list of operators at the time of the transclusion or later, associating it with the transclusion. The Move, Modify and Create transformations were created by the user by acting directly on the objects, in the same way as if he had modified a local version (the method used for this being described later in the "Object manipulation" section).

The user can ask that the content of the source of a transclusion should not be included entirely, but that a single hypertext link should be placed as a result pointing to the source(s). In this case, the differences object would resemble the following:

```
<diff id = "18:23" ref = "document 13#19">
    <JustHyperLink text = "click here"/>
</diff>
```

Note that considering that the presentation of the result doesn't depend on the content of the source and doesn't have to be updated, this differences object can generally be omitted. In fact, a hypertext link placed directly is not processed differently than a transclusion presented in the form of a link.

Semantic Relationship Associated with a Transclusion

A semantic relationship may be automatically associated with each transclusion linking the result of the transclusion to its source and expressing the nature of changes made on the content. By default it is an equivalence relationship, in other words the meaning of this content is not affected.

The user can also add another semantic relationship that is applicable from a direct or indirect container of the transclusion result, to its source.

Figure 3:
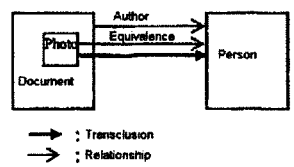
FIG. 3 illustrates a transclusion for which the source is an object obtained in a directory representing the author of a document, the result of which is placed in this document.

FIG. 3 presents a transclusion for which the source is the object obtained in a directory representing the author of a document, and the result of which is placed in this document (and transformed such that only a photo[23] is shown). It may be advantageous for the user (particularly when he is making searches as described later) to place the "author" semantic at this transclusion. In this case, he will ask that the relationship should be applied to the document itself.

[23]FIG. 3 displays an "Equivalence" relation proposed by default at the time of any transclusion, however it may be modified when the semantic of the transclusion result is modified.

Note that from the point of view of the user interface, a transclusion and relationships associated with it can be added or manipulated using a unified (integrated) group of interactive graphic means[24].

[24]Although relationships are presented in the figures (by arrows) as entities separate from transclusions, they are associated with them and moreover may be implemented in the form of attributes of these transclusions. Thus, in the above example, Equivalence and Author would be attributes of the described transclusion. This approach is distinguished by the fact that it consists of using transclusions as a support for relationships. The user interface is used to specify a transclusion and a semantic relationship within the same operation. Nevertheless, the addition of a relationship to a transclusion is optional and therefore a relationship can be defined without associating it with a transclusion (for example when an object is characterised semantically, as described in the next section).

The nature of the relationship will be chosen from a previously existing list of possible semantics (list that can be extended as a function of needs).

Finally, the user may wish to have a semantic relationship only between two objects without correspondingly modifying the appearance of the objects concerned.

Figure 4:
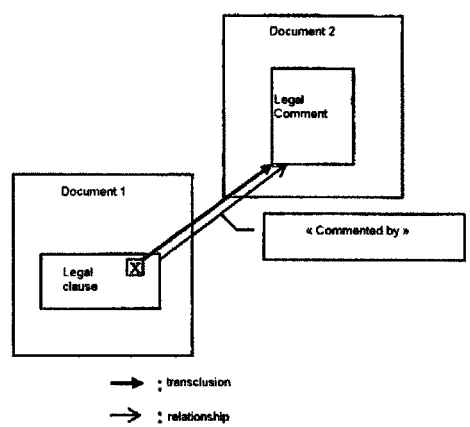
FIG. 4 shows an object representing a legal clause and another object being a comment on this legal clause.

FIG. 4 shows an object representing a legal clause and another object being a legal comment on this legal clause. If the user wishes to inform the system of this relationship without correspondingly modifying the appearance of these objects, he will make a transclusion of the legal comment in the legal clause (at point "X" in FIG. 4), select the required semantic relationship ("commented by") and ask that the result of the transclusion is "not presented" (and therefore naturally eliminate the equivalence relationship from the transclusion result). This is equivalent to applying a transformation that eliminates the entire content of the object.

Alternately, he may ask to have a hypertext link[25] only, as explained above. Note that the hypertext link and the added semantic relationship can thus be specified through the user interface within the framework of a single interaction (consisting of defining a transclusion).

[25]The user object display interface will then present the hypertext link, and for example the title of the semantic relationship in question. The user interface (or programming interface, particularly for a Web service) could also present this semantic relationship in the framework of a resource graph (for example according to the W3C's RDF or OWL recommendations) so that the user (or a program) could browse from resource to resource. Thus, in the example of an author relationship between a document and the resource that represents its author, the interface could be used to browse from the document to its author and then from the author to the address of the author or to other documents by the same author.

Figure 5:
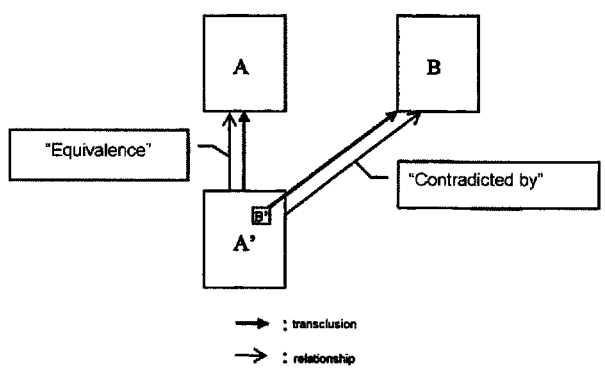
FIG. 5 shows a semantic relationship between two Web pages A and B accessible in read-only mode.

The user might wish to place a semantic relationship between two objects that he cannot access in write (for example two Web pages A and B, A for example[26] being "contradicted by" B (see FIG. 5). Therefore in this case, the system will not allow him to do it directly (because he does not have the right to modify the content of A). However, the user can create[27] a transclusion (A') of the linked object A in the required relationship, and the system will place an equivalence relationship from A' to A, as described above. The user can then make a "not presented" transclusion (B') of source (B) in A'. In this transclusion, he can then add the required semantic relationship of A' (as the container of B') to B. He will have obtained the required result indirectly: based on "A' is equivalent to A" and "A' is contradicted by B", the system can infer that "A is contradicted by B".

[26] In this case the "contradicted by" relationship has been used, but obviously any relationship could have been used to illustrate this example.
[27] Later in this report, it will be said that the user creates a "derived resource" or a "derived page".

The transclusion method, including the possibilities of transformation and addition of semantic, covers all types of relationships given as examples in the introduction. It can be used to model all relationships that occur.

Semantic Characterisation of Objects

Data objects can themselves be characterised semantically. The semantic characterisation of an object consists of notifying the system what information this object presents (in other words "what this object talks about"). This may be done by indicating key words (or a descriptive text), or by creating relationships with objects representing semantic properties. This latter approach is facilitated by instantiating structured concepts[28] that have the advantage of better structuring the added information. The semantic associated with objects and relationships can then be used to reply to object requests with given semantic properties.

[28] The term "concept" or "structured concept" can be seen as a synonym of "class" in the RDF sense, but it is a class associated with keywords or a word distribution range as we will now describe.

We will now describe a method used to help (and encourage) semantic characterisation of an object. It is a method to identify "data entry forms" (or similar) from key words. The advantage of this method is that it encourages the user who associates keywords or a descriptive text with an object (for example an article found during information monitoring), to more finely specify the characterisation of the object in question, by automatically presenting appropriate "forms" to him that he must fill in.

This method includes the following steps:

1. the user gives at least Dne keyword (or a descriptive text) to describe the object in question 2. then a)—direct approach—in the case in which at least one concept is associated[29] with this keyword or these keywords (or with one of these keywords or a sub-set representative of this or these keywords) (or with the distribution of words of this descriptive text),

[29] (directly or through a synonym)

b) or—indirect approach—in the case in which at least one concept is associated with at least:

b1. another object determined as being relevant to said keyword (or said descriptive text), by a method of determining relevant objects starting from words or text, b2. or, in the case in which at least one concept is associated with at least another object, determined as being relevant with respect to one or more objects determined according to step b1, by a method of determining relevant objects from a set of initial objects, the system proposes said associated concept(s) to the user, to semantically characterise the object to be characterised;

3. then for each associated concept selected by the user, the user characterises the object in question by instantiating it and defining its properties[30], for example by simply filling in the fields in a form associated with said selected associated concept.

[30] The term property in the RDF sense is used in this document.

Direct Approach

The following is one example illustrating case a):

The object to be characterised is a document concerning jurisprudence. Therefore the user uses the keyword "jurisprudence" to characterise it. The system then recognises the concept with which the keyword was associated (for example assume that the word "jurisprudence" is the real name of the concept in question) A complementary data collection form[31] is thus associated with this concept. The system then prompts the user to fill in this form to specify the information in more detail and to complete it: what is the type of object in the conflict, who is the petitioner, who is the defendant, what is the jurisdiction, on what date was the decision made, etc.

[31] For example, an RDF properties editor for a given resource

Indirect Approach

We will now describe case b).

Techniques already exist to find data objects on the fly, by providing the system with words or phrases (or simply to find objects from keywords by means of an index). The availability of a system using such a technique is then used.

At least some of these objects (proposed by such a system) having themselves already been characterised, regardless of the means, the system can find the following through these objects, if they are required concepts that characterised them, concepts that characterised nearby objects (for example obtained by propagation of scores along relationships, as described later)

It then proposes them to the user and the user can thus characterise the object in question by defining the properties of these concepts (for example in forms or using an RDF editor).

The user thus creates relationships between the object to be characterised and objects corresponding to the defined properties (in the "form" in question). Like all relationships, they can propagate relevance scores as described later in this report.

Manipulation of Objects

Objects may be created, modified and deleted, using the user's normal tools. The user can thus create, modify and delete the transclusion results and semantic relationships between different objects as described in the previous section.

Finally, he can act on the content of the result of a transclusion directly, in the same way as for the local content.

At the user interface, the transclusion operation can be used in a drag-drop operation. For example, after selection of part of a resource (displayed in the framework of a resource manipulation tool such as Word, Excel or FrontPage, or in the framework of a directory and file explorer), a drag-drop operation keeping the mouse right button pressed will bring up a menu (context sensitive menu) in which the user can choose the "Transclude here" option. Before presenting the result of the transclusion (at the drag-drop target location), the system will prompt the user to choose a transformation (for example in XSLT, particularly when a tool such as FrontPage is being used) among a set of transformations available if required to immediately modify the presentation (adapt it) to this location. Finally, the user can also modify the result of the transclusion interactively as described above.

Reify a Selection

A selection can be "reified". Reifying a selection means defining it as being an object (in the sense of an identified object, as defined in the introduction). The essential advantage of reified selections is that they can be distinguished from other selections and that this facilitates reusing them. An option can advantageously be used according to which the system automatically reifies any selection that is used as a transclusion source or that is linked (by a relationship among a set of relationship types specified in advance) or according to other criteria (particularly avoiding overlaps). The user can thus avoid recreating a selection that has already been created or almost created on the same part of the resource (this is particularly important to take advantage of score propagation pipes linking this resource to others).

Presentation of Reified Selections to the User

A handle entitled "reified selection" (or any other distinctive means that will be considered as a handle for this purpose of this document) can be displayed at the selection so that it can be identified.

A button or a menu option is available in the toolbar to display (or hide) all "reified selection" handles for a displayed resource, the purpose obviously being to be able to select an existing reified selection (if there is at least one).

We will now present a method that consists of the user reifying a selection and another method that consists of using it as a transclusion source.

Reification Method

The selection is made conventionally by sliding the mouse so as to cover the selected part, the left button being pressed (conventionally this has the effect of highlighting the selected part); reification itself is then done by clicking on a menu option presented in the toolbar, or by pressing the mouse right button after placing the mouse on the selection in question.

As a variant, reification can be done directly in the framework of the selection operation itself; by sliding the mouse so as to cover the selected part keeping the right button pressed (which will have the effect of highlighting the selected part) and selecting the "Reify" option in the "context sensitive menu" (conventionally displayed when the mouse right button is pressed), A "reified selection" handle is then displayed at the selection for use as a mark.

It is useful to distinguish reified selections that are actually used (particularly those used as source for a transclusion or that are linked by relationships as being of a certain type among previously specified types) from other selections, and particularly those that are not used at all.

This makes it easier for the user to give preference to the reuse of selections that have already been used and thus prevent overloading the resource concerned. These can be distinguished by graphic means, and the system can automatically delete reified selections that were not used at the end of a session, or for example after a given time period, under the user's control to simplify the presentation.

Transclusion by "Click & Drag"

"Click" Step

Clicking is done on a "reified selection" handle and its effect is to select the object to which it points (and to make the system highlight the corresponding selection, in other words typically to put the displayed resource in question in "inverse video").

In one particular embodiment, if the user clicks close to a "reified" selection handle rather than on it directly, the system identifies the geographically closest reified selection in the displayed resource and presents it to him (however, a special mode has to be chosen for this). In one particular embodiment, at the request of the user, the system could automatically identify the most relevant reified selection(s), in other words the selection(s) that most closely correspond(s) to his "user profile" (as described in the "Customisation Method" section).

"Drag" Step

This is followed by a simple drag-drop (or equivalent operation) of this selection to transclude it to another location[32].

[32] For example, the user can thus transclude part of an article displayed in Word using a drag-drop operation to a Web page displayed in Frontpage. Before presenting the result of the transclusion, the system will prompt the user to choose a transformation (in XSLT) in Frontpage, among a set of available transformations for the presentation at this location. The user can then once again modify the result of the transclusion interactively as described above.

Modify the Result of a Transclusion

We will now describe methods of modifying the result of a transclusion using a usual document manipulation tool. Consider the case of Word. This tool provides a programming interface (AP1) for "tracking changes" that shows all modifications made on a document in an orderly manner; what has been inserted, deleted, modifications to style properties, etc. The diff object associated with an object contained in the result of a transclusion is updated each time that it is modified. An insert type modification is inserted directly into the diff object, except for the insertion of a new transclusion result, in which case the diff object is updated by the transclusion means itself without using track changes (which would then be nothing more than a classical insertion). A delete type modification is memorised, because at this time it cannot be known if it is a movement move operation, a modification or a pure deletion; subsequent modifications will provide information about this.

If the tool concerned is incapable of tracking changes or logging, then algorithms can be used to compare the result with the source. Hybrid approaches can also be used in which logging information is used to clear ambiguities.

Search for Information

We will now consider various means of finding objects that can be used simply to search for information or to define the source of a transclusion.

Two types of information searches are used:
1. Explicit searches that search for objects with given properties
2. Searches operating by score propagation that, starting from a set of reference objects, search for objects that are "similar" or "closely related" to this set (these concepts will be described in detail later). Said reference objects can be composed of the navigation context (or "browse context"; see "Navigation context" section) or exploration of objects by the user (for example objects in a selected directory).

Considering that the second search type starts from a set of objects, it is often useful to combine the two types of algorithms, firstly by searching for a set of objects with given properties (in other words by explicit search) then by searching for objects close to them (by score propagation).

Explicit Search

There can be three types of properties in a request:
the trivial case in which object identifiers are given directly
the content (for example search by keywords)
objects related by semantic relationships (for example to find a document written by a given person)

Therefore, a request can combine several properties, using Boolean operators.

Search by Score Propagation

The search by score propagation method is based on a score propagation pipes network (called "pipes"[33] for short in the following). We will now give a brief description of it (more details will be given in the "Pipes network" section later).

[33] An aptitude to propagate a relevance score from one object to another will be referred to as a pipe between 2 objects in the following. The propagation capacity is called the pipe width.

The pipes network is an oriented network in which the vertices are objects and the edges are pipes, to which a numeric value called the width is attached.

A request is composed of a set of objects weighted by numeric values[34]. A positive value indicates a "score source" and a negative value indicates a "score absorber".

[34]Lack of weighting is equivalent to default weighting.

Each object distributes its score along outgoing pipes (distributed as a function of their widths). A score source produces a score for itself. A score absorber spontaneously reduces its score.

The method attempts to allocate scores to each object such that each object receives and creates as many scores as it destroys and provides, in other words an attempt is made to find an equilibrium situation.

The request (the set of score sources and absorbers) describes the subject for which the user would like to obtain results (therefore the objects to which the user wants to allocate an advantage or disadvantage), the pipes represents relevance relationships (a pipe from A to B means that if A is interesting then B must also be interesting, to a certain extent indicated by the width of this pipe). Therefore the result found by the method corresponds to objects that are more relevant for the request as a function of the pipes network. An object with incoming pipes from a large number of objects that are relevant for a request must also be relevant.

The following is the equation used by the method to recalculate the score of an object:

$$X_j^+ = s_j(1-S)\Sigma_i l_{ij} x_i$$

$X_i$ is the score of object i. The $^+$ exponent represents the value after update.

$s_i$ is the value of the score source or absorber for object i (zero if i is not a score source or absorber).

$S=\Sigma_i s_i$ is the sum of the values of score sources and absorbers.

$l_{ij}$ is the width of the pipe from i to j, zero if there is no pipe.

Pipes can be obtained by several means.

Firstly, a semantic relationship (as described above) implicitly indicates a relevance relationship, as a function of the nature of this relationship. The most obvious is the equivalence relationship because if one of two equivalent objects is interesting in a certain context, then the other will also be interesting. More distant semantic relationships such as "author of" also indicate a relevance relationship (if a document is relevant for a request then its author is also potentially relevant, and then other documents written by him may also be relevant), however pipes created for these relationships need to be smaller than pipes for an equivalence relationship. Therefore, a pipe width needs to be associated with each type of semantic relationship.

More generally, a transclusion indicates a given relevance relationship even in the absence of explicit semantics; this is particularly useful in the case of hypertext links between Web pages, because the system is thus capable of analysing the Web automatically without any other action.

The system may be extended to other "pipe placers", in other words functions that produce pipes between objects, as a function of the application.

Pipes can be placed between objects that are co-cited, in other words simultaneously linked from other objects (through hypertext links or possibly other types of transclusions). If a page A containing a link to a page A also contains a link to a page B, a (symmetric) relevance relationship can be deduced between A and B. For example, the width of the co-citation pipe between two pages may be equal (with a weighting factor as described later) to the proportion of incoming links common to these two pages.

Similarly (symmetrically), it may be decided to place pipes between objects that cite the same objects, the width of which is equal to the (weighted) proportion of common outgoing links.

Another approach would be to use the distribution of words in objects as a basis; a pipe is placed between two objects with a similar distribution, with a width that increases with their similarity. Typically, this method is used to place pipes between public Web pages and private documents, so as to propagate relevance scores obtained automatically for public Web pages, to these private documents.

Finally, it may be useful to have pipes placed between objects and their containers (automatically, using a dedicated pipe placer). In particular from objects to their containers, as shown in the following example; if a document contains a number of objects and most of these objects have obtained a good result for a given request, then it is a good idea to present the parent document directly. By placing pipes from these children to the parent document, the children will give a score to the parent, and the parent will then have a better score than a child taken alone.

One difficulty is that the pipe width to be associated with each type of semantic relationship, and the weighting of these pipes with regard to other placers, will have to be given for each pipe placer. These weightings represent the importance of these different sorts of pipes in terms of relevance.

Rather than associating a single width for each type of semantic relationship, an interval could be created and then when the user places such a relationship, he could be allowed to indicate the intensity of this relationship (for example on a graduated scale with five possible intensities). The width increases as the relationship becomes stronger.

Note that in general, the different pipe placers need to produce pipes with a limited width to prevent one pipe from becoming disproportionate to the others. This is the reason why, for example, it is better to use a ratio for co-citations rather than a number that is not limited.

Normalisation

It is important that the quantity of scores sent by an object through its outgoing pipes is equal to the score of this object, in other words that the total quantity of the scores should be kept unchanged so that the network can reach an equilibrium. This is done by requiring that the sum of pipe widths output from an object is equal to one (note that the sum of incoming pipe widths should be equal to one for a particular object).

The starting point to achieve this result is to place all pipes without normalisation, and then to calculate the sum a of the widths of the outgoing pipes for each object. "Normalisation pipes", with a width equal to $(1-s)/n$, where n is the total number of objects, are then added from this object to all the other objects (including to itself). The new sum of outgoing pipes for this object will thus be equal to $s+n(1-s)/n$ and therefore one.

It is thus possible to have cases in which normalisation pipes have a negative width (when s is greater than 1), which means that the object will give a "negative score" and in fact will take away from all the others. However, it is important to prevent a particular pipe from having a width greater than one, because although the total score quantity remains unchanged, an object at the end of such a pipe would have a disproportionate advantage because it would receive a higher score from the start of this pipe than this start possesses.

From the implementation point of view, it is not really necessary to place normalisation pipes or even to consider them separately, considering that there would be a quantity of scores to be shared equitably with all objects for each iteration. In fact, all that is necessary is to calculate the sum of these "residual values" and to add an $n^{th}$ part to all objects when all normal pipes have been processed—the residual value of an object being the product of the complement of its value s and its score x before it is recalculated: (1−s)*x.

Therefore, special care is necessary to avoid introducing an unbalance between different regions of the network, by tending to put pipes with a high average width in one region and a lower average width in another region. This would have the consequence that the first region would "steal" scores from the second region, and therefore also obtain higher average scores. This problem can be reduced by producing an algorithm to detect these regions automatically and balance pipe widths.

Preferred Variant

Another way of normalising outgoing pipes is described below.

Each object conserves its residual score instead of distributing it among all objects, in other words a pipe with a width 1−s is added from each object to itself, where s is always the sum of the outgoing pipe widths. The problem with this procedure is that the score for objects that do not have an outgoing pipe will be increased until the scores of objects that supply them directly or indirectly are depleted.

However, this problem does not arise when score sources are used, for example to handle a request, because sources will use the score of all objects, since the score of each object for each iteration is multiplied by 1−S, where S is the sum of score sources, in order to maintain a constant sum of scores (see the equation used by the method to recalculate the score of an object, given above). Therefore, this means that all objects contribute to supplying each score source.

Absolute Scores

When it is required to obtain scores in an absolute manner (with no particular request), then a score source can be placed on each object (therefore for each iteration, each object distributes a part of its score to all other objects—the same value for all objects). This will have the effect of assuring that each object has a non-zero score, and therefore maintaining differences between the different objects, unlike the case without score sources in which entire regions can have zero scores as described above, and therefore for which differences between objects disappear.

Global Scale

Therefore, the widths of each type of pipe can be placed on a global scale. In the case of automatically calculated widths (co-citations, similarity of word distribution, etc.), these values determine the weights to be allocated to the results of these calculations to reach values between the required minima and maxima.

The following is an example global scale:

"Equivalent to" relationship: 1

"Relevant to" relationship: between 0.5 and 1

Calculated pipes counting co-citations: between 0.3 and 0.6

"Author" relation: 0.2.

...

Pipes placed along hypertext links: 0.1

Any other relationship: 0.03.

Customisation Method

We will describe a method used to modify the result of a request as a function of the usual interests of the user (his profile).

User Profile

The user profile can be represented in the same form as the result of a request, with a score for each object (in practice, when authorities are used to optimise the calculation of a request, it is sufficient to keep the score for the user from each authority).

This profile is actually a weighted average of the user's interest, the weight becoming smaller as time passes. The present interest may be estimated by considering objects viewed by the user and the requests that he makes (therefore when the user makes a request, result scores will also be the scores of objects that satisfy his present interest. If objects visited by the user are also used, they can be considered like requests and the same processing can be done). Weighting is done by taking an average between the average interest of the user at the previous instant and the user's present interest.

If the score of object i in the user profile is denoted P(i), and the score of object i in the present interest of the user is denoted p(i), then P(i) will be updated with s P(i)+(1−s) p(i), where s is the weighting factor (constant giving the "weight of the past"; this value may depend on the information used to determine the present interest. In particular, a user's request will leave a lower weight in the past than a simple page visit[35]).

[35]This approach is described in detail many times in the following.

In practice, all that need to be stored in the profile are objects with a score sufficiently greater than zero, and to consider an object not present in the profile as having a zero score. This avoids having an excessively voluminous profile requiring too many calculations in each step.

Profile of Each Object

In the same way as for the user, a profile can be associated with each object that is the score of other objects with respect to it. This result is obtained by applying the search algorithm by propagating the score to a request containing this object only.

Note that optimisation using the authorities described above will calculate and keep this profile up to date in any case.

Score of an Object with Respect to the User Profile.

Thus, the score of an object with respect to the user profile can be calculated by summating the products, for each object, of his score in the profile of the tested object and in the user profile.

Selection of an Option as a Function of the User Profile

An object may have optional children, therefore that should not be displayed unless the system considers that they correspond to the user profile. It may also have mutually exclusive children, in other words groups of objects, and the group that corresponds most closely to the user profile will be displayed).

It is said that an object corresponds to the user profile when the score of this object with regard to the user profile is high.

Considering that in general (in other words when there are no relationships from or to them) the profiles of the children of an object will not be very different from each other, the author of this object can influence these profiles by placing semantic relationships linking these children to objects representing semantic properties, or to authorities.

Algorithms Used for Transclusions

Once modifications made by the user to the content of the result of a transclusion have been detected and recorded in a differences object, these modifications need to be applied to an updated version of the source (while using the current version to obtain modified object contents and positions). We will firstly describe some concepts from an implementation point of view, and then describe a number of algorithms that will be used to update each transclusion from the current version.

We will start by describing a "local algorithm" to determine the content and position of a certain object, then a "global algorithm" based on a local algorithm, that will be used to build an object and all its descendants.

All that is necessary then to update a current version is to call the global algorithm on the root of this current version.

Identifiers

Each object has an identifier. Objects created locally have an atomic identifier which is an integer number that is unique in the system.

Each transclusion also has an atomic identifier that is also unique.

Objects seen through a transclusion have a composite identifier denoted A:B, where A (the head of this identifier) is the identifier of this transclusion and B (the tail of this identifier) is the identifier of the object at the source of this transclusion.

Parentheses are used to clearly delimit the head and the tail if necessary. If there are no parentheses, sub-identifiers extend as far to the right as possible. For example, 1:2:3:4 should be read as 1:(2:(3:4)). Another example if A=1:2 and B=3:4 then A:B=(1:2):3:4.

Transclusions

A transclusion A is considered in this description as being firstly a set of objects "seen through" A, and secondly a set of modifications concerning these objects.

These modifications include:
modification or deletion of an object seen through A (therefore for which the identifier begins with "A:")
movement of an object seen through A, for which the parent before and after movement is also an object seen through A.
creation of an object (created locally or seen through a transclusion different from A) as being a child of an object seen through A.
movement of an object seen through A as a child of an object created or seen through a transclusion different from A. One special case is when the user makes a transclusion, the algorithm to perform this operation will start by creating the transclusion but at this instant, the transclusion is no longer accessible (because no object seen through this transclusion is yet placed as a child of an accessible object). The second step is then nothing more than a movement of one of these inaccessible objects to become a child of an accessible object.

Note that if an object is moved from one transclusion to another or if a transclusion is created in another transclusion, this modification will be "shared" by two transclusions.

By convention, it is said that an implicit transclusion does not contain any modification. It will be said that such modifications will be processed by the transclusion through which this implicit transclusion arrived. For example, if an object ((1:2):3):4 is modified, this modification will be associated with transclusion 1.

Implicit Transclusions, Internal Transclusions

When the result (object 3:2 in the example in FIG. 7) of a transclusion (3) is visible through a transclusion (4), it is said that the image of this result (4:3:2) is an implicit transclusion (4:3) of the source (4:2) of the first transclusion, and this first transclusion (3) is said to be a transclusion internal to the second.

In this example (FIG. 7), the image (4:2) of the source (2) of the internal transclusion is also visible through the transclusion (4), but this is not always the case. Otherwise, the source of the internal transclusion will be simply invisible. The example in FIG. 6 (or FIG. 1) gives a specific consequence of this.

In this example, it can be said that 4:3:2 is an indirect transclusion of 2, because the modifications applied to 2 will be indirectly transmitted to 4:3:2.

When this structure is seen through transclusion 5, the indirect transclusion is maintained even though it passes through an invisible object (5:3:2). Thus, modifications applied to 5:2 will have an influence on 5:4:3:2.

Equivalence of Identifiers

The existence of an object can sometimes be determined by several paths in the presence of implicit transclusions. In the example in FIG. 7, 4:3:2 is both the object 3:2 seen through transclusion 4, and object 4:2 seen through transclusion 4:3. Considering the second manner, the identifier (4:3):4:2 is obtained (parentheses are placed to clearly identify the head of this identifier).

In practice, we will consider these two identifiers as being equivalent, and more generally that (A:B):A:C is equivalent to A:B:C for all values A, B, C. Considering that this equivalence is difficult to verify in the general case, the following (more general) method can be used.

The polynomial defined below is called the density "d" of an identifier:

$d(x) = d_x$ if x is an atomic identifier, $d(A:B) = s\,d(A) + (1-s)\,d(B)$ (s is a symbol with no defined numeric value).

Two identifiers are considered as being equivalent if and only if their densities are equal.

A polynomial simplification algorithm consists of replacing all products of sums by sums of products, and then grouping terms in $d_x$ for each value x.

For example $d(4:3:2) = s\,d(4) + (1-s)\,d(3:2) = s\,d_4 + (1-s)(s\,d(3) + (1-s)\,d(2)) = s\,d_4 + (1-s)(s\,d_3 + (1-s)\,d_2) = s\,d_4 + (s-s^2)\,d_3 + (1-2s+s^2)\,d_2$.

Similarly, the density of the other form of this identifier is:

$d((4:3):4:2) = s\,d(4:3) + (1s)\,d(4:2) = s(s\,d_4 + (1-s)\,d_3) + (1-s)(s\,d_4 + (1-s)\,d_2) = (s-s^2)\,d_3 + s^2 d_4 + (1-2s+s^2)\,d_2 = (s-s^2+s^2)\,d_4 + (s-s^2)\,d_3 + (1-2s+s^2)\,d_2$.

Therefore the two forms actually have the same density, as expected.

Sources of an Object

Each object may have a set of sources, which is the set of objects for which it is the image by an implicit or non implicit transclusion. Each source is associated with the corresponding transclusion.

For example 4:3:2 in the above example has two sources 3:2 and 4:2 by transclusions 4 and 4:3 respectively.

If A is a source of B through transclusion C, then the identifier of B is equivalent to C:A. Therefore all sources of an object can be noted by a set of forms of its identifier, such that the tail of each of these forms is a source and the head is the corresponding transclusion.

Figure 7:
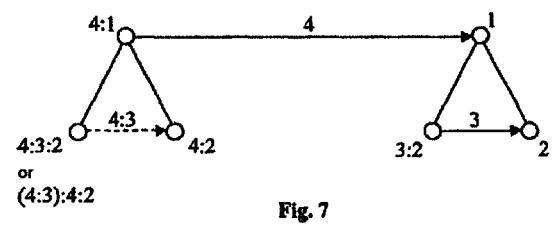
FIG. 7 illustrates an implicit transclusion example.

For the example in FIG. 7, the set of sources for 4:3:2 will be noted as 4:(3:2) and (4:3):(4:2) (the additional parentheses are only placed for reasons of clarity).

The set of sources for an object can be calculated starting from a source of this object (since this object will have been obtained by a transclusion, one transclusion:source pair will already be known).

Let Si be the sources of the source considered (S), let Ti be the corresponding transclusions, and let T be the transclusion such that T:S is the object studied.

The complete set of sources of the object is then T:Si and the associated transclusions are T:Ti. Obviously, T:S still has to be added. The result does not depend on the first chosen T:S pair, due to the equivalence of identifiers.

Data Present in an Object

Two types of data are associated with each object: its position and its content[36].

[36]In an XML context, the object is an element and its content is its "innertext"; the attributes and the child elements are considered in this description as being child objects (contained in the object in question) and therefore in turn handled as objects, each of which has a content and a position. However, attributes have additional constraints, for example such as the fact that the algorithm must merge a given attribute originating from two different sources.

The position of an object is given by its parent and its predecessor (the predecessor only being used to determine the position of the object among the children of its parent).[37]

[37]In the framework of the description of the differences object given above, if an object is modified locally, or moved locally, the differences object will notify this fact, and the content and the position themselves will be obtained by the current version (but obviously other means of storing these data are possible).

As will be seen later, it will be necessary to determine the origin of these data (among other reasons, if the object has modified them locally or if it obtained them through a source)

More precisely, the origin of data is an expression defined as follows:

The !A notation means that data was created locally by object A.

The A:B notation, where B is the origin of information, represents original data B, which is then once again transited through transclusion A.

For example 1:2:!3:4 must be interpreted as follows: data were created by object 3:4 and then transited through the transclusion 2 (which gives the origin 2:!3:4) and then transited through transclusion 1.

Each object will store the origin of its content and the origin of its position in this form.

Note that if the exclamation mark is removed from the origin of data, the identifier of the object that contains this information (or one form of it) is obtained.

Calculation of an Object

When the image of an object by a transclusion has not been modified (or moved) by this transclusion, the information present in this object (position or content) will be obtained by one of the sources (the position and the content are calculated independently).

We will start by describing how the content is calculated. Step numbers are given between square brackets.

Let $\{T_i:S_i\}$ be the set of transclusion: source pairs of an object, and let $\{C_i!O_i\}$ be the origins of the contents of these sources ($C_i!O_i$ is the origin of the content of $S_i$, $C_i$ is the path traveled by this content and $O_i$ is the object for which the content has thus been inherited) [local 1].

In the example in FIG. 7, assume that 3:2 and 4:2 were modified. 2 was created locally and therefore also defines its content.

Therefore the origin of the content of 2 is !2, the origin of the content of 4:2 is !4:2 and the origin of the content of 3:2 is !3:2 (if 4:2 had not been modified locally, it would have inherited the content of 2 and the origin of this content would have been 4:!2).

Knowing the sources and origins of the contents of these sources, we will now chose which source of the object considered must inherit the content. This choice will be made by giving priority to the Ti:CI paths of the contents of these sources (see the "Calculation of path priorities" section below) [local 2].

Suppose that $T_j:C_j$ is the chosen path, then the origin of the content of the object considered will be $T_j:C_j!O_j$, in other words we will simply extend the path $C_j$ of this origin with the transclusion $T_j$ corresponding to the chosen source $S_j$. [local 3].

In the example in FIG. 7, transclusion:source pairs of 4:3:2 are 4:(3:2) and (4:3):(4:2). The origins of the contents of these sources are !3:2 and !4:2, and therefore the two $C_j$ are empty. Since the path (4:3) has priority over path 4:, the origin of the content of 4:3:2 will be (4:3):!4:2.

Once the origin $T_j:C_j!O_j$ of the content has been obtained, the value of this content is simply equal to the content of the object $O_j$. [local 4].

The origin of the position of an object is calculated in exactly the same way as the origin of its content is calculated, obviously with the difference that the origins $C_j!O_j$ considered are the origins of the positions of these sources. On the other hand, the parent and the predecessor of the object will not be equal to the parent and predecessor of $O_j$, but to their image through the path $T_j:C_j$:. Therefore, if the parent of $O_j$ is P, then the parent of the object to be calculated will be $T_j:Cj:P$ and similarly for the predecessor. If the predecessor thus obtained is not a child of the parent thus obtained, then this predecessor information will be ignored (and for example the object will be placed at the end of the list of children of its parent). [local 5].

Figure 8:
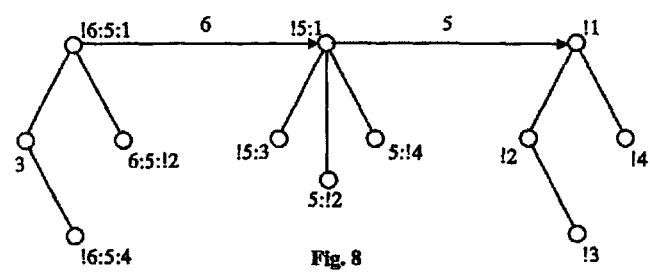
FIG. 8 illustrates a calculation of object positions in transclusions.

FIG. 8 presents an example of the behaviour of this algorithm for the calculation of object positions (given that the calculation of the content is not given in detail here, step 4 no longer appears).

The origin of the position of each node is given adjacent to the node.

Since objects 1, 2, 3 and 4 are created locally, their give their positions themselves.

Similarly, the result of transclusion 5:1 also gives its position, and in fact it is also considered as being moved[38] because its parent is not the correspondent by 5 of the parent of 1 (not shown in the diagram to avoid excessively complicating it).

[38]Every time that a transclusion is created, the construction algorithm of the differences object shall place the data that the root of the result of this transclusion is moved, in this differences object.

The transclusion 5 specifies that 5:3 is moved as the first child of 5:1.

5:4 has a single source that is 4 by transclusion 5 [local 1]. Therefore its parent will be the correspondent by transclusion 5 of the parent (1) of 4, therefore 5:1. Similarly, its predecessor will be 5:2 [local 2,3,5].

The position and the origin of the position of 5:2 are obtained in the same manner.

The transclusion 6 then moves objects 6:5:1 and 6:5:4.

The origin of the position 6:5:2, the unique source of which is 5:2 by the transclusion 6 [local 1] will be the origin of the position of 5:2 (therefore 5:!2) [local 2] extended by 6, which gives 6:5:!2 [local 3]. As seen previously, the parent will be the correspondent through transclusion 6 of the parent (5:1) of 5:2, therefore 6:5:1. Its predecessor will be the correspondent of the predecessor 5:3 of 5:2, therefore 6:5:3 [local 5].

The position of 6:5:3 is calculated in exactly the same manner, its origin is the origin of the position of its source (!5:3) [local 1,2] extended by transclusion 6, which gives 6:!5:3 [local 3].

Calculation of Path Priorities

A method of comparing two paths from an object A is given below.

If the object A originates from a series of transclusions T1 T2 T3 etc. (A=T1:T2:T3 . . . ), then any data source for this object will be the image of the same first source through a sub-set of these transclusions (or their images through a transclusion).

The polynomial associated with a sub-set of these Ti values is obtained if Ti is replaced by $t^i$ and the sum of all these terms is made. For example, the sub-set of T1 T3 gives the polynomial $t+t^3$.

One source has priority over another source if the polynomial associated with the set of Ti values that separates it from the object of which it is a source is greater than the corresponding polynomial of the other source, for a very large value of $t^{39}$.

[39]Explanations: the terminator is defined as being the number that is last in an identifier. For example, the terminator of 2:3 is 3, the terminator of (4:5):((3:(8:9):5):(4:(7:11))) is 11 and the terminator of 5 is 5. Let O be the object for which a source is to be found. Let Ci:Si be the different sources (Si is the source and Ci is the path, Ci:Si is equivalent to O). The assumption is made that O is in the form Tn:T(n−1): . . . :T2:T1:S where Ti values are atomic identifier transclusions, S is the object at the very end of the chain and is also atomic. Ti values can be recognised in each Ci:Si by looking at the terminator of each element of Ci:SI. For example (4:3:2):4:3:1:S has four elements if S is ignored, and these elements terminate by 2, 3, 4 and ! respectively. (Therefore O would be 4:3:2:1:S in this case, and T1, T2 . . . =1, 2 . . . ). Therefore, we can see what transclusions Ti are used in a path Ci, by looking at the terminators. For example, if Ci=1:(2:3): then this path uses the transclusion 1 and transclusion 3 (actually an image of this transclusion). Therefore, we will no longer work with paths, but rather with sets of transclusions, themselves sub-sets of {T1 . . . n}.

The priority is determined using three rules:

1) If a path is an extension of another path, then the second path takes priority. (Therefore A sub-set of B implies that A has priority over B. In particular, the empty path (local creation) will always have priority.
2) If A uses a transclusion that B does not use, and all transclusions used by B have priority over this transclusion, then B has priority. (Ti has priority (closer) to $T_j$ if si I<j. For example T2 is closer to and therefore has a higher priority than T4. Therefore a path that uses T2 and T3 will take priority over a path that uses T4, for example. Another example, a path that passes through T3 and T4 will take priority over a path that passes through T2 and T5, because of T5 which has a lower priority than all elements in {T3, T4}).
3) If A and B have a transclusion in common, then this transclusion cam be removed from the path, and the priority relation will be preserved. For example if A={T2, T3, T8} and B={T4, T8}, T8 can be removed from each side.

This is represented using polynomials, by taking the sum for each transclusion in the set, from t to the power i, where i is the number of this transclusion. For example A={T2, T3, T8} will give $t^2+t^3+t^8$ and B={T4, T8} will give $t^4+t^8$. The largest polynomial when t is very large represents the longest and therefore the lowest priority path. For example $t^4+t^8>t^2+t^3+t^4$ when t is large. This can be verified by taking the difference, by simplifying and then looking at the sign of the highest degree term $t^4+t^8-(t^2+t^3+t^4)=t^4-t^3-t^2$.

When all elements of O cannot be made atomic, these elements can sometimes be recognised in the sources (if the terminators are all different), and non-atomic elements should then be placed before all elements that share parts of them. For example (a:b) should be placed before a and before b, if there are a and b values. "Before" in this case means in the order T1 . . . Tn, therefore highest priority.

Determination of Objects to be Calculated

We have seen how to calculate the position and the content of an object ("local algorithm"), and we still need to know what objects need to be calculated so as to obtain the developed structure (with all descendants), starting from a queried object (for example the root of the current version).

This "global algorithm" will provoke a calculation of all objects that might be descendants of the queried object. In order to avoid repetitive calculations (and in some cases to prevent the algorithm from looping), it is important to store whether or not each object has been processed by the local or global algorithm. When one of the algorithms encounters an object that it has already processed, it will simply do nothing.

If the queried object is created locally (if it has an atomic identifier), it knows the list of its children and therefore it will simply continue the global algorithm on each of its children one after the other. Steps are numbered between square brackets.

If the queried object is the image of another object by a transclusion, then the following objects have to be recalculated using the local algorithm:

The object itself (so as to obtain its content) [global 1]

For each source (in the case of an implicit transclusion), images of all descendants of this source by the transclusion corresponding to this source [global 2]

The set of objects created and moved by the transclusion [global 3].

Finally, the global algorithm is continued for each child thus obtained for the studied object [global 4].

Figure 9:
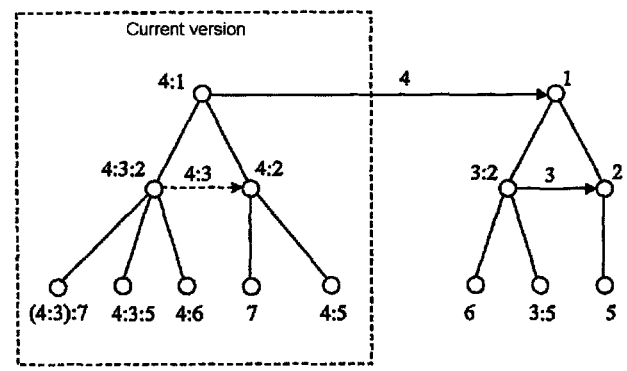
FIG. 9 illustrates the calculation of the structure of objects in transclusions.

The global algorithm will calculate the structure developed from 4:1 in FIG. 9 as follows:

1. 4:1 is obtained through a transclusion. The local algorithm is applied on 4:1 to obtain the content [global 1].
2. 4:1 has a single source, 1, through the transclusion 4. Therefore, the image by 4 of all descendants of 1 will be recalculated, therefore 4:3:2, 4:2, 4:6; 4:3:5, 4:5 [global 2].
3. 7 is the only object created or moved by 4, it is recalculated [global 3].
4. Descendants thus obtained for 4:1 are 4:2, 4:6; 4:3:5, 4:5 and 7. The global algorithm is continued on each of them [global 4].
5. 4:3:2 is the image of an object by a transclusion. The local algorithm does not have to be called on it, because it has already been done [global 1].
6. The set of transclusion:source pairs of 4:3:2 is 4:3:2 and (4:3):(3:2). Therefore, the local algorithm will be called on descendants of 3:2 seen through 4, then on descendants of 3:2 seen through 4:3. All have already been done except (4:3):7 (which will therefore be added as a child of 4:3:2, the image by 4:3 of the parent 4:2 of 7) [global 2].
7. The algorithm will now continue working down the developed structure of 4:1 without discovering any new children and will then terminate.

Pipe Network

A user can use this invention to create relevance relationships[40] between a first object[41] and other objects, so as to be able to find the first object simply by accessing at least one object relevant to the first object.

[40](such as semantic relationships that explicitly define the reason for the relevance concerned, as described above).

[41] Remember that an object refers to a data resource A relevance relationship between two objects refers to a relationship indicating their relevance with respect to each other.

Said relevant object(s) relative to the first object can include one or more of said other objects that the user has linked to the first object, and also:

one or more objects with a relevance relationship with the first object created by another user in a network of relevance relationships shared between these two users, one or more objects for which the first object is automatically considered to be relevant by means of inference rules[42] that are applicable to relevance relationships thus created, one or more objects for which the first object has a high relevance score that was determined automatically by the method by considering relevance relationships like capacities for propagation of a relevance score from one object to the other (in other words pipes).

[42](that are configured by default and/or configured by the user; an example of an inference rule was given above).

In addition to relevance relationships created by the users themselves, the method uses pipes created automatically from interrelations and/or the content of objects. Thus, the method automatically creates pipes, particularly[43]
- between co-cited objects[44],
- between objects linked by hypertext links,
- between objects with similar word distributions.

[43] (by combining these methods and by combining with other methods of calculating relevance between objects)

[44] (for example co-cited by hypertext links directed to them and placed in the same Web page.

These pipes are created particularly between Web pages in which users might be interested.

Finally, pipes (or relevance relationships) between Web objects and private objects (e.g. Company documents) are created and can thus be used to propagate relevance scores of Web objects (Web pages) to these private objects that will be calculated automatically by analysing the structure of links and the content of these links.

Thus, by using all these pipes, the method enables the user to:
- find said first objects;
- since the user can share a network (relevance relationships and pipes) with other users, the method allows the user to discover said first objects that are expressly linked by other users within the shared network;
- finally, the method enables the user to discover other relevant objects among the private and public objects (e.g on the Web) to which good scores are propagated through automatically placed pipes.

The following scenarios give examples of how an object can be found/discovered by accessing (i.e. by visiting or specifically selecting) relevant objects.

Some tools (in the family of text editors) such as Microsoft's "OneNote"®, offer the user the concept of a "container" in which objects can be grouped[45]. An additional automatic container enrichment function could be provided in these tools, by the addition of relevant objects[46] suggested by the method. Elements located in the containers before enrichment can be seen as objects relevant to said first objects, in other words as a request to the system using the method[47]. Most applications based on containers can be provided with such an automatic enrichment function.

[45] Another example of containers are directories of favourite links.

[46] (or only links on relevant objects)

[47] The user can select elements from one or several containers and can ask the system to present other elements relevant to them.

The user can use other tools to trace relevance relationships between data resources, and possibly to specify the extent of this relevance (by specifying so called semantic relationships). This practice is frequent, particularly in "Strategic monitoring" activities (see illustration in FIG. 11).

It might be imagined that with such tools, the user can find/discover an object simply by visiting or selecting objects relevant to it or by manipulating their relationships. It might be an object about which he has become aware or not. The method links objects proposed by the system with objects that the user is currently visiting.

Relationships between objects can be traced in one of the following manners:
- by explicitly notifying the method about identifiers of the objects in question, or firstly by accessing a first object and then by notifying the method about the identifier of another object (to specify its relationship to the first);
- or it can be done within a document through a transclusion of each object that is to be linked, in other words by creating references to objects in question in a document and then tracing relationships between these references in the document itself, using an editor;
- or in a hybrid manner (editor to object or object to editor).

Figure 11:
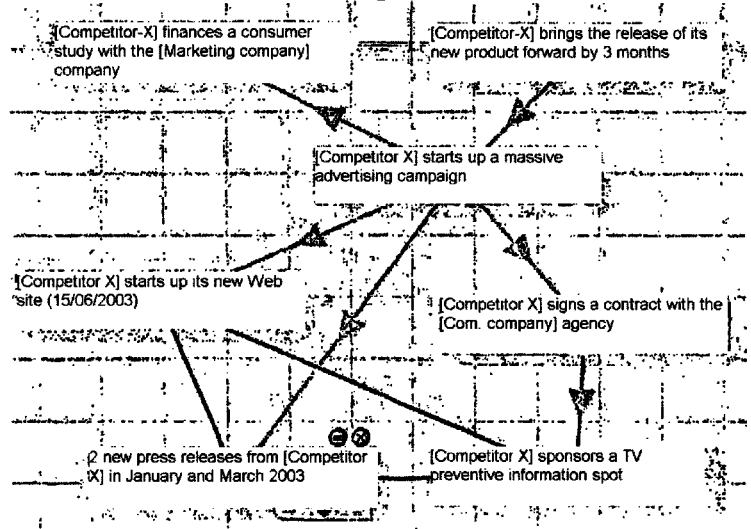
FIG. 11 illustrates a tool representing semantic relations as typically used in strategic watches.

FIG. 11, that is actually a variant of FIG. 2, illustrates such relationships presented (and made manipulable) in a typical specialised editor that it is proposed to use in a strategic monitoring activity on the Internet. Each block (rectangle) could represent an enriched transclusion, for example from a Web page. Clicking on a block displays the Web page that it represents (this is not shown in FIG. 11). By clicking on each arrow (that represents a relevance relationship), the user can specify the semantic relationship concerned, and the given semantic will then appear when the mouse cursor is positioned on the arrow in question (this is not shown in FIG. 11 either).

Any semantic relationship may be a relevance relationship, and semantics can be added to new relevance relationships (or pipes) derived automatically, either manually or using rules for which parameters can be set by the user. The user can thus discover new semantic relationships identified by the method.

The result of the method is a set of new objects (new blocks are added in FIG. 11) relevantly connected to the objects displayed by the user (arrows link these new blocks with the existing blocks).

The result of the method can be put in order firstly as a function of the user's wishes (for example private objects first) and then sorted by relevance score (this method is described later).

The method analyses the Web and calculates the relevance scores for pages. It does this by calculating a network of pipes. A pipe between two pages expresses the fact that if the first page is relevant (for the request in progress or in absolute terms), the second page will then be relevant as well. Pipes thus have a "width" that expresses the intensity of this propagation.

The default width of a pipe between two Web pages is the number of incoming links common to these two pages. It is possible to add (or widen) pipes using hypertext links[48] or based on a text analysis (for example a pipe is placed between two pages with a width that increases with the similarity of their word distributions), or by various other methods. In particular, the user can modify this network himself as he wishes, by adding/removing these pipes or by modifying their width.

[48] (so as to also obtain the equivalent of the well known PageRank algorithm approach; thus it can be seen that "Relevance Web" includes the existing Web)

The method[49] is extended inside Company documents. For example:
- The user can add a pipe from a Web page to a Company document, or from one Company document to another. In general, a pipe can be placed from or to a reified selection of a part of a document or page.
- The user can do a transclusion for which the source is a reified selection, in a document, and this will also create pipes in the two directions between the source and the result of this transclusion.
- The user can place a pipe between two transclusion results, that by default[50] will be replaced by a pipe between the corresponding sources of these transclusions[51].
- Pipes are placed between the Web and the private documents as a function of the similarity of their word distributions.

[49] In this document the word "system" suggests that it manages a single network.

[50] In this case, the user can choose where the pipe will actually be placed (case by case or by configuring the interface again).

[51] In general, the user can place a pipe from or to the result of a transclusion that by default will be replaced by a pipe from or to the source of this transclusion or its upstream transclusions if there are any (case of cascade transclusions).

In the remainder of this description, the word "selection" will denote all possible cases of reified selection of a part or of the entire content of a document or a page[52]. Therefore a selection is actually an object (as defined at the beginning of this report) in the sense that it is identified. Thus, instead of using the term "object" or "resource", we will use the term selection in this description.

[52]For example the source and result of a transclusion are selections; the two ends of a pipe are selections.

The user interface enables him to trace relationships between selections (as shown in FIG. 11) and to explicitly define their meaning[53]; these relationships generate pipes[54].

[53]As already mentioned, such relationships may for example indicate that a selection confirms/contradicts/causes/influences/comments/translates etc. another selection.

[54]Pipes are created using rules that the user can modify. Furthermore, advanced users can be provided with an API so that they can define pipe width calculation systems themselves, particularly as a function of the semantics of the content of selections or relationships between selections.

Every time that the user displays or selects at least one selection (indifferently in the Web or in the Company documents), he can ask the system to present relevance selections to him, the selections also being located in company documents or on the Web. The user can thus complete his document by transcluding one or several selections proposed by the system into it, and then tracing relationships between them in the document. Relevant selections presented by the system can be automatically linked with selections in the request for which they are most relevant.

The user can set parameters to define the order in which the results will be presented to him by default, as a function of the position (for example his private documents may be shown to him before other company documents, or conversely documents found on the web may be shown first), and the score.

We will now introduce particular functions making use of the advantages provided by the enriched transclusion method.

The system may be placed in a client or server mode. When it is in server mode, it manages a server network and when it is in client mode it manages a modified network that is a set of modifications made to the server network in a particular system. Several users can thus maintain different views of the same network in their corresponding client systems[55].

[55]See the "Request Handler" section.

In client mode, the user creates and maintains his network particularly by transclusion of selections (in other words objects) in documents and by tracing relationships (or pipes directly) between these transclusion results. The network is maintained because each pipe thus created is actually created in the network, and only one reference to it is inserted into the document in question. The network in which the pipe in question is actually created may be the network of the system in client mode or it may be the network of the system in server mode directly.

A user can make all or part of his network available to other users (his subscribers). When he modifies his network, his modifications will be directly visible and effective at his subscribers.

A request representing a set of selections can itself be a node in the network. Pipes connect it to selections that have the best scores for a previous execution of this request (their widths being a function of these scores). Thus, the user can trace or modify relationships or pipes from or towards a set of selections (that formed a request to the system). Note that the request may be executed either using the algorithm for calculating the relative score expressed below or by another method, and particularly the relative distillation method described in this report.

Figure 10:
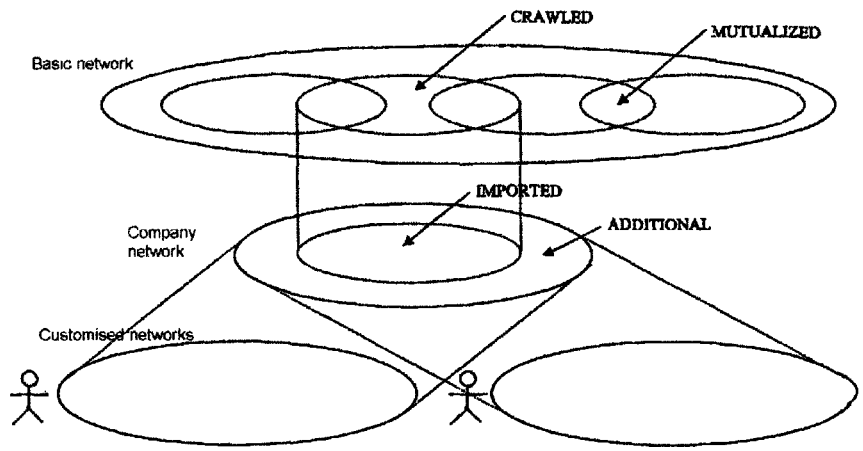
FIG. 10 shows a graph structure architecture in which a base system crawls the Web and other systems import pipes from this base system.

For the purposes of this description, it is understood that each system manages a single network. Nevertheless, some pipes in a network may be imported from another network and may be automatically updated from this other network[56]. FIG. 10 shows a graph structure architecture[57] in which a base system managing a "Base network" crawls the Web, and other systems (Company networks)[58] import pipes from this base system, and add selections and pipes to it that will be their own; customised networks in turn import pipes from these other systems, that can be manipulated by users.

[56]Obviously, for performance reasons only differences that have been made to the source network will be notified (periodically) to the importing network.

[57](not limitative);

[58]There is only one company shown in FIG. 10.

Note that for customised networks, expert users can modify the relevance propagation network such that the system gives better results than a purely automatic engine.

Note also that in the base network, crawling parts of the Web in which more than one company is interested may be mutualised between these companies.

Thus, in FIG. 10, the region denoted "CRAWLED" represents the part of the base network obtained by crawling a sub-set of the Web in which a company is interested; the "MUTUALIZED" region represents the part of the base network obtained by crawling a sub-set of the web in which two companies are interested at the same time (which has the advantage of mutualising crawling of this sub-set by the base system); the "IMPORTED" region represents the part of the company network composed of pipes imported from the base network; the "ADDITIONAL" region represents additional pipes linking company resources to each other and with Web pages from the IMPORTED region.

Methods of calculating pipes and scores are usually neutral and applied uniformly in the base network and in company networks, while they can be special (i.e. customised) in customised networks. Some request results may be put into customised networks (as introduced above).

In general, network pipes may be imported from any other network[59]. Thus, other pipes in the network managed by a given system[60] can be references to network pipes in other systems (their widths thus being determined from these other systems). The user can configure methods of combining pipe widths[61].

[59]Part of the network can be an enriched transclusion of a part of another network.

[60]In this case, we refer particularly to systems in server mode, but analogue properties are provided for systems in client mode (see "Request Handler" section).

[61](originating from transclusions themselves using the same pipes)

It should be emphasized that the user of a customised network potentially benefits from all enrichments made on the upstream side of the graph, which may for example comprise selections in the form of advertising[62].

[62]Thus, to benefit from "local" advertising at the same time as advertising targeted to his fields of interests, the user will form his system by transclusions both from "local" networks (in the geographic sense) and networks covering the fields in which he is interested.

A user can contribute modifications that he made in his network to the upstream side of the graph, and the owner of the network on the upstream side of the transclusion concerned can decide whether or not to accept this contribution. Users can thus communicate relevant resources to each other.

Each system is itself capable of estimating its knowledge of the domain of each selection forming part of a request (this is described later in the "Distiller" section). He can thus decide to delegate all or some of a request to a system that has the knowledge in question and with which it is connected in Peer-to-Peer (as described later).

Principle of the Calculation of Relevance Scores

The principle of the method used to calculate scores of selections from a score propagation network is described below ($1_{ij}$ is the width of the pipe linking selection i to selection j, equal to zero if there is no pipe). It is assumed that the sum of the width of pipes output from a given selection is equal to one[63]:

$$\forall i \cdot \sum_j l_{ij} = 1.$$

[63]If this is not the case, normalisation is done on the network before starting the first step.

In a first step, the scores of all selections are initialised so that the sum of scores is equal to one:

$$\forall i \cdot x_i(0) = \frac{1}{n}$$

(n is the number of selections on which the algorithm is started).

In the next step, the approach is to recalculate the score of all pages[64] iteratively:

$$x_j(t+1) = \sum_i l_{ij} x_i(t) \ldots \text{ and } x_1 = \lim_{t \to \infty} x_i(t)$$

[64]And in the case in which values oscillate and never converge, the approach will be to use an inertia factor:

$$x_i(t+1) = \overline{\alpha}\left(\sum_i l_{ij} x_i(t)\right) + \alpha x_i(t).$$

The inertia $\alpha$ is a constant between zero and one. 0 results in no inertia (risk of oscillation) and 1 prevents any variation (large values slow convergence and 1 prevents any convergence).

However, in this description we will use the concept of score sources described above. In particular, this enables the system to give relative scores to a request[65]. For example, starting from a request consisting of a set of selections R, we can define $s_i$, the score source for selection i, as follows:

$$s_i = \begin{cases} \frac{s}{|R|} & \text{if } \in R \\ \text{else } 0 \end{cases}$$

(where s in this case is a magnitude between zero and one that expresses the importance of the request. If it is equal to zero, the result is independent of the request and the absolute case is obtained; if it is equal to one, then only pages from the request will have a non zero score)

[65]In the remainder of the description, we will also use the approach by score sources to calculate absolute scores (also described above).

Scores are initialised in the same way as in the previous case:

$$\forall i x_i(0) = \frac{1}{n}$$

The quantity $s_j$ is added to the score of the selection j in each iteration. In order to keep the sum of the scores constant[66], the first step will be to multiply each score by a constant $\overline{s}$ equal to the one's complement of s:[67]

$$x_j(t+1) = \overline{s} \sum_i l_{ij} x_i(t) + s_j$$

and $$x_i = \lim_{t \to \alpha} x_i(t)$$

(Refer to the beginning of this report ("Search by score propagation" section) for a variant of the same method).

[66] Note that it would be useless to carry out a normalisation step because unlike the absolute score calculation algorithm, it is done implicitly by terms s.

[67]Inertia can be added in the same way as in the previous equation:

$$x_i(t+1) = \overline{\alpha}\left(\overline{s} \sum_i l_{ij} x_i(t) + s_j\right) + \alpha x_i(t)$$

Numerical Example

Figure 12:
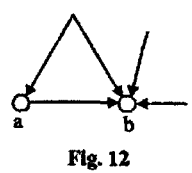
FIGS. 12 to 17 show simplified examples of relevancy score propagation networks.

Consider two selections a and b with a common incoming link, a having a link to b and b having two additional incoming links (see FIG. 12). We will use s=0.5 and R={a}.

Figure 13:
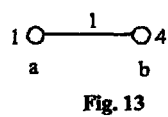

In this description, we will use co-citations to build up the score propagation network presented in FIG. 13. a is co-cited once with itself (since it has one incoming link) and once with b, and b is co-cited once with a and four times with itself (it has a total of four incoming links).

Figure 14:
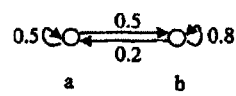

As already mentioned, there are several ways of normalising (such that the sum of outgoing pipe widths is equal to one). It will be assumed that after normalisation, we will obtain a pipe width of 0.5 linking a to itself and a pipe width of 0.5 linking a to b, a pipe width of 0.2 linking b to a and a pipe width of 0.8 linking b to itself (see FIG. 14).

The initial values of a and b are 0.5 (for this example we will only work on a and b, therefore n=2).

Scores will be updated with $x_a(t+1) = \overline{s}(l_{aa} x_a(t) + l_{ba} x_b(t)) + s_a$ and $x_b(t+1) = \overline{s}(l_{ab} x_a(t) + l_{bb} x_b(t)) + s_b$, and therefore $$X_a(t+1) = 0.25 \cdot x_a(t) + 0.1 \cdot x_b(t) + 0.5 \text{ and } x_b(t+1) = 0.25 \cdot x_a(t) + 0.4 \cdot x_b(t).$$

The first values calculated by the algorithm are given below:

| $x_a$ | $x_b$ |
|---|---|
| 0.5 | 0.5 |
| 0.675 | 0.325 |
| 0.7013 | 0.2987 |
| 0.7052 | 0.2958 |

It can be seen that the values converge.

Figure 15:
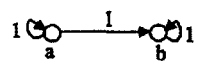

If we had taken hypertext links instead of co-citation pipes, the network would have been[68] as shown in FIG. 15 (for the normalisation, there is one pipe from each selection to itself).

[68]To simplify methods, we will continue to assume that the algorithm is only executed on pages a and b, i.e. scores of the three pages possessing these links to a and b are not calculated.

Figure 16:
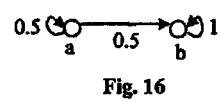

The result is $1_{aa}=0.5$ and $1_{ab}=0.5$ $1_{aa}=0$ and $1_{bb}=1$ (see FIG. 16).

We will now make a weighted average between the pipe network along the hypertext links and the co-citations network (but once again here, other methods could be envisaged).

Figure 17:
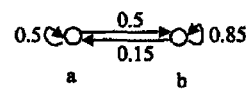

The average of this network with the other (with weight ¼ for links and ¾ for co-citations) gives $1_{aa}=0.5$ and $1_{ab}=0.5$, $1_{ba}=0.15$ and $1_{bb}=0.85$ (see FIG. 17).

The remainder of the algorithm operates in the same way.

Advantages:

The well-known "PageRank" algorithm propagates scores only along hypertext links. Propagating scores along pipes, for example if they are calculated from co citations, gives priority to selections that would otherwise not have been proposed.

For example, consider the following two extreme cases:

In the first case, a selection is strongly co-cited with a selection having a good score, and in the second case, several selections having a good score have a link to the same selection.

An algorithm (PageRank type) exclusively following the links will work well in the second example but not in the first, and conversely an algorithm exclusively using co-citations will work well in the first example but not in the second.

A hybrid algorithm, in other words capable of propagating the score both along co-citations and links, will discover interesting pages in both cases.

In general, the pipe concept provides a means of combining several methods of searching for relevance relationships (including manual modifications) so as to obtain the best results.

Thus, for each domain in which expert users have made their modifications to the relevance propagation network, the system will give better results than a completely automated engine.

The possibility of combining pipes originating from the upstream side in a distributed network architecture will thus be particularly advantageous.

Other Advantages:

The pipe network is independent of requests[69]. Users can choose to share the same network and all modifications made to this network by the different users can be used at the same time.

[69]Each network represents the relevance of selections with respect to each other, for a user or a set of users, regardless of his requests. Nevertheless, different networks (for different centres of interest) can be created by (or for) the same users.

Network exchanges between users is facilitated by the use of transclusions; one user can use the network of another user, by making a transclusion in a document located in his system, and he can then modify it, reduce it or enlarge it to adapt it to his needs, simply by editing the document containing the transclusion result. Equations are linear in s (i.e. scores obtained for the linear combination of several requests will also be equal to the corresponding linear combinations of scores obtained for basic requests), which means that requests can be broken down into more elementary requests that can then be recomposed differently. Thus, these elementary requests can be calculated and memorised and composite results can then be obtained without having to repeat the calculations.

For example, in a space of seven selections from 0 to 6, namely three requests $R_1=(1; 2; 3)$, $R_2=(5; 6)$ and $R_3=(1; 2; 3; 5; 6)$ (taking s=0.5). Their corresponding values of $s_i$ are (C; ⅙; ⅙; ⅙; 0; 0; 0), (0; 0; 0; 0; 0; ¼; ¼) and (0; 1/10; 1/10; 1/10; 0; 1/10; 1/10).

It can be seen that the values $s_i$ of $R_3$ are a weighted average of the corresponding values $s_i$ for $R_1$ and $R_2$ (with weightings of ⅗ and ⅖ respectively). By linearity, the scores $x_i$ for $R_3$ are the average with the same corresponding weightings of $x_i$ for $R_1$ and $R_2$.

Linearity is used particularly in the presentation of results to the user and in the Peer-to-Peer delegation method described below.

We will describe later how we will use a set of "authority" selections with high absolute scores to avoid the need to carry out the iterative algorithm described above for the score calculation for each request (see "optimised relative calculation algorithm"). The score of a selection for a given request may be obtained by calculating the score quantity that it would send to each authority selection, $\tilde{x}_a$ for each selection in the request, and then taking the average of the scores $x_a$ weighted by the scores obtained by these selections a. Therefore, page scores can be calculated very quickly by calculating the distributions of scores $\tilde{x}_a$ and $x_a$ for all values a.

Presentation of Results to the User

We have described how the system calculates scores for selections starting from a set of selections (in other words a request) given by the user (this request being taken in its globality). We will now describe how the system can trace relevance relationships if required between each result selection[70] and each selection of the request taken separately, when it presents the result of the request. The steps are as follows[71]:

1. Relative scores are calculated considering all selections in the request taken together (as already described).

2. Only selections with the highest scores are kept, and their scores are recalculated with respect to each selection in the request (taken separately as a request by itself). Thus, the scores of each result selection are available for each selection in the request[72].

3. Each selection in the request is linked with each selection in the result with a sufficiently high score for the selection (the width of the relationship thus traced[73] depends on this score).

[70](the result only contains selections with the highest scores)
[71]This method is efficient when the optimised relative algorithm described in the "Distiller" section is used.
[72]Sub-sets of the request could be used as a variant.
[73](for example the line thickness, when an arrow is drawn to represent this relationship).

Navigation Context

The concept of a navigation context can be used at the time that relevance selections are given to the user. The navigation context is the set of selections that the user has seen or selected factored by a weight representing its importance in the existing context.

The weight of each selection reduces with time when the user does not return to see old selections, the weight increases when he makes a request on a set of selections, and so on.

The context is taken into account for each request made by the user, by taking a weighted average between the context and his request before processing it.

Since score sources in a request must all add up to 1, it will be required that the sum of all weights in a context is always equal to 1.

The following is an example of how the context is calculated:
- When the user displays a selection, the weight of all context selections is multiplied by a constant (expressing the weight of the past in the context) and the weight of the viewed selection is increased by the complement of this constant (expressing the importance of simply viewed selections)
- When the user sends a request, the weights of all context selections are multiplied by a constant and the weight of all selections forming part of a request are increased (always in the context) so as to compensate for the multiplication. The result is both the new context and the request sent to the system.
- The context is initially empty, and the first modification that the user makes to it must allocate a zero weight to the past.

Considering that all operations carried out on the context can be expressed in linear form ($C^+ = \lambda C + \bar{\lambda}\Delta$, with the sum of weights in $\Delta$ equal to 1), and due to the linearity of the algorithms used, it is possible to memorise scores due to the context and afterwards to only calculate scores due to the second term $\Delta$). The scores can then be combined with the context using the same weighting $\lambda$.

Numerical Example:

The user displays the selection 1, the context gives $1 \to 1$ (the past does not have any weight in this first step because it does not exist; this selection is allocated a weight of 1 so that the sum of terms in $\Delta$ is equal to 1).

The user makes a request for selections 2 and 3. The term $\Delta$ is the set of score sources in other words $\{2 \to \frac{1}{2}; 3 \to \frac{1}{2}\}$ (as explained above, their sum must be equal to 1). By giving a weight of 0.25 to the past when requests are made, the new context is $\{1 \to \frac{1}{4}; 2 \to \frac{3}{8}; 3 \to \frac{3}{8}\}$.

The user then displays selection 2. By allocating a weight of 0.75 to the past during display, the new context is $\{1 \to \frac{3}{16}; 2 \to \frac{9}{32} + \frac{1}{4}; 3 \to \frac{9}{32}\}$. In this case the term $\Delta$ is $2 \to 1$, multiplied by the factor $\bar{\lambda}$ that is equal to $1 - \frac{3}{4} = \frac{1}{4}$.

User Interface

Document Editor

The interface is used to request that the relationship between two selections is displayed in a document, regardless of whether it is a semantic relationship, a pipe imposed by the user or an implicitly calculated value.

The interface is used to make a transclusion for which the result is placed in a document.

When the relationship between two selections has to be displayed and at least one of the selections is a transclusion, the interface will superpose relationships starting from or arriving at the source (and possibly from the source of this source and so on), and from or to the result of this transclusion.

The user can then modify the relationship in the document, and the change will automatically be reflected in the network.

When a new relationship is created from or to a transclusion, the system proposes to return the ends of this relationship to the sources of transclusions, so that relationships between the sources can thus be created (for example that may be web pages).

For any selection created by a user of a system in client mode, a reference will be sent in the server so that the server can take account of it in the score calculations.

Relationships that the user creates (or modifies, deletes, etc.) will be memorised in the system, either in client mode or in server mode. If it is in client mode, the interface proposes a means of sending these pipes to the server (so that they can be used for other client systems of the same server).

This interface can be integrated into a standard editor such as Word.

Network Viewer

The user can also ask to see the entire relationships network (relationships added by the user and automatically calculated relationships) in the neighbourhood of a selection. Once again, relationships from or to the sources of a transclusion are "descended" in the displayed graph. The user can also add/delete pipes and semantic relationships in this interface.

In order to help with the display, the user can ask to see only specific relationships, in other words to activate or deactivate the display of relationships obtained by subscription (subscription by subscription selectively), or activate or deactivate display of some types of semantic relationships, and so on, all means of calculating pipe widths may or may not be selected to display relationships.

The user can also configure the way in which widths are calculated by default.

The interface used to do this is in the form of a list of ways of calculating pipe widths (co-citations, hypertext links, explicitly given pipes, subscriptions, etc.), at each line (except in the case of subscriptions and pipes given explicitly) the user can indicate the weighting, and if the weighting is not zero he can indicate whether or not to activate the display of the corresponding pipes. In the case of subscriptions and explicitly given pipes, there is an option to either make or not make them active for the calculation, and here also, if they are active, there is an option to display or not display them in the network representation.

More specifically, this can be done with a two-column display, the first used to weight the corresponding calculation (or to activate/deactivate it) and the second to display or conceal relationships in the representation.

Requests

The user can select a set of selections (transclusions or other) as a request and ask the system to propose relevant selections to him for this set, either in the document editor or in the network viewer. He then receives a list of selections that he can use to enrich his document.

Each selection is associated with a path that is a list of names such as "/companyA/divisionB/departmentC/", to enable the system to organise the results of the request. Selections found on the Web will then have a path such as ":web/http:// . . . ".

The system may for example represent all nodes existing in the company in the tree type interface, and the user can choose whether or not he wants to see only the nodes that contain results.

The user can open or close nodes and reorder the children of a node and the system reacts by presenting the results in the same order as the nodes of the tree and sorting the results located in a closed node as a function of their scores. Modifications made to the tree are memorised, in other words the tree will be presented in the same way in the next request.

The user can also ask that only results from some specific nodes in the tree are returned to him (in particular he will limit himself to the paths containing selections that he can access).

Context Manager

Finally, the system provides the user with tools to manage the context (for example to delete selections, reset it or temporarily deactivate it, to save it so as to use it again later, etc.).

Main Components of the System

The Crawler

This part of the system explores the network of web hypertext links at the request of other modules. It will also periodically check to see if sets of incoming and outgoing links of selections have changed, and checks selections that received requests from other modules more often.

Anti-Nepotism

The score calculation algorithms described above have the disadvantage that when pages in one set are strongly linked to each other, any page outside the group will have a bad score relative to pages within the group.

There may be two reasons why the pages of one set are strongly linked to each other. Firstly, in the case in which the set includes all pages of a site and each page contains the table of contents for the site (and therefore has a link to all others). The second case is when page authors would like to obtain a better score in search engines based on links, by citing each other. This situation is called nepotism.

Figure 18:
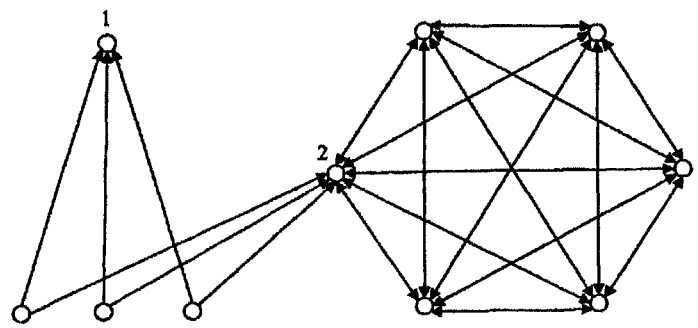
FIGS. 18 to 20 illustrate the attenuation of the effect of links between strongly linked pages.

As mentioned above, the reason is that equations are based on the concept of co-citation, and that only pages frequently linked in common with a page in the group can obtain a good score. In the example presented in FIG. 18, a group of six pages cite each other strongly (assuming that it is the example of the table of contents). Page 1 should obtain a good score relative to page 2, because apart from browsing links, all pages pointing to page 2 also point to page 1. However, the equations will only see that only three of the eight pages pointing to 2 also point towards 1.

In order to reduce this effect, the effect of links between strongly linked pages will be attenuated, such that other links can have a stronger effect.

In practice, we will say that when it is known that the two ends of a link are similar (similarity being calculated by a homogeneity equation), the weight of this link will be reduced (the weight being a value between zero and one, where zero is equivalent to no link). The weight of a link is equal to the complement of the homogeneity of the two ends (this homogeneity obviously being calculated without considering the weight of links) and limited between zero and one.

In the above example, links internal to the site connect very similar pages (because the two ends are linked in common by many pages) while others link low similarity pages (few pages, in fact none shown in the drawing) point to the source and also to the target of this link.

Figure 19:
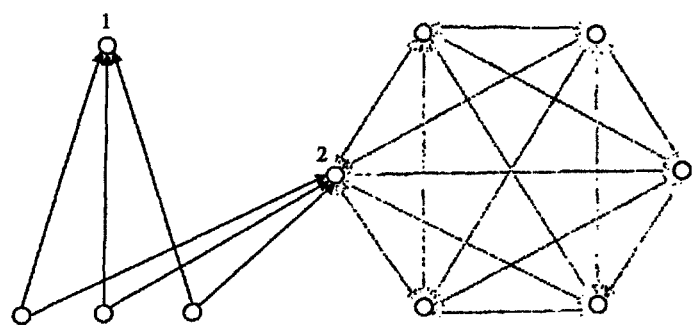

The result after correction is shown in FIG. 19 (the link is shown in lighter print to symbolise the fact that its weight is lower).

The homogeneity of pages 1 and 2 will be high.

Figure 20:
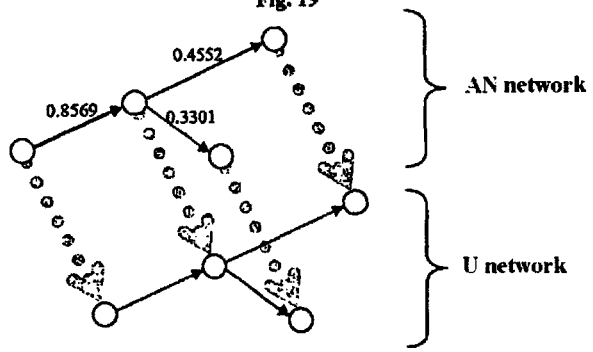

In order to use this anti-nepotism method, a network (AN) will have to be constructed parallel to the network of pages (U for underlying) that will be used by algorithms (see FIG. 20). The summits of U are copies of the summits of AN, in other words pages.

A weight is associated with each edge (link) equal to the complement (1−x) of the similarity (homogeneity) of the two linked pages, calculated in the network U. This network is constructed lazily, in other words the nodes and links are created when they are queried, to prevent it from being too cumbersome.

The cardinality of a set of links in AN is replaced by the sum of the weights of these links. (For example, the number of inverse links is replaced by the sum of the weights of inverse links). The sum of the scores of inverse links is replaced by the sum of products of the scores and weighting of the corresponding link.

The cardinality of the union of two sets of links is calculated as follows. The contribution of one link present in only one of these sets is equal to its weight. The contribution of a link present in both sets is equal to the logical sum of their weights, in other words 1−(1-a)(1-b).

The cardinality of the intersection of two sets of links is the sum of the products of the weights of all links present in the two sets.

The Piper

This module calculates widths of pipes between selections (as a function of configuration by the user, by co-citation along hypertext links, by text analysis, translating semantic relationships, by using a value imposed by the user, or pipes obtained by transclusion).

The system will memorise pipes obtained by transclusion in the network, and these pipes will be updated when the user views documents containing these transclusions.

The system will choose one of the following values for the width of the pipe between two selections, in order of priority:

1. A pipe width or a semantic relationship given by the user
2. A pipe width supplied by transclusion
3. The automatically calculated pipe width (co-citation, etc.).

All pipe width calculations are made dynamically (although obviously precalculated values can be memorised).

Therefore in addition to pipe widths, this module can also be asked how a particular pipe was calculated so that it can be displayed in a document (for example what type of semantic relationship was placed, or if it is a fixed value imposed by the user).

Special Pipes Between Selections and Requests

Optionally, the system can be configured to introduce artificial nodes into the network, each node representing a request. Two-directional pipes between the request and selections resulting from the request (selections with the best scores) are then placed, the widths as a function of the scores for the request concerned.

Thus, pipes with special requests can be placed, such as requests using a "relative distillation" method described below.

When the user has chosen to publish a part of his network, this module will be responsible for building data to be sent, in other words all pipe widths obtained through a transclusion themselves, or explicitly supplied by the user.

Preference for New Pages

This section describes an accessory component of the system that can be used for monitoring on the Web. The system must be capable of suggesting pages that have just been created, even if the relevance of the page based purely on hypertext links is low.

If the page has just been published on the web[74], it is probable that few people know it and consequently few pages point to it, even if it is actually a very good page. Therefore, its relevance has to be calculated in some other way, so as to give it a chance to appear among suggestions made to the user.

[74]Obviously, instead of a page, it could be a selection for example published only within the company. In this section, "page" can be replaced by "selection".

The reliable region concept will be used as a basis, which is a part of a page that only points to pages that the system knows are good.

For a new page discovered in a reliable region, a greater weight will be given to pipes calculated from word distributions, and after the page has been in the system for a given time, the system will reduce the importance of these word pipes and increase the importance of pipes calculated using hypertext links, until the word pipes are eliminated completely. More precisely, a weight $\tau$ is given to pipes obtained by word distributions and a weight $1-\tau$ is given to pipes obtained by hypertext links. $\tau$ is equal to 1 when a page is discovered (either in the unknown state or in the new state, see below for the definitions), and decreases linearly to reach 0 at the moment at which it changes to the old state. Therefore, the value of τ is strictly between 0 and 1 for pages in the unknown state although word pipes are not applied at all.

Definitions

Each page is associated with a state that may be:
- unknown: The page was discovered by downloading other pages on the Web and it is not known whether it is new or old. The page discovery date is memorised in the structure, so that it can be put into the old state after some time.
- new: The page has not been known by the system for very long, and it appeared in a reliable region. Note that an existing page that is already in the unknown state can change to the new state if it is seen to appear in a reliable region but the date on which it will change to the old state remains unchanged.
- old: The page has been known by the system for a sufficiently long time.

Construction of Reliable Regions

The following describes the algorithm used to build reliable regions.

Firstly, a global score has to be attached to each web page, that is calculated by making a request containing all authorities (the global score for a page i is calculated as $$\frac{1}{|A|}\sum_{a \in A} x_a(i)).$$

The next step is to select a set of candidate pages to shelter a reliable region as the union of incoming links of pages with the best global scores.

For each of these candidate pages, the sum of the global scores of pages linked by hypertext links is made, and pages with the highest sums are then downloaded.

Reliable regions are defined as being the largest regions for which all hypertext links to old pages point to good pages. "The largest" means that any region encompassing the region in question contains a link to an old page with an insufficient global score.

A word distribution of a document is defined by a set of pairs (word, frequency) associating an occurrence frequency with each word present at least once in a document (the frequencies also need to be normalised by dividing them by the sum of the squares so that the sum of their squares is equal to one).

A scalar product of two distributions is equal to the sum of the products of occurrence frequencies in each of the documents, for all words. The number will be close to one if the documents use the same vocabulary and otherwise it will be equal to zero.

When a page enters the new state, the system will download it and construct its word distribution, and the scalar product will be made using its word distribution and word distributions of pages with a good global score, and a two directional pipe will be placed between the new page and each good page with a width equal to the corresponding scalar product, divided by the number of authorities (in the direction from the new page to the good page). A pipe is added to the new pages connecting them to themselves equal to the complement of the sum of the outgoing pipes, so that the sum of outgoing pipes will be equal to one.

Since these values are calculated once and for all, the word distribution of new pages can be destroyed once these values have been obtained (but the word distributions of good pages can be kept in readiness for the next new pages).

The Distiller

A set A of "authority" selections will be used, to avoid the need to perform the iterative algorithm described above to calculate scores for each relevant page request.

This set is built up by calculating the scores of selections in an absolute manner starting from the domain(s) (in the form of a set of pages given by the user, particularly at the time of initialisation) in which the user would like the system to be precise. The pages with the highest scores will form this set, and as the set becomes larger, the system load increases but the results also become more precise.

In order to further improve the results, preference is given to the selections of A that are "far" from each other, in other words that do not have good scores with respect to each other; this stops the algorithm from being very good in a small region and imprecise elsewhere.

Authority Selection Algorithm

The following is an algorithm for construction of the set A, to be run when the system is initialised and that can be rerun (or resumed in order to increase the width of A) when the set of selections known to the system increases sufficiently. In this algorithm, W represents the set of selections, x(p) represents the absolute score of selection p and $x_p(q)$ represents the score of selection q relative to p.

The representativeness r(p) is defined as follows:

$$r(p) = x(p) - \tau \max_{\alpha \in A} (\max(x_\alpha(p), x_p(a))),$$

which means the absolute score minus the largest relative score involving p and a selection of A (that represents the "distance" of the candidate selection p with the distances already taken) (with a weighting factor τ). τ is a constant. A low value of τ indicates that it is preferred to have selections with a good absolute score, and a high value indicates that it is preferred to have one of the selections far from each other.

A is initially empty. The selection of W with the highest representativeness is then added, for as long as it is required to enlarge the set A.

Optimised Relative Calculation Algorithm

We will now describe the score calculation algorithm based on this set of authority selections.

Let $x_j(i)$ be the score of selection i for the request composed of the selection j alone, calculated using the algorithm described in the introduction.

Let $\tilde{x}_j(i)$ be the score of selection i for the request composed of the selection j alone, calculated on a score propagation network in which all arrows have been inverted from their direction in the real network (in other words the term $l_{ij}$ is replaced by the term $l_{ji}$ in the algorithm)[75],[76], and previously in which all authority outgoing pipes are zero, except for pipes linking authorities to themselves that were set to one, in other words the term $l_{aj}$ (before inversion of the arrows) will be allocated to 1 if a=j otherwise 0[77].

[75] The inverted network is not necessarily normalised, however the algorithm will still converge to the right value: Let $\bar{S}$=1−s, let L be the pipes matrix, and $x_j$ the $j^{th}$ column of the solution matrix X in $(1-\bar{S}\cdot L^T)\cdot X$=s.l. This equation is equivalent (by transposition and by XY=I if YX=I) to $(1-\bar{S}\cdot L)\cdot X^T$=s.l.$\tilde{x}_j$ which is the $j^{th}$ column of $X^T$ (equal to the $j^{th}$ line of X) is therefore effectively calculated with the same algorithm as the $j^{th}$ column of X on the transposition of the pipes matrix.

[76] As already mentioned, there is no need to normalise scores in the relative algorithm: this is particularly important since in this case, the sum of the results is not usually equal to 1 (and normalising would distort the result).

[77] Therefore the terms $l_{ja}$ where l≠a are not touched.

In precalculating the distributions of scores $\tilde{x}_a$ and $x_a$ for all values of a, the next function can be calculated very quickly.

It gives a score to page j for a request R represented by a weight allocated to some pages (the term $R_i$ is defined as $s_i$ in the algorithm described initially):

$$\hat{x}_R(j) = \sum_{a \in A} \left( \sum_{i \in R} \tilde{x}_a(i) \cdot R_i \right) \cdot x_a(j).$$

The principle is as follows: the quantity of score that would be sent to each authority selection is calculated for each selection in the request, and then the average of the scores $x_a$ weighted by the scores obtained by these selections a is calculated. Thus, the behaviour that the basic algorithm would have had for the request R is reconstructed, with the restriction that only score propagations that transit at least once through a selection of A are taken into account.

When there are some paths that do not touch A, the value of the score $\hat{x}$ will be too small, but this is not important because it is assumed that the selections of A are chosen to obtain points (in the domain interesting the user) easily affected by score flows in the pipes. It may also be advantageous to only memorise sufficiently large values $\tilde{x}_a(j)$ and $x_a(j)$), which will also produce a downwards error.

Considering that the approximation will always give a low value for the scores, the error can be estimated by making the sum of all scores of a response to a request.

$$\sum_j \hat{x}_R(j) = \sum_j \sum_{a \in A} \sum_{i \in R} \tilde{x}_a(i) \cdot R_i \cdot x_a(j) \cong \sum_{i \in R} R_i \cdot \sum_{a \in A} \tilde{x}_a(i).$$

The factor $$\sum_{a \in A} \tilde{x}_a(i)$$

expresses the system's knowledge about the selection i: a value equal to 1 means that a request on this selection will give precise scores (in other words $\forall_j \tilde{x}_R(j) = x_R(j)$). As the value becomes smaller, the error will become larger.

Therefore, the distiller is responsible for memorising values of functions $\tilde{x}_a$ and $x_a$ for each selection of A and for keeping them up to date.

Numerical Example

Figure 21:
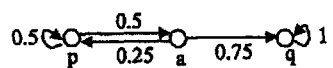
FIGS. 21 to 23 depict an example of score calculation based on a set of authority selections.

Consider the "true" score propagation network presented in FIG. 21, with three selections p, a, and q.

The set A={a} and request R={p} are chosen.

We will start by calculating the functions $\tilde{x}_a$ and $x_a$.

Figure 22:
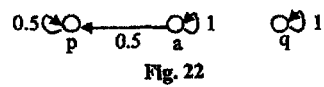

If all pipes output from selections of A are removed and if a pipe connecting each selection of A to itself is added with a width of 1, then inverting all the pipes will give the "transformed" network in FIG. 22.

On the transformed network, the relative score calculation algorithm with {a} as the request and s=0.5 (therefore $s_a$=0.5 and $s_p$=$s_p$=0) uses the following equations (p, a and q represent the scores of the three selections during application of the algorithm):

$p(t+1) = \frac{1}{4}p(t) + \frac{1}{4}a(t)$ $a(t+1) = \frac{1}{2}a(t) + \frac{1}{2}$ $q(t+1) = \frac{1}{2}q(t)$ Convergence values are the values $$\tilde{x}_a : \lim_{t \to \infty} p(t) = \tilde{x}_a(p) = 1/3,$$

$$\tilde{x}_a(a) = 1$$

and $$\tilde{x}_a(q) = 0.$$

If A contains more than one selection, this step must be repeated for each selection.

The normal algorithm (always with {a} as the request) on the true network will be done to obtain the values $x_a$.

In this case, the transformation equations are as follows (using the same variable names):

$p(t+1) = \frac{1}{4}p(t) + \frac{1}{8}a(t)$ $a(t+1) = \frac{1}{4}p(t) + \frac{1}{2}$ $q(t+1) = \frac{3}{8}a(t)$ Convergence values are the values of $x_a$:

$$\lim_{t \to \infty} p(t) = x_a(p) = 2/23,$$

$$x_a(a) = 12/23$$

and $$x_a(q) = 9/46.$$

Once again, this step must be done for each selection of A if there is more than one selection (which is not the case in this example).

We can now apply the definition of $\hat{x}$ for example using p as a request:

$\hat{x}_p(q) = \tilde{x}_a(p) \cdot x_a(q) = \frac{1}{3} \cdot \frac{9}{46} = \frac{3}{46}.$ Since all trajectories that scores can follow from p to q pass through a, exactly the same value is obtained as the basic algorithm would have given with $x_p(q)$ as demonstrated below:

In this case, the score variation equations (based on the true network) are as follows:

$p(t+1) = \frac{1}{4}p(t) + \frac{1}{8}a(t) + \frac{1}{2}$ $a(t+1) = \frac{1}{4}p(t)$ $q(t+1) = \frac{3}{8}a(t)$ which converges to $$\lim_{t \to \infty} p(t) = x_p(p) = 16/23^{78},$$

$$x_p(a) = 4/23$$

and $$x_p(q) = 3/46.$$

The Request Handler

A request to this component consists of a set of selections, possibly a set of modifications to be made to the server network (that is used by the client mode described below), and a set of filters on selections to be returned (that will be used particularly to return only selections to which the user has access), and it replies with the set of selections with the highest relevance score for this request (the score of each returned selection is also returned).

As mentioned in the introduction, the system can be used in two ways, either it does all the calculations itself (server mode) or it uses another system providing it with modifications (i.e. modifications/additions/deletions) that the user made to the score propagation network of the other system (client mode).

In client mode, this module will simply return the request to a server, accompanied by all modifications made on the score propagation network.

In server mode, if the request does not ask for modifications to the score propagation network, this module simply calculates the function $\tilde{x}_R$ defined above. When a filter had been given on the selections, only the scores of selections satisfying the filter will be calculated (in other words it is applied on the score distributions $x_a$ before doing the weightings and additions)

If modifications have to be made to the server network[79], this module will modify the request so as to simulate the effects of changes made to the server network in this request.

[79] This algorithm operates even for selections that do not have any incoming or outgoing pipes in the server network, unlike the modified network, and this will automatically occur when a user of the client system has created selections that he alone can access and therefore for which he alone has added pipes.

This algorithm operates as follows:

Consider the set of $l_{ij}$ for the server network and $l'_{ij}$ for the modified network.

The result of the request must appear to be applied to the network $l'_{ij}$ and it must satisfy the equation $$x_j = \bar{s} \sum_i l'_{ij} x_i + s_j.$$

Considering that the server calculates the equations on the network $l_{ij}$, the equation is changed to become $$x_j = \bar{s} \sum_i l_{ij} x_i + \left( s_j + \bar{s} \sum_i (l'_{ij} - l_{ij}) x_i \right).$$

The parentheses contain the value s', the modified request $$s'_j = s_j + \bar{s} \sum_i (l'_{ij} - l_{ij}) x_i.$$

Since it depends on the result itself, this request will be approximated iteratively, in other words an estimate[80] of the result of the request is necessary to calculate the modified request, and the results of the modified request are used to calculate a more precise modified request, until convergence[81] of values x that can then be returned in response to the request. The closer the first estimate of the request is to the real value, the shorter will be the convergence, however the algorithm will tend to the same value regardless of the initial values.

[80] There is no need to calculate $x_j$ values except for values for which the factor $l'_{ij} - l_{ij}$ is not zero for at least one i.
[81] It may be necessary to use an inertia factor as already seen in the previous algorithms, to prevent oscillations.

Numerical Example

Figure 23:
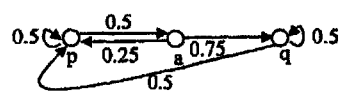

After modification of the network in the previous example, the network presented in FIG. 23 is obtained.

The request will be composed of selection a.
⅓ will be used as the first estimate for all scores.
The modified request is as follows:

$$S'_p = s_p + \bar{s} \cdot (l'_{qp} - l_{qp}) \cdot q = \tfrac{1}{4} q$$

$$S'_a = s_a + \bar{s} \cdot (l'_{qa} - l_{qa}) \cdot q = 1$$

$$S'_q = s_q + \bar{s} \cdot (l'_{qq} - l_{qq}) \cdot q = -\tfrac{1}{4} q$$

The score of q for the request s (passing through the authorities) is $(\tilde{x}_a(p) \cdot s_p + \tilde{x}_a(a) \cdot s_a + \tilde{x}_a(q) \cdot s_q) \cdot x_a(q) = (\tfrac{1}{3} \cdot s_p + s_a) \cdot \tfrac{9}{46}$.

The first iteration give $s'_p = \tfrac{1}{12}$, $s'_a = 1$ and $s'_q = -\tfrac{1}{12}$.
The score of q for this request is $q = 37/192 \cong 0.1927$.
The second iteration gives $s'_p = 37/768$, $s'_a = 1$ and $s'_q = -37/768$.
The score of q for this request is $q \cong 0.1988$ and so on.

Assuming $q = 0.1989$, the following results are obtained for the request:

$$p = (\tfrac{1}{3} \cdot s_p + s_a) \cdot x_a(p) \cong 1.0166 \cdot 2/23 = 0.0884$$

$$a = (\tfrac{1}{3} \cdot s_p + s_a) \cdot x_a(a) \cong 1.0166 \cdot 12/23 = 0.5304$$

$$q = (\tfrac{1}{3} \cdot s_p + s_a) \cdot x_a(q) \cong 1.0166 \cdot 9/46 = 0.1989$$

Architecture

Figure 24:
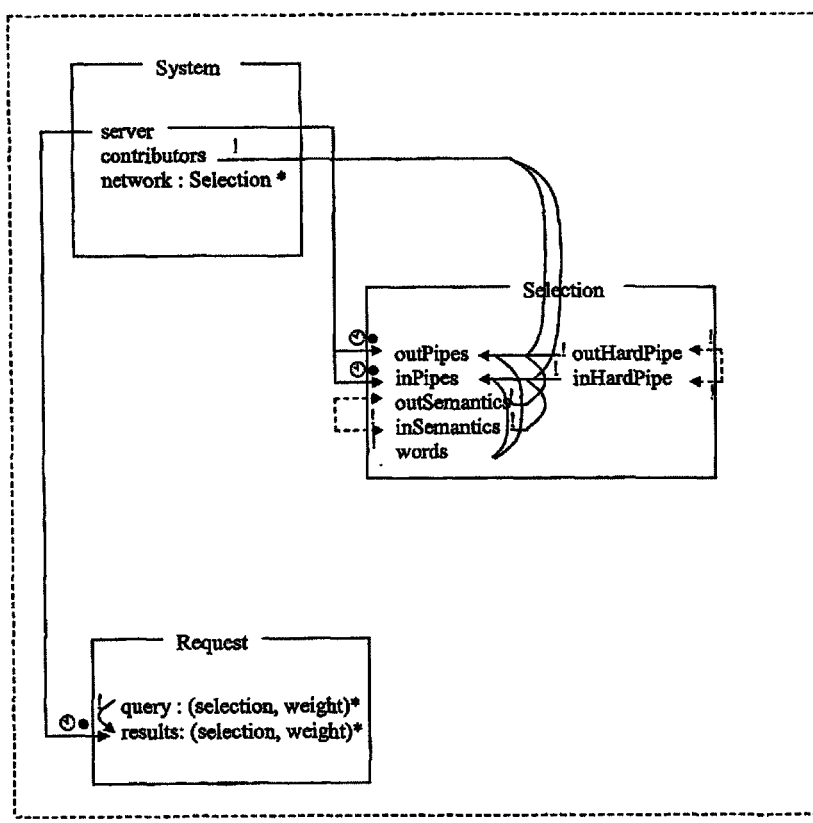
FIGS. 24 and 25 show data managed by the system and dependencies that link them, respectively in client and server modes.

The diagram in FIG. 24 shows all data managed by the system and dependences that link them.

Rectangles represent classes.

A name inside a class represents data attached to each instance of the class.

The asterisk * represents multiplicity.

An arrow represents a dependence between two data items (called source and target of the dependence). A dependence contained entirely in a class connects attributes of a single instance of the class.

When a dependence is triggered, the target data is recalculated.

A • or ! symbol at the end of a dependence indicates the strength of the dependence, which may be weak or strong.

A dependence is strong if triggering it makes the target data inaccessible until it has been updated, and weak if the target data remains accessible during its update (in this case, if the target data is queried, the old value will be returned until the update is complete).

The end at which the strength symbol is located indicates the trigger (the initiative) of the dependence:

It is located on the side of the target if it is a "pull" dependence, which means that the freshness of the source is verified (and if necessary the target is updated) at each request of the target data.

The strength symbol is located on the same side as the source if it is a "push" dependence, which means that the target is updated when the source changes.

The ⊕ symbol placed on a dependence means that the dependence is only verified if the most recent update of the target is old enough.

The dependence for which the source is the symbol indicates that the update to the target is made automatically at regular intervals.

The dependence shown in dashed lines means that the update is made synchronously, in other words a modification to its source is not complete until the update of the target has been finished (and can be applied by a simple function call, unlike other dependences that have to be implemented by separate threads).

Note that these diagrams show that all calculated data can be memorised and refreshed as a function of needs (described by dependences), or not memorised and recalculated on each request.

Figure 25:
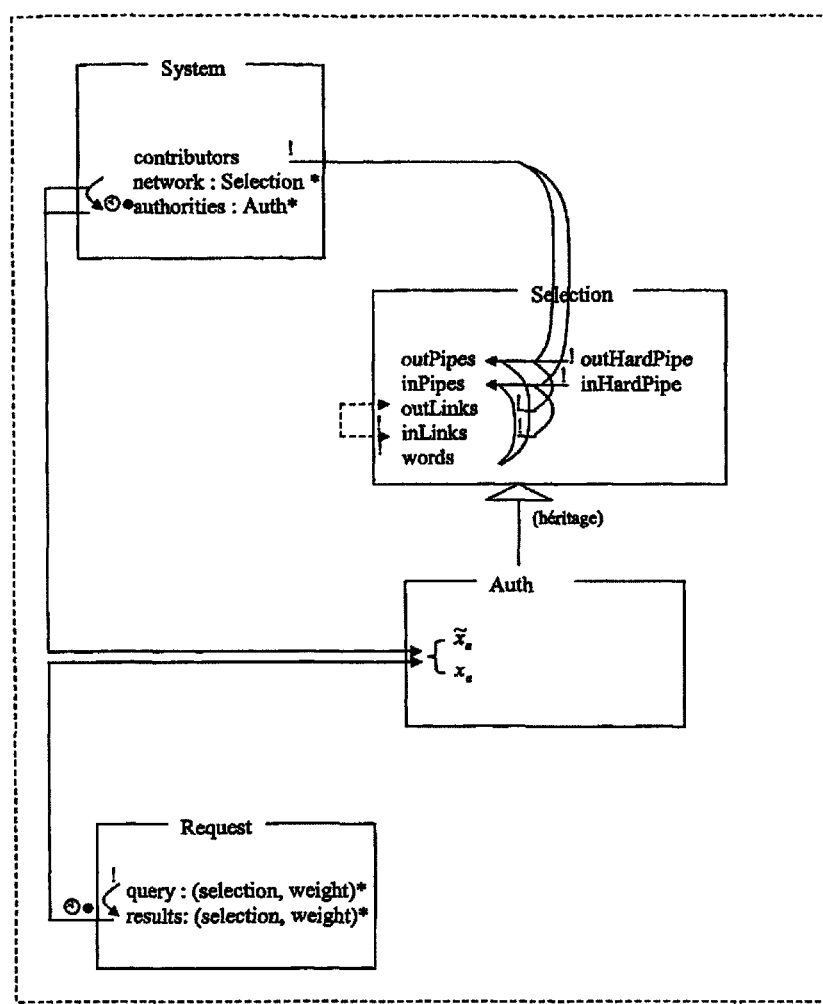

Operation of servers in client and server mode is shown diagrammatically in dependence diagrams in FIGS. 24 and 25 respectively.

The system in client mode does not have authorities and all its requests are delegated to its server. It also works on the same server network as its server, and therefore there is no need for it to calculate the pipes defined automatically; it can download them from the server. Thus, all that remains for the system are manually defined pipes, semantic relationships and subscriptions to be managed.

Extension of Knowledge of the Web

The system in server mode offers a function to enlarge the set of known pages and the set A. This operation must typically be done during start up, because at this moment the set A and the set of known pages are empty.

Network Extension Algorithm

The user gives a set of selections starting from which the extension will be made.

The system then performs the relative score calculation algorithm[82] starting from this set, working along pipes starting from selections with the greatest score (which will cause a search for inverse and forward links, through dependences). Thus, the relative score calculation algorithm and the network extension are executed in parallel.

[82]Obviously, the non-optimised version will be used, considering that the objective here is to prepare data used by the optimised algorithm.

The method is continued until a number of selections chosen by the user is reached, or alternatively until the highest score at the boundary is less than the threshold chosen by the user (the word "boundary" in this description means a selection for which the set of outgoing pipes has not been calculated). The system can then either destroy a first set A that already exists and start the selection algorithm of the set A described in the "The distiller" section above, or can simply add new selections to this set, using the algorithm starting from the previously existing set A.

Immediately after an extension, the system must recalculate all values of $x_a$ and $\tilde{x}_a$. The calculation of these terms can trigger the calculation of pipes starting from authorities, following them for as long as the scores are fairly large (which can increase the known domain beyond the boundary of the domain that was constructed to choose the selections of A).

The system is then ready to receive requests that will use the $x_a$ and $\tilde{x}_a$ values thus obtained.

Optionally, it will be possible to enlarge the network in reaction to a request outside the well-known domain of the system (for example for company employees or if the user pays).

As already mentioned in the description of handling a request (see the "The distiller" section), the error on the result and therefore knowledge of the system on the request can be measured using the $$\sum_{a \in A} \tilde{x}_a(i)$$

terms. Note that if the request is accompanied by a modification of the network, it is important to firstly calculate the modified request to take account of these modifications before these terms are calculated.

If knowledge of the system for selections of the modified request is too weak, the results will be poor and the network extension algorithm can be started automatically starting from the user's modified request.

EXAMPLE

Suppose that a user of a client system created a document containing two transclusions $s_1$ and $s_2$ of web pages $p_1$ and $p_2$, one of which is in the known domain of the server and the other is unknown to the server. The user has traced a pipe from $s_1$ to $s_2$ (and the pipe, as explained above, was actually placed from $p_1$ to $p_2$).

Firstly, in creating $s_1$ and $s_2$ he inserted the corresponding references in the server.

The user who is authorised to provoke a network extension, asks for suggestions for his document.

Therefore, his system will send a request containing $s_1$ and $s_2$ and the pipes ($p_1$<->$s_1$, $p_1$->$p_2$, $p_2$<->$s_2$) as differences to the network.

The request modified by these three pipes will have a non zero weight $s'_j$ at the two web pages in addition to the two transclusions (see algorithm in the "The request handler" section) and if no extension is made, only suggestions starting from the first web page will be given (because it is the only page known to the server).

Now assume that the server makes a network extension (the network extension algorithm, described above).

Therefore, he will use the modified request and perform the relative score calculation algorithm (not optimised) starting from these four selections, but in its server network (in other words without no pipe between $p_1$ and $p_2$). To achieve this, in particular he must follow pipes starting from $p_2$. Given that the pages in the neighbourhood of this latter will have a good score for this request, and that existing authorities will give it a zero score, the system will place one or several authorities in this region.

Network Reduction Algorithm

The previous section explains how to extend the network or increase the precision by increasing the set of authorities. We will now describe a function of the system to perform the reverse operation (useful to a user, for example if he wishes to cancel the effect of a network extension provoked by a client system in a region of the Web outside his zone of interest).

Figure 26:
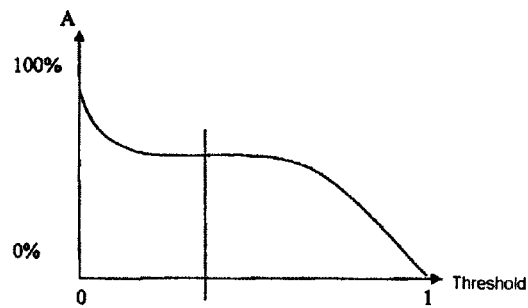
FIG. 26 depicts atypical curve presented by a network reduction tool.

The user will define the domain that he wants to remove from his network by making a request, for example with a document containing transclusions, or with a set of selections given directly, etc. He can then tell the system to delete authorities that were used frequently to produce the results, in other words selections of A for which $$\sum_{i \in R} R_i \cdot \tilde{x}_a(i)$$

is sufficiently large (the user can either specify a threshold or a proportion of authorities to be deleted). To help in choosing the threshold, a graph can be displayed indicating the proportion of authorities that will be eliminated, as a function of the threshold. If the domain that he has given is well closed (in other words is weakly connected to the rest of the network), the graph will present a flat area around the threshold to be chosen (because the threshold must be very much reduced before the authorities of another domain are affected in turn). This is shown in FIG. 26.

Peer-to-Peer Delegation

Alternately, instead of extending the server network, a peer-to-peer system can be used to delegate parts of the request or the entire request to other systems.

The user can connect his system to other systems, to form a peer-to-peer network. Systems are said to be "close" to each other if they are directly connected through this network.

When the system chooses to delegate part of a request to other systems, it will ask its neighbours if they know a system capable of managing all or part of this request, in other words having sufficiently large knowledge values $$\sum_{a \in A} \tilde{x}_a(i).$$

If a system is capable of managing part of the request, it notifies the system from which the search started (by supplying it with its knowledge values for these selections) and queries its neighbours for the part of the request that it does not know.

The request will continue to circulate to the neighbours of these neighbours and so on, until a system has replied for all selections of the request, or until the entire network has been browsed unsuccessfully (which is detected if no reply is received after a given time). The first system (that initiated the search) can then distribute the request between the different systems that replied, and then the different results can be recomposed directly, due to the linearity of the algorithms.

In order to optimise the search in the peer-to-peer network, the systems can memorise a table of requests that they receive most frequently, associating the system that replied positively with it. Thus, requests will reach systems capable of managing them more quickly.

Since not all selections in the first system are accessible to all neighbours, the first system must not make any requests except for requests containing selections accessible to its neighbours, in order to avoid useless traffic.

Distributed Architecture

The following describes how a system (we refer to a system managing a single network) can be distributed on several machines.

It is important that a request (therefore the calculation of $$\hat{x}_R(j) = \sum_{a \in A} \left( \sum_{a \in R} x_a(i) \cdot R_i \right) \cdot x_a(j))$$

should be processed quickly. Furthermore updating the functions $x_a$ and $\tilde{x}_a$ takes a large amount of resources. These two points suggest that the set A should be distributed on several machines.

Figure 27:
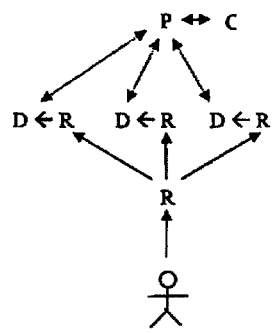
FIGS. 27 and 28 present a distributed architecture for the system.

The result is thus (as diagrammatically shown in FIG. 27) one machine for a main RequestHandler (R), one machine for the Piper (P), one machine for the Crawler (C), and Distillers (D) that share the set A, and each is located on a different machine. For example, there may be ten distiller machines (only 3 machines are shown in FIG. 27 to simplify the drawing), for example each dealing with a thousand selections of set A (if it has ten thousand). Each Distiller will be accompanied by a secondary RequestHandler (R) to manage the part of the requests concerning it.

Thus, a request is performed as follows: It reaches the RequestHandler which will simultaneously request all secondary RequestHandlers giving them the content of the request. These secondary RequestHandlers will then do their part of the sum and return the result (a set of selection-score pairs) to the primary RequestHandler, that will calculate the sum of all partial results and send it back.

Figure 28:
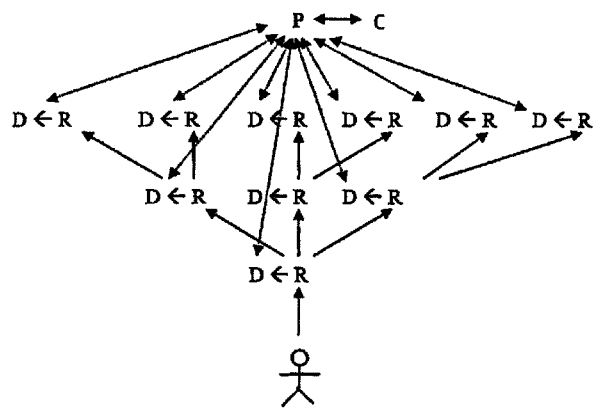

It will be possible to envisage more than two RequestHandler levels for a larger number of machines, as shown diagrammatically in FIG. 28.

Finally, each Distiller will update the scores $x_a$ and $\tilde{x}_a$ for its portion of the set A (according to the dependences in the diagram in FIG. 27).

* * *

Derived Resources (First System)

Another aspect of this invention is aimed at proposing techniques in which a user can modify an original page—for example he can associate annotations with it—and save the modifications as a page derived from the original page.

The objective is thus that the derived page should be spontaneously presented to him by the system when he revisits the original page.

According to another aspect, the invention is aimed at determining the degree of relevance of pages with respect to each other and with respect to the user's navigation context, making use of links found in web pages.

Thus for each visited page, the invention is aimed at presenting the user with the most relevant derived page and annotations associated with other relevant pages and links to other relevant pages.

Note that although relevance score search methods (relative distillation) and transclusion methods are different in this description, they can be replaced by methods described above (pipes and transclusions), and vice versa.

Another purpose of the invention, for example, is to allow an annotation to be used as a link to a data resource such as a file, such that the user can find data resources simply by putting himself in their relevance context; when the user browses and moves close to the context of the resource that he is looking for, the objective is a system that will simultaneously propose this resource to him.

More globally, the invention thus aims at using the system forming an "associative memory" for the user.

We will now describe a first system using the method to selectively access one among a plurality of resources starting from an initial resource, characterised in that it comprises the following steps:

(a) create relevance scores for the initial resource and other resources using a relevance determination mechanism, said other resources comprising independent resources and resources derived from the initial resource and/or these independent resources, (b) in relation to access by a user to the initial resource, do or do not provide the user with information about whether another resource exists or access to said other resource, as a function of said relevance scores.

We will also describe how this system does or does not select the content of another resource to be presented, particularly in relation to the relevance score of said other resource, in relation to the access by a user to a resource containing at least one view instead of (or in relation to) the content of each view.

Suggestion of Another Resource

How are Relevance Scores Determined

Users have declared a number of centres of interest called "support groups" to the system. Each support group is initially represented by a set of resource identifiers (they are usually URLs of popular web pages). Let this set be called R. We define[83]

$R^-$ the set of resources with a link to at least one resource of R,[84]

$R^+$ the set of resources pointed to by at least one resource of $R^-$, $R^{-+}$ the set of resources with a link to at least one resource of $R^{-+}$.

[83]In this description, we describe the upstream relative distillation method that is described in more detail in the "Calculating the relevance score related to a support group" section. This method can advantageously be complemented by the symmetrical method: downstream relative distillation.

[84]R makes up the initial resources of the support group.

An authority score is associated with each resource of $R^{-+}$.

The authority score is defined indicating the "authority relative to R", for a resource P by the value of a homogeneity equation (defined below) on $R \cup \{P\}$.

For each support group, the system receives these different sets[85] as input or crawls the Web to determine (and maintain) them, and then calculates and memorises authority scores of resources forming the set $R^{-+}$ (knowing that resources that are not in $R^{-+}$ implicitly have a zero score).

[85](in fact $R^-$ and part of $R^{-+}$ are also necessary to counter nepotism, which is described in more detail in the "Anti-nepotism" section).

The relevance score of a resource[86] for a given support group is the authority score[87] thus calculated for this resource. As a variant, the relevance score of a resource P for a given support group can be determined more simply by counting the number of times that P is co-cited[88] (by resources of $R^-$) with the resources of R characterising this support group[89].

[86](the initial resource or other resources that may be independent resources and resources derived from the initial resource and/or these independent resources; the creation of derived resources is described in more detail in the "Production and maintenance of derived resources" section.)

[87](relative to the set R characterising this support group.

[88]A first page is co-cited with a second page if there is a third page that has a link to the first page and a link to the second page.

[89]Note that resources that are not in $R^{-+}$ have a zero score because they are not co-cited with resources of R. Therefore, only resources of $R^-$ are used to calculate only the scores of the resources of $R^{-+}$.

How are Relevance Scores of Derived Resources Produced

Each resource derived from an[90] initial resource is built up:

by reproducing (and possibly modifying) an initial resource, by inserting a view[91] (possibly modified) of an initial resource or an element of an initial resource, in any resource.

[90]A resource may be derived from several initial resources at the same time, for example it may contain several views of different initial resources

[91](or a copy)

Initial resources are linked by directional links to form an oriented initial graph. (For example, the initial resources may be web pages and the oriented initial graph is then the web).

If the derived resource is obtained by reproduction of an initial resource or by inserting a view or a copy of an initial resource (P2) taken as whole, into any resource (P7, see FIG. 29), the system creates a virtual link directed towards said derived resource (L5 directed to P7)

starting from each resource citing an initial resource (P2) that was used to build said derived resource.

"Citing an initial resource" means "having a link to an initial resource", this link possibly being real or virtual. Thus in FIG. 29, not only is the (real) link L5 inherited[92] by page P7, but virtual links L1, L2 and L3 are also inherited by this page P7.

[92]A derived resource inherits a link (virtual or not) starting from a citing resource and directed to a cited resource, means that there is a virtual link (implicitly) for the system from said citing resource to said derived resource;

In the case in which the derived resource is obtained by inserting a view or a copy of a part of an initial resource (P2) into an arbitrary resource (P1), this part being or itself containing a view or a copy of an indirect initial resource (P3) taken as a whole, the system creates a virtual link (L3)

directed to said derived resource (P1)

starting from each resource citing an indirect initial resource (P3).

In this description, "citing an indirect initial resource" means "having a link to an indirect initial resource", this link possibly being real or virtual.

Figure 29:
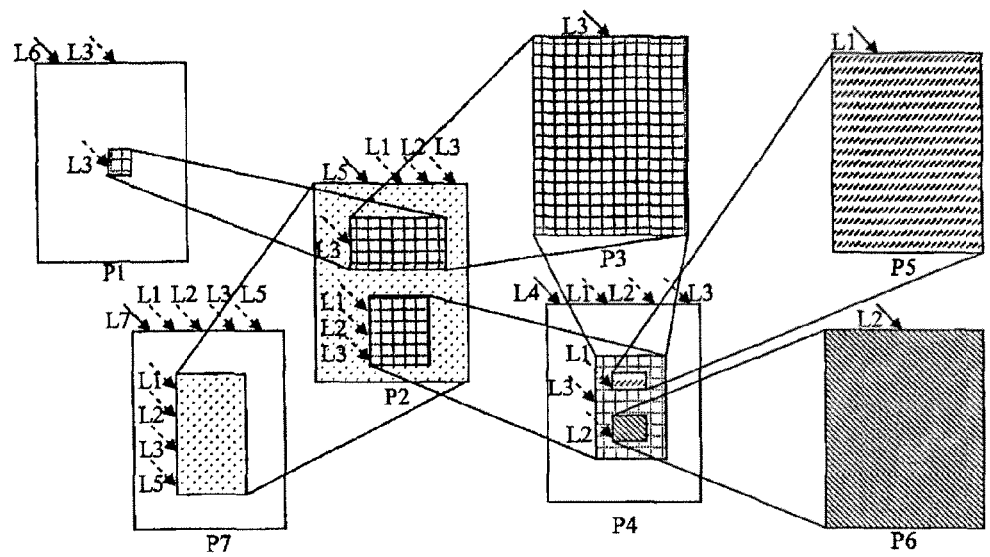
FIG. 29 illustrates the construction of a "virtual derived graph", obtained from hyperlinked pages and derivation views.

FIG. 29 illustrates the inheritance of real or virtual links, within the framework of an example with nested views. Page P4 contains a view of page P3, this view itself containing a view of page P5 and a view of page P6. Since (in page P4), the view of P5 takes P5 entirely, it contributes (on page P4) the virtual link L1. Similarly, the view of P6 contributes L2 and the view of P3 contributes L3. Thus, page P4 inherits[93] links L1, L2 and L3. Then, since page P2 contains a view on part of page P4 that contributes virtual links L1, L2 and L3, this view in turn contributes the corresponding virtual links (also denoted L1, L2 and L3). Finally, since page P7 contains a view on P2 (taken entirely) it inherits all links (real or virtual) directed to P2, namely L1, L2, L3 and L5. Furthermore, page P1 has a view of a part of page P2, this part being a view of page P3 taken entirely and therefore contributing its link L3. Thus P1 inherits the virtual link L3 (through P2). However, P1 does not inherit the other links of P2 (L5, L1 and L2) because it does not reproduce P2, nor does a view that it contains contain P2 entirely.

[93]When it is said that a resource inherits a link, it means that it inherits from an incoming link (i.e directed to it).

The system thus builds up a "virtual derived graph" formed from the initial oriented graph and virtual links.

Relevance scores are generated as described in the previous section (by forming $R^-$, $P^{-+}$, etc.) but based on said virtual derived graph.

We will now more specifically describe the construction and maintenance of all incoming links (real and virtual) of a resource.

In the remainder of the description, the term "page" will frequently be used instead of the term "resource". The term "page" is more appropriate because we would like to talk about resources that can be presented spontaneously to the user. Thus "Page" means "resource" (of any type whatsoever) to which a link can be directed (such that the resource is activated when the user clicks on said link).

Incoming Link Inheritance Mechanism

This mechanism is based on the concept of set of link sources for an element[94]. It is said that a page A is a source of links for an element B if any new link (real or virtual) pointing to page A also points (in the form of a virtual link) to B (and therefore to the page containing B and to all views containing B) as described above.

[94]"Element" means element of a page.

Any element may have link sources but only one page may be a link source.

Secondly, it will be said that a page A is a direct link source of an element B if it is a link source of B and if there is no page X such that X is a link source of B and A is a link source of X.

The extended set[95] of incoming links in a page is thus equal to the union of real incoming links in this page and the union of their extended sets of incoming links, for all direct link sources.

[95] Extended links means real links and virtual links.

Therefore, construction of these extended sets is broken down into
1. construction of these direct link sources and
2. the inheritance of the links themselves.

For the first part, each instance of the system has a function forwarding the set of direct link sources for a given element.

This function will forward the union of the set of pages for which a view (entire) is contained in the requested element and sets of direct link sources of parts of pages for which a view is contained in the requested element.

The set of extended links is then calculated as defined above, starting from these direct link sources.

Figure 30:
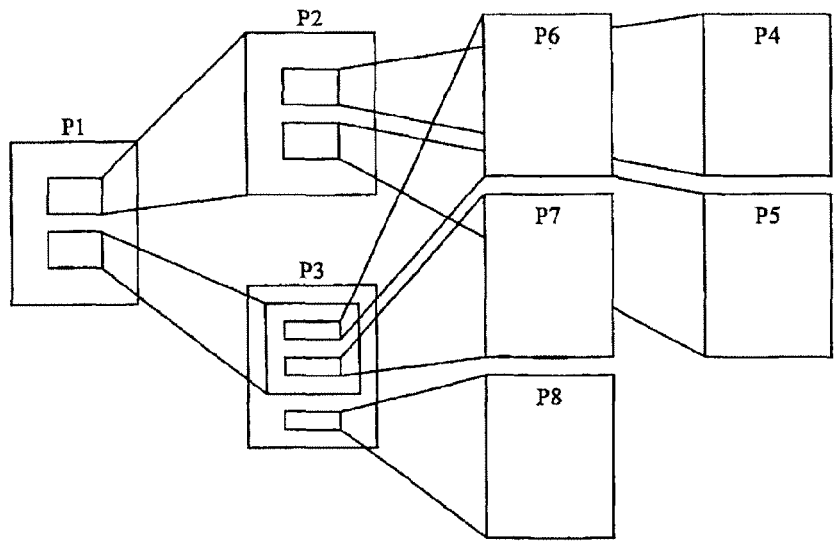
FIG. 30 shows an example used to illustrate to compute direct link sources of the pages.

FIG. 30 presents an example with eight pages. The first (P1) contains an entire view of the second (P2) and a partial view of the third (P3). P2 has an entire view of P4 and of P5. The part of P3 seen by the second view of P1 contains entire views of P6 and P7. P3 also contains a view of P8.

The extended set of incoming links of a page $P_i$ will he denoted $e_i$, and the set of real links $l_i$. The + sign represents the union of sets.

Direct link sources of P1 are P2, P6 and P7. The extended set of links of P1 is the union of real incoming links directed to P1 with extended sets of links of P2, P6 and P7. Therefore we have e1=l1+e2+e6+e7. In the same way as for the other pages, we obtain e2=l2+e4+e5, e3=l3+e6+e7+e8, e4=l4, e5=l5, e6=l6, e7=l7 and e8=l8. It can be seen that we can obtain e1=l1+l2+l4+l5+l6+l7 (simply by substituting terms $e_i$). (Note that e1 does not inherit from l8).

The set of page direct link sources is stored in a cache and is updated regularly (see "Description of system installation" section).

What are the Other Resources and how does the System Select them

The system will or will not select another resource to be presented in relation to a user's access to the initial resource, as a function of relevance scores.

We will start by describing how the system selects this other resource[96].

[96] (regardless of if it is independent, in other words not derived from the initial resource), or derived from the initial resource, or derived from an independent resource.

Before the user accesses the initial resource, a relevance score was allocated (explicitly or implicitly) to each resource for each support group existing in the system. Remember that if the score for a given support group has not been explicitly allocated, it is considered as being null; the system knows the resources for which the score is not null in advance; these are the resources that belong[97] to the set $R^{-+}$ of at least one support group, therefore it only needs to calculate a score for them.

[97] (or to the set $R^{+-}$ in the case of downstream distillation).

The resource $P_i$ most relevant to the initial resource $P_0$ is selected as follows: If $X_{Ej}(P_i)$ is the relevance score of $P_i$ with respect to the support group $E_j$, the system selects the resource $P_i$ for which the relevance score ($s_i$) with respect to $P_0$ is the highest, this relevance score being calculated as the logical sum[98] (or the maximum) for j of $X_{Ej}(P_0) \cdot X_{Ej}(P_i)$, $$s_i = 1 - \prod_j [1 - X_{Ej}(P_0) \cdot X_{Ej}(P_i)]$$

$$\left( \text{or } s_i = \max_j [X_{Ej}(P_0) \cdot X_{Ej}(P_i)] \right)^{99}.$$

The information about the existence of $P_i$ is notified to the user[100] if this score $s_i$ is sufficient, or the system may be configured so that $P_i$ is presented directly instead of $P_0$ (particularly if the logical sum for j of $X_{Ej}(P_i)$ is greater than the logical sum for j of $X_{Ej}(P_0)$).

[98] The logical sum is the complement of the product of complements (this avoids many small scores from being too easily better than a few large scores). For example, a resource with a score of 10% for ten support groups would have a global score of $1-(1-0.1)^{10}=65\%$, instead of 10% if the maximum method is used, or 100% if an arithmetic sum is used.

[100] (and a link to it is provided; note that as a variant, several $P_i$ values with a high score with respect to $P_0$ may be selected)

Optionally, reproduced (then modified) resources can be preferred starting from the initial resource (and more particularly the initial resource itself), for example by multiplying their scores (with respect to the initial resource) by a coefficient greater than 1. Reproduced versions of the initial resource (and the initial resource itself) are a priori more relevant for the user than independent resources.

Replacement of the Content of Views

This system will or will not select the content of another resource to be presented in relation to a user's access to a resource, if applicable, instead of (or in relation to) the content of each view, as a function of relevance scores[101].

[101] For a particular view, the user has the means of indicating whether or not he would like the view to be replaced by the system (if the user does not specify otherwise, each view will respect the default behaviour of the system.

Using the method presented above (see the "How are the relevance scores of derived resources produced" section), the system[102] returns its list of direct incoming link sources with each view (just at the moment at which it is to be displayed in the page to the user).

[102] (more precisely, the "Resolver" subsystem that is described later in the "Production and maintenance of derived resources" section.)

The most relevant source $P_i$ for the view in question is selected as follows: let $X_{Ej}(P_k)$ be the relevance score with respect to the support group $E_j$ of a direct link source $P_k$ for the view in question, and $X_{Ej}(P_i)$ be the relevance score of $P_i$ with respect to the support group $E_j$, the system selects the resource $P_i$ for which the score $s_i$ is the highest, the score being calculated as the logical sum (or the maximum) for k and for j of $X_{Ej}(P_k) \cdot X_{Ej}(P_i)$, $$s_i = 1 - \prod_{j,k} [1 - X_{Ej}(P_k) \cdot X_{Ej}(P_i)]$$

$$\left( \text{or } s_i = \max_{j,k} [X_{Ej}(P_k) \cdot X_{Ej}(P_i)] \right)^{103}.$$

Information about the existence of the $P_i$ with the highest score is notified to the user[104] if this score $s_i$ is sufficient, or the system may be configured so that if the score $s_i$ is sufficient, $P_i$ will be presented directly instead of the view in question.

[104] (and a link to it is provided; note that as a variant, several values of $P_i$ with a high score may be selected)

As a variant, the score can be stored (in cache) for each view for each support group $E_j$, calculated as being the logical sum $$\left(1 - \prod_k [1 - X_{Ej}(P_k)]\right)$$

or the maximum $$\left(\max_k [X_{Ej}(P_k)]\right)$$

of the relevance score for the support group, for direct link sources for this view. At the time of the presentation of the page containing the view, selection of the most relevant resource $P_i$ for the view in question is then based on the logical sum (or the maximum) for j of the product of the score of this view for a support group $E_j$ and the relevance score $X_{Ej}(P_i)$.

Preference can also be given to the resources reproduced (then modified) from direct link sources of the view in question, for example by multiplying their scores by a coefficient greater than 1.

Taking Account of the Navigation Context

The navigation context represents current centres of interest of the user when he browses and visits resources one after the other. A user's navigation context is defined by an association of a score with each support group. The navigation context can be initialised with a score equal to 1 for all support groups to notify the absence of context. To update the navigation context, when a new initial resource $P_0$ is visited by the user, the context K has to be replaced by an average weighted by the scores $X_E(P_0)$ of the resource for these support groups[105]: $K_{Ei}{}^+ = \lambda K_{Ei} + \bar{\lambda} X_{Ei}(P_0)$.

[105]The weighting factor λ is a number between 0 and 1 describing the sensitivity to the past; for example, λ=⅓ means that the past is worth ⅓ and the present is worth ⅔.

The score $s_i$ of a resource $P_i$ (with respect to the initial resource $P_0$ and relative to the navigation context K) is the logical sum (or the maximum) of products of scores for a support group $E_j$ with the score $K_{Ej}$ of this support group in the navigation context:

$$s_i = 1 - \prod_j \lfloor 1 - K_{Ej} \cdot X_{Ej}(P_0) \cdot X_{Ej}(P_i) \rfloor$$

or $$s_i = \max_j [K_{Ej} \cdot X_{Ej}(P_0) \cdot X_{Ej}(P_i)]$$

In other words, said other resource $P_i$ most relevant to the initial resource $P_0$, taking account of the navigation context, is selected as follows: if $X_{Ej}(P_i)$ is the relevance score of $P_i$ with respect to the support group $E_j$, the system selects the resource $P_i$ for which the relevance score with respect to $P_0$ and to the navigation context is highest, the relevance score being calculated as being the logical sum[106] (or the maximum) for j of $K_{Ej} \cdot X_{Ej}(P_0) \cdot X_{Ej}(P_i)$.

[106]The logical sum is the complement of the product of complements (this avoids many small scores from being too easily better than a few large scores). For example, a resource with a score of 10% for ten support groups would have a global score of 1−(1−0.1)¹⁰=65%, instead of 10% if the maximum method is used, or 100% if an arithmetic sum is used.

The user[107] is notified about the existence of $P_i$ if the score $s_i$ of the resource is sufficient, or the system may be configured so that $P_i$ can be presented directly instead of $P_0$[108] (particularly if the logical sum for j of $K_{Ej} \cdot X_{Ej}(P_0) \cdot X_{Ej}(P_i)$ is greater than the logical sum for j of $K_{Ej} \cdot X_{Ej}(P_0) \cdot X_{Ej}(P_0)$).

[107](and a link to it is provided; note that as a variant, several $P_i$ values with a high score with respect to $P_0$ may be selected)

[108]As already described, as a variant, preference can be given to the initial resource and resources derived from it by reproduction.

For the selection of alternate views (described above in the "Replacing the content of views" section), equation $$s_i = 1 - \prod_{j,k} \lfloor 1 - X_{Ej}(P_k) \cdot X_{Ej}(P_i) \rfloor$$

$$(\text{or } s_i = \max_{j,k} [X_{Ej}(P_k) \cdot X_{Ej}(P_i)])$$

described above is replaced by:

$$s_i = 1 - \prod_{j,k} \lfloor 1 - K_{Ej} \cdot X_{Ej}(P_k) \cdot X_{Ej}(P_i) \rfloor$$

$$\left(\text{or } s_i = \max_{j,k} [K_{Ej} \cdot X_{Ej}(P_k) \cdot X_{Ej}(P_i)]\right).$$

If the scores of views are put in cache, the most relevant resource $P_i$ for a view is selected based on the logical sum (or the maximum) for j of the product of
  the score of the view in question for a support group $E_j$
  and the relevance score $K_{Ej} \cdot X_{Ej}(P_i)$.

Taking Account of the Edit Context

The concept is that when a resource derived from an initial resource is created, its relevance scores (for the corresponding support groups) become a combination of the relevance scores for the initial resource and the user's current navigation context[109], so that it can be distinguished from the initial resource. Thus, when the user visits the initial resource, the system will select its derived resource preferentially when it is most relevant to its current navigation context (K).

[109](other methods can also be used, such as the analysis of the content of modifications).

This is implemented as follows. An edit context D is associated with each resource created by the user. When the user creates a resource, the edit context of the resource is initialised to the user's navigation context at the time of this creation. When a resource is modified, its new edit context $D^+$ becomes the weighted average of the old edit context D and the current navigation context K (at the time that the new version is saved): $D^+ = \kappa K + \bar{\kappa} D$, where κ is a number between 0 and 1 representing the weight of the present with respect to the past.

The relevance score of a page $P_i$ for a support group $E_j$ is then calculated using a weighted average between:
  the score $X_{Ej}(P_i)$ defined above as being the value of a homogeneity equation on $R_{Ej} \cup \{P_i\}$, (where $R_{Ej}$ is the set of initial links characterising the support group $E_j$)
  and its edit context $D_{Ej}(P_i)$ for this support group.

When each score $X_{Ej}(P_i)$ has thus been replaced by its weighed average with the edit context $D_{Ej}(P_i)$, the same equations (described above) are applied.

Selection of Resources for which the Content has Changed

We have described how the system thus provides or does not provide the user with information about the existence of another resource or access to said other resource as a function of relevant scores, with regard to the user's access to an initial resource.

We have also described how the system selects or does not select the content of another resource to be presented, always as a function of relevance scores, with regard to the user's access to a resource containing at least one view, instead of (or in relation to) the content of each view.

We will now describe how the system presents another resource only if it is new for the user or if the content of said resource has changed since the user's most recent access to said resource.

Typically, for example, the user will visit a page on a site selling books on line and will decide to monitor an element of a page (P1) presenting science fiction books. Later on, he will visit another page (P2) that is relevant to the same domain (science fiction), and the system will present him with the library page (P1) from which he selected an element to be monitored. However, this library page (P1) is only presented to him if the content of this element to be monitored has changed since the last time that the user visited it.

We will also describe how the system presents another content in a view only if it is new or if it has changed since the last access by the user to said content.

For example, a view of a page (P3) that the user accesses reflects the content of a page (P2) relevant to the library page (P1) in the previous example. The system will replace the content of this view by the content of the library page (P1), if it has changed since the last time that the user viewed it.

The user should declare to the system that he has viewed a page. Thus, as long as he does not do this, the system will consider that the user has not yet studied it and will continue to propose it to him, and as soon as the page is declared as having been viewed, it will no longer be displayed until its content has changed.

Thus, the system provides the user with a means of declaring that he has already seen a page (and therefore that he does not want the system to spontaneously propose it to him unless its content has changed).

The system regularly downloads all pages "seen" by users onto the server and compares them with their previously downloaded version. When the system observes a change in a page, it will record the date on which a change was observed with this page.

When a user declares that he has seen a page, the system will memorise the date that this occurred (in relation to said user), so that it is possible to tell if the page has changed since the time at which the user saw it.

More precisely (and like the example in the library page given above), the user can specify particular page elements for which he wants to monitor changes. Thus, the system memorises the list of elements to be monitored in a table (globally for all users) for each previously viewed page, with the most recent date on which a change was detected for each elements[110].

[110] The system regularly downloads all pages containing at least one element to be monitored onto the server, and compares them with their previously downloaded version. When the system observes a change, it will save the date on which the change was observed. When a user declares that he has seen a page (or more precisely an element being monitored), the system will memorise the date of this instant, so that it is possible to determine whether or not the element has changed since the time at which the user saw it. Thus, the system can only display pages for which at least one element being monitored has changed.

When the objective is to present "another page" (more relevant) to the user, the system may select another page when required (as a function of the scores) in which at least one element that the user wanted to monitor has changed since the last time that the user viewed the page (or specifically the element in question).

Finally, for the selection of alternate views (described above in the "Replacement of view contents" section), said selected page $P_i$ (the most relevant for the view in question) must also satisfy the change condition described above.

Annotation

Each modification to an original page is shown to the user together with the page in which said modification was saved, except for the case of annotations[111] that may also be shown independently (i.e. adjacent to or superposed on another displayed page).[112]

[111] The annotation is implemented as a special case of a page modification. Thus, each annotation associated with a page is saved in the context of a page derived from this page (i.e. derived by reproduction/modification).

[112] Creating an annotation may simply consist of highlighting part of a page. Typically, the user selects part of a page (by keeping the mouse button pressed while moving the mouse to make the selection) and declares to the system that it is an annotation associated with this page. The system then creates a page derived from this page, in which the location of this annotation in the page is specified. Obviously, the user can also modify the content of the annotation thus created, or can create any annotation containing new information, for example a link to another resource (see the last paragraph in this section). Said created derived page then also contains these modifications or this new information.

The system is capable of presenting relevant annotations[113], in addition to methods previously described. By default, in particular these annotations can:

be displayed adjacent to the displayed page occupy spaces reserved for advertising in the page be positioned according to specifications given by the user at the time that the annotation was created, or be arranged in a special manner specified or chosen by the user (by selecting it among display configuration options).

[113] (In other words, annotations contained in pages that are relevant to the current visited page and to the context).

Typically, to create an annotation associated with a page, the user:

selects a part of the page (by sliding the mouse on it with the button pressed)

and/or supplies the system with one (or several) comments (possibly containing a link), and optionally gives a set of keywords (or a display position).

A derived page (obtained by modification of the original page) containing this data is then created. When the user accesses a page for which this derived page is selected as being relevant, the system searches in the page for the occurrence of one of these keywords and displays the selection and/or the comment adjacent to the position of this keyword, as unintrusively as possible: for example, the keyword is simply underlined and the annotation appears when the mouse cursor is rolled over it (roll-over).

The system is capable of only selecting annotations for which the content has changed since the last time that the user saw them (as described in the "selecting resources for which the content has changed" section).

By clicking on an annotation with the mouse right button, the user can (select the option in the context sensitive menu enabling him to) view the entire page containing this annotation[114].

[114] And starting from a derived page, it can find the original page with which the annotation had been associated.

An annotation may be simply text, or it may be visual or sound, for example an oral or video message (or message that has any other effects on the senses) and it may comprise one or several links on which the user can click.

Annotations may comprise a code that can be directly executed and thus extend the user interface.

An annotation may contain a link to a resource[115]. For example, the annotation may consist of an icon representing a document (and comprising a link to this document), an icon that the user has associated with the page by doing a drag-drop (of this icon) starting from his desktop.

[115](such as a word processing document or a spreadsheet, an image or an audiovisual document)

The system offers the option of downloading the resource located at the end of this link (onto the system server) such that when the annotation containing this link is presented, the user can automatically return this resource onto his client station and open it directly, simply by clicking on it (as he would do normally to open a document).

Calculating the Relevance Score with Respect to a Support Group

Homogeneity

Scalar Equation

Let E be sets of pages for which homogeneity is required $$X_s(E) = \overline{\omega(E)} \frac{I(E)}{U(E)} + \omega(E) \sqrt{\frac{I(E)}{U(E)}},$$

where $$\omega(E) = \gamma \left(1 - \frac{S(E)}{B(E)}\right),$$

I(E) is the cardinal of the intersection of incoming links to pages of E, U(E) is the union, S(E) is the cardinal of incoming links to the page that has the fewest, B(E) is the cardinal of incoming links of the page with the most, γ is a constant.

Weighting by ω has to be introduced because otherwise the equation would not show up any difference between the case of a page with few incoming links but all of which are incoming links from other pages in the set (should give a high homogeneity but gives a low value) and the case in which all pages have many incoming links but only a small sub-set is common to them (the equation correctly gives a low homogeneity). Correction with weighting by ω increases the score in the first case (because the correction is stronger when the ratio $$\frac{S(E))}{B(E))}$$

is smaller). The factor γ indicates the strength of the correction. As this factor increases (maximum 2), the correction factor also increases. 0.6 is undoubtedly a good value.

Equation by Reasons to Like $$\overline{x_r(E)} = \prod_{S \subset E} \overline{|p(S)|}^{(-1)^{|S|}},$$

where p(S) is the ratio between the cardinal of the union of incoming links of pages of S divided by the cardinal of the work space (all pages for which it is considered that they could have pointed to a page of S, in other words they know them). Since it is impossible to obtain the exact size of this work space, we will usually take all pages known to the system.

Absolute/Relative Distillation

In the following we will describe the backward (i.e. in the upstream direction) distillation method to obtain scores. Note that symmetrical forward (in the downstream direction) methods can also be used to obtain scores or to complement scores obtained by the backward method.

Absolute Distillation in a Given Page Domain

Each page is associated with a pivot score and an authority score, and the purpose of the algorithm is to find values for these scores such that 1. the pivot score of a page is equal to the sum (except for the proportionality factor) of the authority scores of pages to which it has a link 2. the authority score of a page is equal to the sum (except for the same proportionality factor) of the pivot scores of pages that have a link to it.

In order to achieve this result, scores were initialised at random (for example all to the same value), and then the page pivot scores and the page authority scores were recalculated alternately by adding authority and pivot scores in turn until the values stabilize. All pivot scores are divided by their sum in each step, and all authority scores are divided by their sum to prevent values from exploding.

Relative Distillation to a Set of Pages R

Remember that $R^-$ is defined by the set of pages with a link to at least one page of R,[116] and $R^{-+}$ is defined by the set of pages pointed to by at least one page of $R^-$.

[116]R forms the initial pages of the Support Group

Each page of $R^-$ is associated with a pivot score.

Each page of $R^{-+}$ is associated with an authority score.

The authority relative to R for a page P is defined as the value of a homogeneity equation on $R \cup \{P\}$, where the cardinal of a set of pages is replaced by the sum of pivot scores for these pages.

The purpose of the algorithm is to find values for these scores such that

1. The pivot score of a page is equal to the sum (multiplied by a proportionality factor) of authority scores of pages to which it has a link 2. The authority score of a page is equal to the authority relative to R for this page.

This is done using a method similar to the absolute distillation method except that the recalculation of authority scores uses the relative authority and not simply the sum of pivot scores. Scores are weighted as described above.

Extension to $R^{-+-}$

For relative distillation, it may be interesting to extend the set of pivot pages to $R^{-+-}$, so as to obtain more precise results. Considering that this set might be too large, some iterations of the algorithm are made (with $R^-$ as the set of pivot pages), and then the $R^-$ set is replaced by the set of pages with a link to at least one page of $R^{-+}$ with a sufficiently large authority score. This operation may be done several times during execution of the algorithm.

Production and Maintenance of Derived Resources

Introduction

When the user asks to modify a page using an external tool, the system will create a derived page[117].

[117]The expression <> in the remainder of this document refers only to a modified version of X (and not a page containing a possibly modified view of X).

Its modifications are automatically determined by comparing the document before modification with its new version after modification, and are memorised in an XML structure.

We will now describe the particular method to display a customised resource obtained from an original resource (external page), characterised in that it includes the following steps:

load the original resource from a site making said original resource available to the user, save a working resource obtained from a copy of the original resource in a memory, implement tools for modifying the resource to produce a modified resource from said working resource, save a set of data in a memory to represent differences between the original resource or the working resource and the modified resource, and during a subsequent access to the original resource, start from the current version of the original resource and said set of data representative of said differences, to generate a new modified resource.

The definition of a site (meaning a set of pages such as a Web site) is separated into two types of XML data, so as to make a good separation between "classical" XML data and XML data related to specific features of our system:

"Legacy XML" data contain all raw data that were created for a site (in this case the "legacy XML" replaces the "current version" described in the first part of the report). For example, in the case of the page containing a view to another page on the site, the contents of these two pages are in the legacy XML, but not the fact that the first contains a view to the second.

The "differences XML" (this is the equivalent of the differences object described in the first part of the report) contains everything that is missing in legacy XMLs to describe the site completely, in other words does not contain any content (text, etc.) but rather everything that is a reference between elements, the position and the reference of all views. It will contain derived pages and the description of the differences (hence its name) present in the derived pages with respect to the original pages[118]. The structure of these XML files will be described in the following sections.

[118]Once again, if the user has added or modified an element, the content of his element will be located in a legacy XML and the fact that he has added or modified an element and the position of the new element will be in the differences XML.

Note that what is referred to as the "XML file", particularly for legacy XML, can be stored and organised in different ways and not necessarily in the form of separate XML files, for example by grouping them in a single file under the same node, or in an XML database.

Finally, note that since the user can create derived versions of the external pages, the differences XML may contain references to pages/elements located in an external page (html) rather than in a legacy XML.

Finally, this section describes how to create a description of a page derived from a version modified by the user (using any off-the-shelf editor), but these structures can also be modified using a specialised editor, particularly an editor capable of creating views.

How to Identify an Element that has to be Referenced

In order to be able to describe modifications made by a user on a page, references to elements of the original page should be placed in this description.

Two cases can arise for a particular reference:

Either the referenced element has a unique identifier, and the reference is fully defined by this identifier.

Otherwise, a description either of the content of the element or of its position in the page has to be given.

More precisely, in the absence of an identifier, there are three ways of identifying an element in a document:

deep-d-ref (deep direct reference): if we are talking about an element to be deleted, the complete content of this element is given together with the required element number (necessary in the case in which several elements have the same content). Such a reference could be something like "the third occurrence of <p>hello<br/>world</p>".

shallow-d-ref (shallow direct reference): if we are talking about an element to be modified, the element is given with its internal text (but not its children).

p-ref (reference by parents): if we are talking about an element to be moved, or the location at which an element is to be placed, the xpath of the element is given.

Differences XML

The differences XML describes the dynamic part of the system, particularly everything that is a reference. It describes which data should be used and how to modify them so as to build up the final XML structure that will be used to build what will be presented to the user (this will be called the "result structure" in the following).

Each node in the differences XML corresponds to a node in the resolved structure and specifies 1. How to build the content, in other words the data to be placed for this element in the resolved structure 2. The location at which it is to be placed in the resolved structure.

The first data is specified using the name of the element and possibly a ref attribute that indicates a data source.

The differences XML file may contain the following elements[119]:

[119]This method is a variant to the diff object defined in the first part of the report.

deported: This means that the content of the element must appear as a copy of the element pointed by the attribute ref (with all children)

imported: This state is similar to deported, with the difference that the element is a derived version of the source (pointed by ref), therefore it may be a modified version of the source (i.e. in addition to ref, it may be defined by modifications to be made to the source).

created: Indicates that the element has been created from nothing by the user. It contains an attribute ref indicating the location at which the element should be taken in a legacy XML (all children of the node pointed at in the legacy XML will be taken with it).

rejected: Indicates that the element must not be displayed. The element then has a replacing attribute to delete the element that would implicitly have come through an import (with its children).

propagated: indicates that this element has been suggested as being in the upstream direction by the author of a derived page. This element behaves in the same way as a deported element.

moved: An element contained in an imported element may be in this state. It indicates that the corresponding element at the source of the import was not modified but simply moved within the imported element.

Only the imported, created and moved elements can have children.

The second data (on the location) may be defined as follows:

Using a reference of the replacing attribute: if a child of an import has this attribute, the element corresponding to the source of the import containing this element will be replaced by it. In particular, if the element is in the rejected state, this attribute means that the element pointed at by replacing must be deleted in the resolved structure (a replacing attribute always refers to a child of the source of the closest import containing the element with this attribute)

Implicitly: If A immediately precedes an element C, it will also immediately precede this element C in the resolved structure. If an element A is a child of element B, this means that A will also be a child of B in the resolved structure.

In order to place implicitly an element, it may be necessary to place "markers" that are simply references to elements of the source of an import or a legacy XML (a marker always points to a child of the reference of the closest created or imported node containing this marker).

Note that markers do not have identifiers because their only usefulness is to place others.

Figure 31:
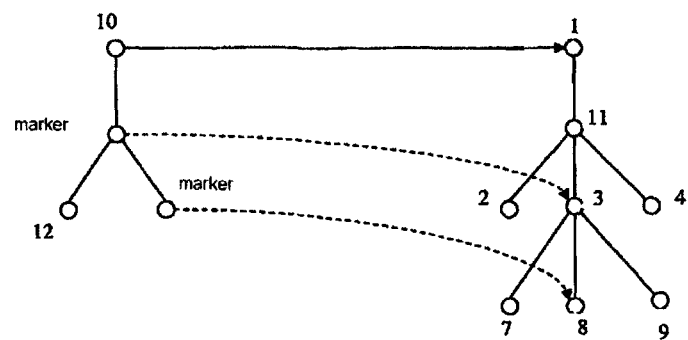
FIGS. 31 to 37 illustrate a transclusion process.

FIG. 31 presents an element 10 being an import of an element 1. The element 1 has a child 11 that itself contains children 2, 3 and 4, and element 3 contains children 7, 8 and 9.

In the XML file, the element 10 contains a child (marker) pointing to 3, and this marker contains an element (12), for example in the imported state followed by a marker pointing to 8.

These markers indicate that the element 12 must be placed immediately before 8, and if 8 is not found, then 12 must be placed as a child of 3.

Figure 32:
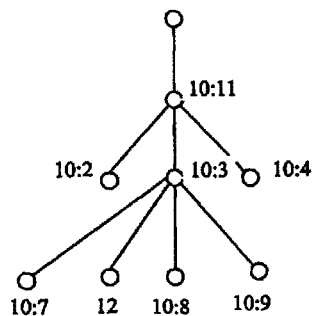

Therefore the resulting structure (see FIG. 32) is as follows: 10 has a child 10:11 that itself contains three children 10:2, 10:3 and 10:4 and 10:3 contains four children 10:7, 12, 10:8 and 10:9. Note that element 10:11 is not present in the XML file even in the form of a marker.

Finally, if an element must replace an element in the source of an import while being placed elsewhere (the new location being specified implicitly), the reference to the element to be replaced is located in the movedReplacing attribute and replacing is not present in the element description.

Several location data may be present for the same element, and these data are taken in the following order, the first that can be applied being used:

1. if the replacing attribute points to an element always in the imported structure, the element will be placed as the pointed element.
2. otherwise, if the element is a child of an element $E_1$ and is followed (directly or not) by another element $E_2$ (also a child of $E_1$), then it must precede $E_2$ if there is an element corresponding to $E_2$ in the import source.
3. otherwise, if the element is a child of an element $E_1$ then it must be placed as a child of the corresponding element in the resolved structure.

Note, for the second rule, if the element $E_2$ exists in the import source but not in the resolved structure (for example because $E_2$ in the import source is moved as a child of an element that was deleted in this derived version), then it will not be visible in the resolved structure.

Content of Legacy XML

Each legacy XML defines an XML structure with no references, that can be placed as such in a resolved structure (actually all elements of a resolved structure are located either in a legacy XML or in an external page (html)).

All elements of a legacy XML will preferably contain an identifier so that the differences XML can refer to them, for example to indicate where to place the view in this structure.

For example, if the user has created a page P containing a view V, and has added a paragraph inside this view, the page P without the view will be located in a legacy XML, and the paragraph added by the user will be located in another legacy XML. It is not possible to put the new paragraph and the remainder of the page in the same legacy XML because they are separated by nodes from elsewhere (the source of the view).

If the user now adds two paragraphs in the view, they should be placed in two different legacy XMLs (because once again, they will not form a structure in a single piece).

Example of XML Structures

Figure 33:
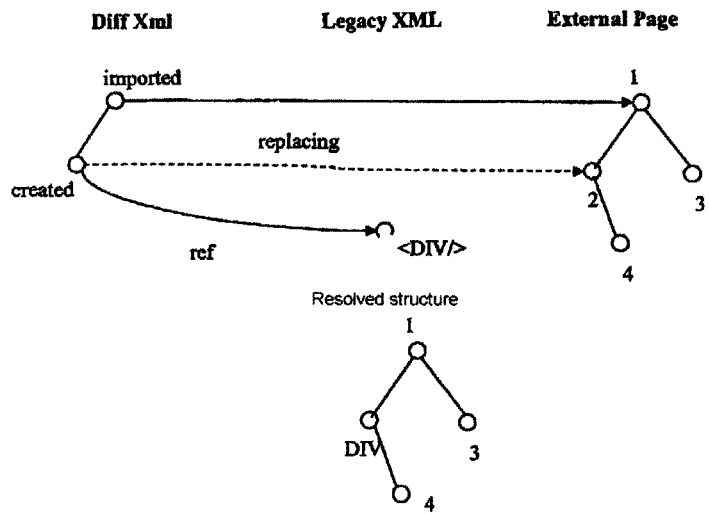

FIG. 33 shows an example of a small web site illustrating the role of different files. Suppose firstly that the user creates a derived version of an external page and modifies an element (2): for the derived page, we will create an imported element, and for the modification we will create a created element with a replacing attribute. The new content (DIV) will be in a legacy XML and is pointed to by the ref attribute.

Modifications made on an original page are processed one node at a time:

Suppose that the user has not modified the child 4 of 2. Given that the replacing attribute only means a replacement of a node (without its children), there is no need to make a copy of 4 (and if 4 changes in the original page in the future, the changes will be reflected in the modified version).

If the user also modified 4, another created element would have been created as a child of the first, pointing (ref) to another legacy XML.

Figure 34:
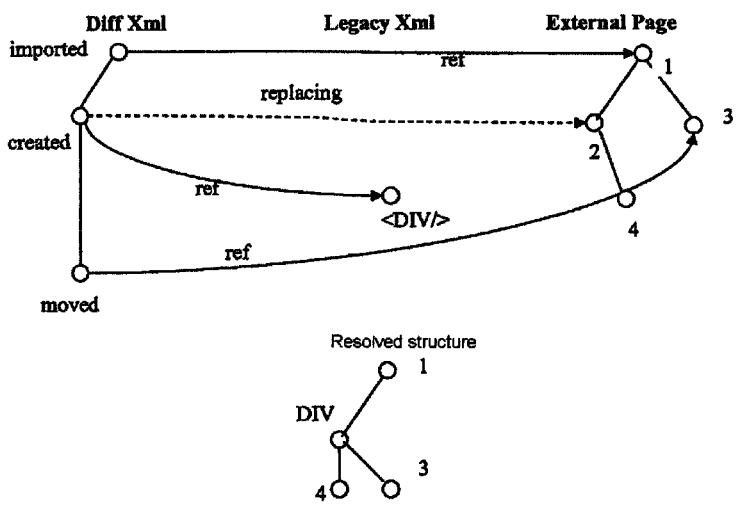

FIG. 34 shows what happens if the user moves 3 as a child of its div node:

A moved element will be used to notify that the element has been moved but not modified.

To indicate that the user has placed the element as a child of the created element, the moved element is placed at this location (if 2 had net been modified, a marker would have had to he created for 2 at the location of this created node).

Figure 35:
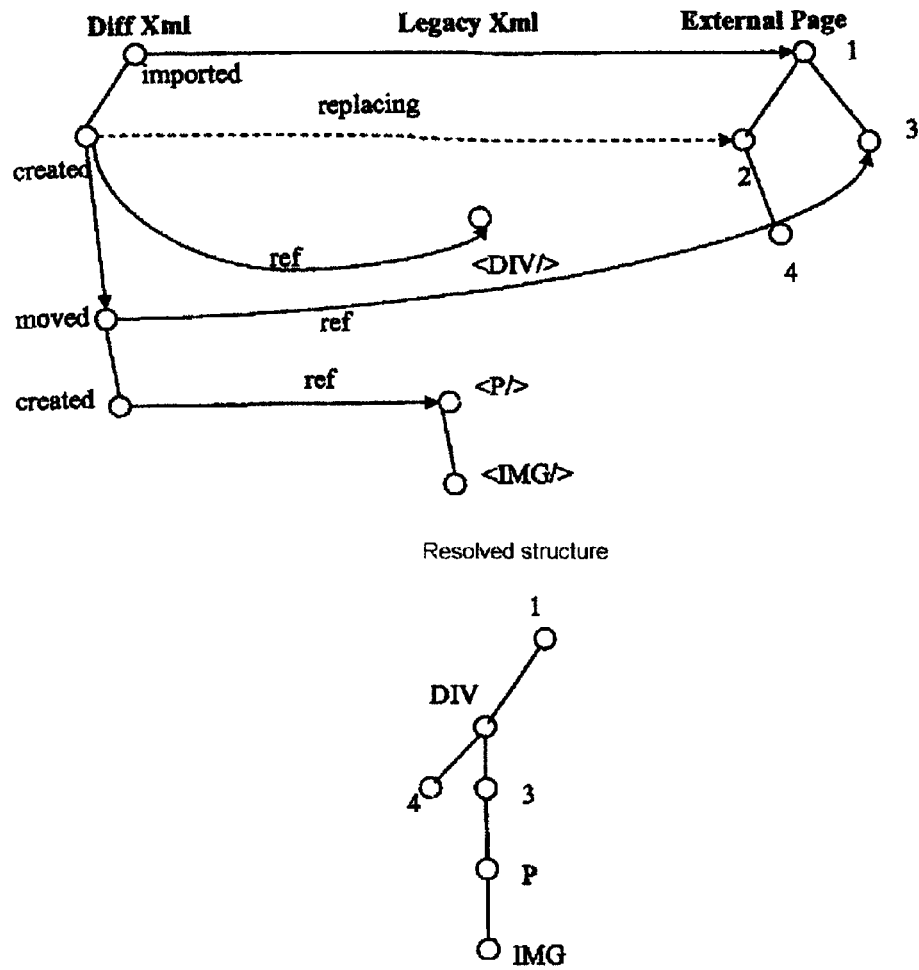

Finally, FIG. 35 shows the case in which the user creates elements (for example a paragraph containing an image) inside this element 3.

Once again, a legacy XML has to be created and these elements have to be placed in it, and a created element then has to be placed at the location at which these new elements are to be found. Unlike the case of a modification of an element, at the time of the creation several elements can be created simultaneously with a single created element. Markers can be used so as to be able to place elements (for example moved, imported, etc.) in such a structure. As already mentioned briefly, a marker always refers to an element from the closest import or creation, unlike moved element references that are exclusively applicable to the nearest import (an element can be moved into a created structure simply by displacing it directly into the legacy XML).

Manipulation of Views in a Page

As already mentioned, the system can be used to create views in pages leading to other pages. From the XML point of view, this is equivalent to adding a deported node in the legacy XML at the location in question.

When a view is modified, the system will create a derived page (therefore an import) from the source of this view containing modifications made by the user, and change the definition of the view to make it point to this new derived version.

Construction of the XML File Starting from a Modified Html Version of an Existing HTML Version (Diff Algorithm)

The user has made modifications on a Web page and the system must now construct the definition of this derived version. The elements of the original file all have a unique identifier, and the system considers that these attributes are kept when the user makes modifications on the elements.

This is done in three steps.

1. Firstly, the objective is to create correspondences between elements of the modified file (which will be called H' in the following) and elements of the original file (H).

2. The next step, independently of the content, is to create structure changes made on the document. These changes will be described using a structure containing markers and elements in the moved state.

3. Finally, once the structure changes have been defined, it is necessary to describe changes to the contents (in other words changes of attributes or text). This will be done above the structure already mentioned constructed in the previous step.

Note that in order to avoid the need to create markers and then delete them later, it is actually preferable to do the last two steps in parallel.

Secondly, in the following explanations, putting an element in a given state means creating an XML element with the same name as the state in question. Production from this algorithm will always go into the XML differences file, because it is an import.

1) Setting Up Correspondences

The first step consists of setting up a table indicating the element(s) of H' that possess the same identifier, for each element of H, and then constructing the set of elements of H' that either do not have an identifier or that have an identifier but that is not in H.

Thus, the elements of H' or H can be classified into four categories:

A) Elements that are located in H but not in H' (in other words have been deleted by the user)

B) Elements located in H and precisely once in H'.

C) Elements located in H and more than once in H' (in other words there are several elements of H' with the same identifier—only the identifier is considered for setting up these correspondences).

D) Elements located in H' and not present in H, i.e. either not having an identifier or having an unknown identifier. The latter case can occur if the user has done a copy-paste from another document, and in this case the identifier is external.

2) Detection of Structure Changes

The second step is based exclusively on the structure (i.e. what node is the successor/parent of another) and on correspondences built up in the previous step.

Every element of H' in case A is placed in the root of the XML structure in the form of a rejected element.

All elements of the tree H' are then browsed from the root to the leaves, then from right to left (so that successors of a node are processed before the node).

For every element in case B, it is necessary to search whether or not the element has been moved. Denote the element of H' as 1' and the element of H as 1. Let P(1') be the parent of 1' and P(1) the parent of 1. Finally, let S(1') be the successor of 1' (if it exists) and let S(1) be the successor of 1, if it exists. The successor of 1' is the first child of the same parent according to 1' and is neither created nor moved. The successor of 1 is a first child of the same parent after 1 and that has not been deleted in H'. Create markers in the XML structure for correspondents in H of S(1') and P(1'). These markers must only be created if there are still no elements in the XML structure corresponding to the same elements of H'.

If S(1') does not correspond to S(1) or if P(1') does not correspond to P(1), the element must be placed in the moved state[120], as a child of P(1') and as a predecessor of S(1') (create these elements in the form of markers if they do not already exist explicitly. If P(1') did not exist, it can be placed as a child of the root of the tree).

[120]Otherwise the state is simply not yet specified and will be given a value in the next step.

For a class of elements in case C (a class means a set of elements with the same identifier), it is important to choose an element that will be processed as being in case B. The simplest thing is to search to see if one of them has been put in the moved state by the description of the algorithm for the previous case. If such an element is not found, then take the first[121].

[121]This method can then be refined, ideally the element most similar to the original element in terms of position in the file and content should be chosen.

For other elements in the class, provide them with a new identifier and process them as in case D. In the next step they will be seen as created elements and a copy of their contents will be made. Note that, like the rest of the algorithm, work is done node by node, and even if the user has made a copy of an entire tree, this operation will have to be done one node at a time and not for the entire tree.

Finally, elements in case D must be placed using markers as already described. Their state will be created.

3) Detection of Content Changes

The previous step was simply to construct an empty structure only containing references to H. The next step is to create legacy XMLs when necessary, with the new content of elements that the user modified or created, and decide what will be the state of the elements.

Elements in case A do not have any content, since they were deleted by the user.

For elements in case B or C, the element has to be compared with the element in the original document (E), in other words its internal text and its attributes. If this content is different, the element must be placed in the created state and its replacing (or moveReplacing if the previous step had put it in the moved state) attribute must be made to point to the original element. The new content of the element must be placed in a new legacy XML and pointed to by the ref attribute. Otherwise, if the element had been put into the moved state in the previous step, leave it in this state. Otherwise, if the element had not received a state, it can be deleted from the structure.

For case C, all elements of a class except one will be processed as created elements, as if they were in case D. (If the structure analysis step and the content analysis step are separate, then this implicitly arises due to the fact that these elements will have received a fresh identifier, therefore which is not in H).

Finally, for elements in state D, it is necessary to place their content in a legacy XML. Their state will be created and they will not have the replacing attribute. (The content of this element will be pointed at by the ref attribute).

If the parent of an element D is also in case D, they can share the same legacy XML, and only the parent has to he present in the differences XML. If the predecessor or a child (1) of an element D (2) that has thus been hidden in the differences structure is not case D, then a marker will have to be created pointing to 2 in the legacy XML, so that 1 can be placed in the resolved structure.

Propagations in the Upstream Direction

When a user has made a modified (in other words derived) version of an original page, he can suggest his modifications for consideration by the owner of said original page. The owner can then accept the modifications suggested to him, thus integrating them into the original page.

Thus, every time that a page is opened in edit mode, all suggestions originating from derived pages are displayed inside the page.

Figure 36:
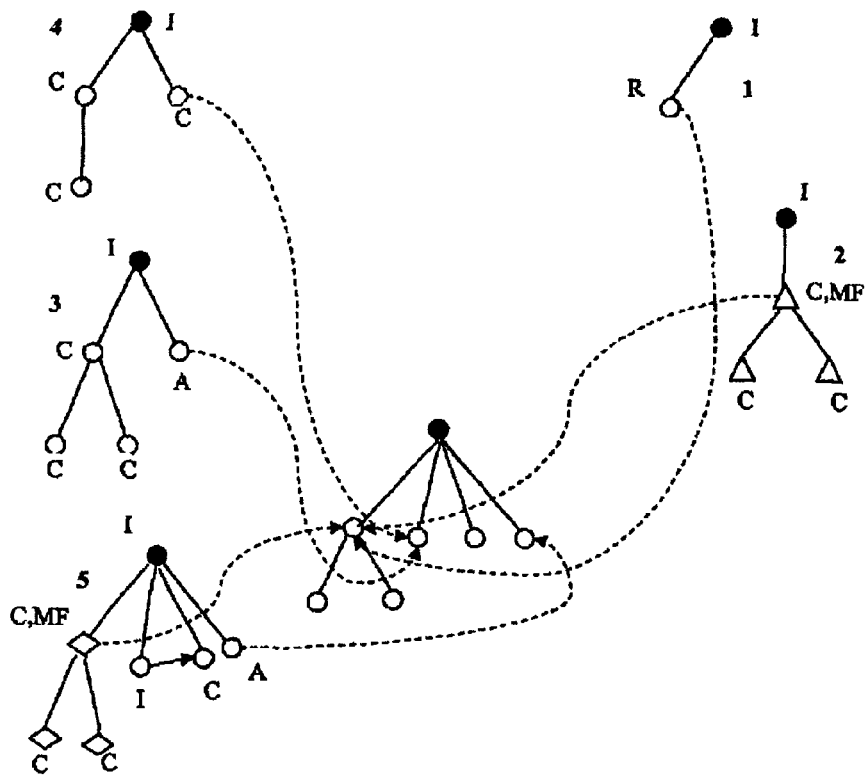

FIG. 36 shows an example in which five authors of pages derived from an original page have suggested their modifications. In this example, 1. The first user has suggested that the first element of the page should be deleted
2. The second user has suggested that the first element should be replaced by another version.
3. The third user has suggested an element to be added before the second.
4. The fourth user has suggested another element, also to be added before the second.
5. The fifth user has suggested that the first element should be replaced by yet another version, and also that a pair of elements should be added (the first of which is a version derived from the second) before the fourth.

Figure 37:
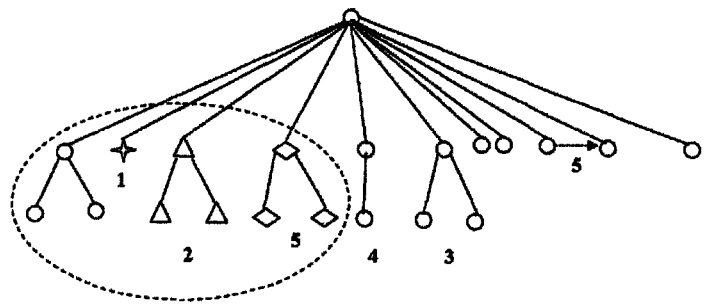

FIG. 37 presents what the user sees on the upstream side (in other words the author of the original page):

In particular, it can be seen that he has three alternative versions to the first element, including the suggestion to delete it.

Then, concerning the suggestion of the fifth user, the user can accept either the two pages (the first of which is a version derived from the second) but cannot accept the first without accepting the second.

The following is a brief description of the way in which propagations in the upstream direction work from the XML point of view.

Everything happens at the level of the node, which means that if the user activates propagation in the upstream direction for an entire sub-tree, in actual fact he will activate propagation of each element of this sub-tree individually in the upstream direction.

When an element is propagated, a propagated element with a ref attribute pointing to the propagated element will be placed at the corresponding location on the upstream side (possibly using markers if the page on the upstream side is a derived page itself).

More precisely, this element will be placed as a child of the element corresponding to the parent on the downstream side, and immediately before the element corresponding to the successor on the downstream side.

If the parent of the propagated element already exists on the downstream side, the propagated element will be placed as a child of this element. If the user on the downstream side created the parent himself, the two corresponding propagated elements will be placed as children of each other.

Consequently, if the user modifies an element in the page and adds a child to this element, and then activates propagation for both of these elements, he will firstly create a propagated element that is a brother of the original element, and then a propagated element that is a child of the original element (and not a child of the propagated element corresponding to his modification—thus, the user on the upstream side can accept the new child and refuse the modification to the parent).

On the downstream side, when an element is propagated, it receives a back="active" attribute to indicate that it has been propagated in the upstream direction.

The upstream side user can then refuse this propagation (in which case the upstream side propagated element is deleted, and the downstream side element receives a back="rejected" attribute). Finally, if the upstream side user accepts this propagation, the downstream side element will be moved to the upstream side, in other words the upstream side propagated element will be replaced by the downstream side element, and the downstream side element will be deleted from the differences XML file. It will then be made visible in the page in the same way as if it had been created on the upstream side.

If the element has a replacing attribute, it will effectively replace the original element, in other words the children of this element will be moved as children of the new version, and the old version will be deleted[122]. The upstream side identifier will remain the same during this operation.

[122] Note that markers that give identifiers to elements can be used, to avoid changes to downstream identifiers when doing an upstream propagation.

Construction of the XML to be Sent to the User

This algorithm is used both to handle pages derived from html pages (or more generally from any XML structure without any identifiers) and pages derived from XML pages (provided with identifiers), the only difference being the nature of references to the original page, which are references relative to the position or the content in the first case, and references to identifiers in the second case.

When algorithms constructing the XML stored on the disk have been described, the next step is to see how this XML should be used to build the XML structure to be returned to the user, in which for example everything that was implicit has been made explicit, in which differences from a derived page are made on the current version of the source of this derived page, and so on.

This part of the system is called the Resolver.

More precisely, the resolver is a system capable of finding an element given its identifier, and once an element has been found, it can return some of the children selected by filters and a maximum depth.

It works lazily, in other words it receives a request, and a sub-set of the complete resolved site is constructed during processing of this request and enlarged as a function of needs.

It can be shared into three parts, that are:

1. Construction of a node starting from its definition

This is the contrary to the second part of the diff algorithm presented above, in other words the objective for an element in the differences XML, is to build its content (but not its children).

2. Construction of the list of children of a previously resolved element

This part must be capable of managing element movements (moved elements).

3. Search for an element from its identifier

This last part is actually the first thing that the resolver needs to do. Having an identifier, the objective is to find the definition of the element with this identifier (it is possible that the identifier is the identifier of an element that is not present in the differences file, but was imported). Once this has been done, the first part can be used to construct the element, and then the second part can be used as many times as necessary to obtain the entire structure requested by the user in his request to the resolver.

For each element imported from the lazy structure, the system must store the list of modifications to the source that have not yet been applied. The beginning of this list contains the set of descendents from this import (in the differences file) that are not markers and are not separated from it by another import.

The other important thing is to separate the movement of an element into two differences that are to delete the element at the source of the movement; and to replace the element at the move destination. This is necessary because if only part of the tree containing the move source has been resolved, then only the first part of the move can be done (and if the resolved structure is enlarged later to cover the move target, then the second half of the move can be made). Conversely, if only the move target is resolved, the first half of the move will have to remain in the differences list, such that if the move source is resolved, then the element can be deleted from this location.

In practice, these two move halves can be defined by saying that the first half is a deletion and the second half is effectively moved (or movedreplacing), bearing in mind that the semantics of moved changes in the framework of this algorithm.

Construction of a Node from its Definition

As already mentioned in the diff algorithm, the content of an element in the resolved structure is defined by its state, in other words by the name of the element in the differences file.

- If it is a created element, the content is the XML node (located in a legacy XML) pointed at by the ref attribute.
- If it is a moved, imported or propagated element, then the content of this element is the same as the content of the element pointed at by its ref attribute. Note that when an imported element is encountered, the differences list that this import describes has to be stored in an associated structure, as was said in the previous section.
- If it is a rejected element, this means that it has to be considered that the element does not exist (requesting this element will produce an error).

List of Children of a Previously Resolved Element

The objective for this part is to take the list of children located at the source (as seen in the previous part, each element has a source. It is always a completed resolved structure, and not for example part of a differences file), and then search for differences that concern this list of children and apply them.

Therefore, the list of differences not yet applied of the closest element in the imported state equal to or containing the element should be used, and the differences corresponding to one of the following criteria should be selected in this list:

1. Modifications, deletions, movements of an element in this list of children, and therefore all elements with a replacing or movedReplacing attribute pointing to a child in the list, and all moved elements with a ref attribute pointing to a child in the list.

2. Movements or creations of elements to the inside of this list of children, in other words all elements immediately preceding an element in this list of children (in the differences file), with no (moved) replacing attribute pointing to an existing element at the import source.

3. Movements or creations of elements as children of the element for which children are to be constructed, in other words all elements to be placed using their parent in the differences file (for example possibly a marker) and for which the successor does not exist in the differences file or does not exist at the import source, and finally without a (moved) replacing attribute pointing to an element existing in the import source.

Therefore, all differences corresponding to one of these criteria have to be applied, and they have to be removed from the list of differences remaining to be applied.

Search for an Element from its Identifier

The first thing to be done by the resolver is to locate the element for which the identifier is given in the request.[123]

[123] An import may specify that only one element, its children, and its ancestors must be returned, using a derivedOfElt attribute (this is described in more detail in the framework of the second system). The resolver should manage it as follows. If an attempt is made to build a child from an import for which this attribute exists and is distinct from the Ref value, then the first step is to find the element pointing to the target of derivedOfElt (by calling the resolver) and then this element is connected to the import by constructing the parent chain until the imported element is reached. If the algorithm attempts to reach a descendant of this element imported through the identifier directly, then it can be determined if it is a child of derivedOfElt by placing it in M and importing it into R rather than into M.

If the element is explicitly present in the differences XML, then all that is necessary is to use the method described in the first part (construction of a node from its definition).

If the element is not present but contains a composite identifier (let us say h:t), then the first step is to search for the element h, then search for the element pointed at by the reference of this element, and finally its child (in the resolved structure) with t as its identifier.

Note that it is possible to ask for an element that was rejected in a page directly, and the request will still be accepted. This is justified by the fact that rejecting part of a page is considered as if the user had put a cache in front of the element, making it invisible but without really deleting it. Thus, when the whole page is displayed, the rejected element is not located in it, but it is possible to display something located in this cache However, if the user had created this element himself, it can be deleted completely to avoid taking up space unnecessarily.

Search for the Parent of an Element

To find the parent of an element that has been resolved, it is important to look to see if the element has been placed by its replacing attribute (in which case the parent corresponds to the parent of the element pointed at by this replacing attribute) or by markers (in which case the parent is the parent referenced by the parent of the element in the diff file).

Description of the System Implementation

Glassbox

The glassbox concept (the glassbox server, the glassbox derivative, delegation to another glassbox, etc.) is described in the context of the variant described later (the reader should refer to this description), but is also fully applicable to the system described herein.

Construction and Updates of the Corpus

There is a single corpus for the entire system[124] (common to all glassboxes hosted in it). It associates an identifier with each URL, the forward and backward links[125] and imports/deports (in other words views) that it makes (this is used to inherit links of views).

[124] This means the part of the System managed on a server (knowing that there may be several servers)

[125] (in other words incoming and outgoing links)

Then, each support group (of a glassbox) stores the initial associated links (denoted R), the union of their incoming links ($R^-$) and the union of forward links $R^-$, $R^+$.

For each page of $R^{-+}$, there is an associated authority score. If the distillation to the downstream side algorithm[126] is also used, then sets $R^+$ and $R^{+-}$ will also have to be stored and their corresponding authority pivot scores have to be associated with pages in the second set.

[126] This algorithm is symmetrical to the algorithm described in the previous section in which, instead of R−, R−+ and R−+−, we use R+, R+− and R+−+ and then evaluate the extent to which the candidate pages R+− cite pages of R+ cited by pages of R.

These sets must be updated regularly. A page (i.e. its forward and backward links) must be updated if[127]:
- the last update is sufficiently old,
- a support element contains it and is used frequently to obtain results,
- the page has one (or more) good scores
- the system has been inactive for a certain time.

[127] (All these factors must be present to a certain extent, for example a sum can be made and pages with the largest value can be chosen).

All update work is done asynchronously, in other words a request to the system can trigger an update but processing of the request will not wait for the update to be completed. (Implementation of the system is described later).

Since the scores are thus available for the support groups (of the glassbox), the system can identify the pages $P_i$ most relevant to the current visited page $P_0$, as described above, and also most relevant to the navigation context K by calculating the logical sum (or the maximum) of the products of scores relative to a support group $E_j$ with the score $K_j$ of this support group in the navigation context $$s_i = 1 - \prod_j \lfloor 1 - K_j \cdot E_j(P_0) \cdot E_j(P_i) \rfloor$$

or $$s_i = \max_j \lfloor K_j \cdot E_j(P_0) \cdot E_j(P_i) \rfloor$$

as already described.

Architecture

Figure 38:
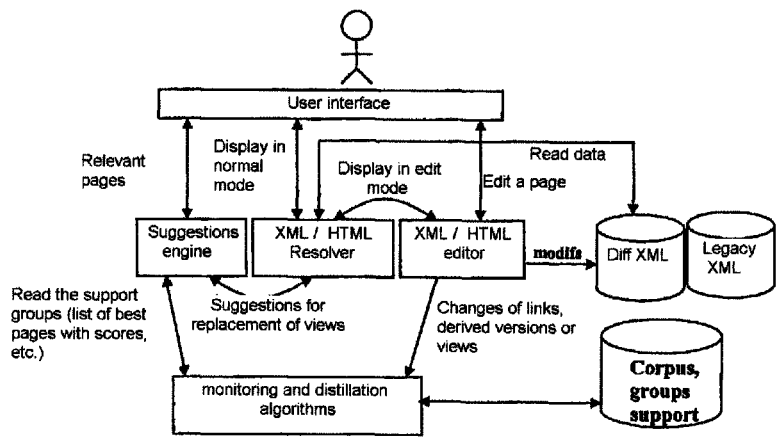

FIG. 38 diagrammatically illustrates the architecture of the complete system.

Corpus, Support Groups

In the following example XML structure, the text shown in bold represents data stored during serialisation in an XML file, while characters in finer text represent data that are only stored in memory (and are constructed lazily).

```
<GlassBoxServer>
    ...
    <Supports>
        <SupportGroup id="1"  distillationNeeded= "true" supportElt="http://demo.gbx.fr/resolve?id=8">
            <Req>

...
            </Req>
            <rejected>

...
            <rejected>
            <reqB>
                <hub id="3" hubScore="0.025643" />
                ...
            </ReqB>
            <ReqBF>
                <Authority p="1" hyperScore="0.00764" />
                <Authority p="2" hyperScore="0.00002" wordScore="0.09135" />
                ...
            </ReqBF>
            </ReqBFB>
                <Hub id="3" hubScore="0.025643" />
                <hub id="350" hubScore="0.00769" />
                ...
```

-continued

```
            </ReqBFB>
        </SupportGroup>
        ...
    </Supports>
    <Derived>
        <Page id="1">

...
        </Derived>
    <Corpus>
        <Page id="1" url="http://cocacola.com/index.htm" freshness="oldPage">
            <Fwd>
                <Page id="2" weight="0.99653" />
                ...
            </Fwd>
            <Bck>
                <Page id="4" weight="0.87451"/>
                ...
            </Bck>
            <eFwd>
                <Page id="2" weight="0.99653" />
                ...
            </eFwd>
            <eBck>...</eBck>
            <words>
                <word w="Hello" f="0.011" />
                ...
            </Words>
            <AltUrl>
                <Url="http://www.cocacola.com/" />
                <Url="http://cocacola.com/" />
                <Url="http://www.cocacola.com/index.htm" />
            </AltUrl>
        </Page>
        <Page id="2" url="http://cocacola.com/fresh.htm" freshness="newPage"
transToOldDate="27/02/2003">
            <Fwd>...</Fwd>
            <Bck>
                <Page id="1" weight="0.99653" />
                ...
            </Bck>
            ...
        </Page>
        <Page id="11" url="http://demo.gbx.fr/resolve?id=143" freshness="oldPage">
            <Views>
                <Page id="1" />
            </Views>
            <Fwd>...</Fwd>
            <Bck/>
            <eFwd/>
            <eBck>
                <Page id="4" weight="0.87451" />
                ...
            </eBck>

...
    </Corpus>
    <TrustedPages>
        <Page id="8">
        <SupportGroup id="3"/>

...
    </TrustedPages>
    <Friendship>
        <Neighbours>
            <FriendServer ip="1.2.3.4" />
            <FriendServer ip="1.2.3.5" />
            ...
        </Neighbours>
        <Evils>
            <FriendServer ip="6.6.6.6" />
            ...
```

```
        </Evils>
        <FriendCache>
            <FriendCacheEntry  url="http://fraises-des-bois.com"
                s="1.2.3.4"
        birth="23/05/2003">
                <Usage>
                    <UsageEntry date="12/6/2003" count="2" />
                    ...
                </Usage>
            </FriendCacheEntry>
            ...
        </FriendCache>
    </Friendship>
    ...
</GlassboxServer>
```

The following is a brief description of the different elements appearing in the above structure:

GlassboxServer: The data structure associated with a system.

Supports: The set of support groups in the system.

Supportgroup: a support group, with a reference to the associated support element.

Req: initial associated links of the support group.

Rejected: all pages that must not be presented in association with this support group.

ReqB: the set $R^{31}$, i.e. pages pointing to at least one initial associated link.

Hub: a pivot page for a support group. Its pivot score is stored in memory.

ReqBF: the set $R^{-+}$

Authority: an authority page for a support group. Its authority score is known by the links and (if the page is new) its score is known by the words.

ReqBFB: the known subset of $R^{-+-}$ (the system does not search for internal links in a page unless this page is located in the initial links of a support group or has a good authority score for at least one support group).

Derived: stores the table of the system's derived pages (in the example, 11 and 19 are pages derived from 1).

Corpus: this includes all known pages in the system.

Page: A page is located in the corpus. It has an identifier by which it is referenced from other points in the data structure. Freshness indicates if it is a new page, and transToOldDate indicates the date on which the page will become old, if it does.

Fwd: All links starting from a page. The weight of the link is also stored (for anti-nepotism)

Bck: All links arriving on a page (inverse links)

eFwd: The "extended" set of links starting from a page, i.e. Fwd to which virtual links are added.

eBck: The "extended" set of links arriving on a page, i.e. Bck to which virtual links are added.

Words: The distribution of words on the page

Word: A word is associated with a frequency (for which the sum of the squares for all words is equal to 1)

AltUrl: If the system detected that several different addresses correspond to the same page, this element will store the other URLs for the page The following elements refer to the "Delegation to another server in peer-to-peer" section presented later on:

Friendship: Groups all data corresponding to the peer-to-peer network of the servers of which the server forms part.

Neighbours: These are all neighbour servers, i.e. servers to which this server can send requests (see description later on).

FriendServer: Describes a neighbour server.

Evils: Glassbox servers that the current server will remove from the list of search results before returning it, for example servers of competitive sites.

FriendCache: A cache of the most recent and the most frequently requested requests, associated with the glassbox server that could have replied to it.

FriendCacheEntry: A cache entry specifying the request and then the server that could have replied to it, and the date since which this entry is located in the cache.

Usage: Describes recent use of this cache entry.

UsageEntry: Gives the number of requests for this URL on a given date. The interval between the oldest and the most recent entry in the Usage list is subject to a maximum and when it is on the point of being exceeded, entries that are too old have to be removed.

Dependences Between Entities

The system operates based on a dependences network. Thus, the system constructs a dependences network and decides on which part of the system has to be constructed/updated as a function of requests and needs, as a function of arcs on this network.

Formalism

As already mentioned above, the objective is to describe the dependences network of the system.

A node on this graph represents a resource, to which a certain set of data correspond.

An arc (oriented) on this graph represents a dependence. If it is an arc from a to b, then b (called the target of the dependence) depends on a (called the source of the dependence) if a change in the data associated with b can involve a change in the data associated with a.

Figure 39:

Therefore, a dependence will be shown as in FIG. 39.

Figure 40:
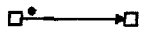
Figure 41:

One of the ends of each dependence is called the initiator of the dependence. The initiator is the resource that will activate the dependence:

If it is the source, we talk about a push dependence, and as soon as the source detects a change in its data it will inform the target about it. This is shown as in FIG. 40;

If it is the target, we talk about a pull dependence and as soon as a request reaches it, it will ask the source whether or not it should update itself (which in cascade could force it to update itself). This is shown in FIG. 41.

Figure 42:

In some cases, it is possible that both ends initiate the dependence, which means that the source will notify the target about its changes and that the target will send a request to the source to ask it if it is up to date. This type of dependence on a scheme is shown as in FIG. 42.

The strength of a dependence indicates if it justifies making the user wait when an update is necessary:

A dependence is strong if the system must make the user wait if the dependence update has not been made (in other words if the request is applied on the target of a strong dependence, the request can only reply when this dependence is up to date). (In this case, the dot on the above diagrams is replaced by an exclamation mark, see FIG. 43).

A dependence is weak if a request can provoke an update calculation but replies to requests are made immediately even if the system knows that the data is up to date.

Finally, a pull dependence can be timed, in other words it will only be activated if the most recent activation is older than a certain time (this will be represented by the symbol of a clock).

In the following dependence graphs, the arrow will be used to symbolise the fact that the object at the left can directly modify the data in the object at the right (and then inform the target that it has changed). This is different from a strong push dependence because in this case, the action of the dependence is simply to inform the target that it must update itself.

Dependences

FIG. 45 shows a representation of the dependences network (internal to a glassbox server).

A grey box represents an instance of the class for which the name is entered in the title, and names without boxes represent attributes of objects in this class.

An arrow entirely enclosed in an instance represents a dependence between two attributes of the same object.

An arrow, the ends of which are contained in a class but which passes outside this class, represents a dependence that can link two different instances in this class.

A triplet of segments without arrows (as in FIG. 44) starting from an attribute and leading to a class means that this attribute is an instance set of this class, and the box of the class represents an element in this set.

A name between parentheses means that it is an incomplete representation of an entity (for which the complete description is described elsewhere under the same name).

Finally, an arrow in dashed lines means a dependence for which the source, when it is up to date, can decide whether or not this dependence has to be followed (particularly, to obtain cycles in the dependences network, and such a cycle is followed in loop until a dependence of this type is activated by its source).

The structure of the same name in the XML document described above corresponds to each entity. There are also two entities wBck and wFwd (weighted backward and weighted forward) with which the same data are associated as with Bck and Fwd, in other words backward and forward links[128']. The difference is that a Fwd or Bck request does not guarantee that the weight of the links is calculated, while a wFwd or wBck request will assure that the weights are actually placed on all links before returning. Req, ReqB, ReqBF and ReqBFB were renamed R, $R^-$, $R^+$ and $R^{-+-}$, respectively for readability reasons.

[128]Inverse links are incoming links

The Time entity is something that, for the dependence manager, appears to have changed after an adjustable time interval. For push dependences, it thus represents updates to be made periodically, and for pull dependences it represents updates that should only be done at the time of a request if this last update is older than a certain time interval.

The Publisher entity represents the page editor: when the user modifies a page (adds/removes a link or a view), the Publisher will inform the Page object (that will make any necessary updates).

Internal dependences and dependences in solid lines in the above diagrams follow the description described in the formalism described above, and the following gives a description of other dependences (the numbers refer to the drawing):

The system assures that the links graph remains permanently consistent:

1) When the set of inverse links on a page is modified, the links on all pages that appeared in it or disappeared from it are immediately modified accordingly.

2) Also in the other direction: when the set of links starting from a page is modified, the inverse links of all pages that appeared in it or disappeared from it are immediately modified accordingly.

3) When the weight of a link starting from a page is calculated or updated, the weight of this same incoming link on the other page is also updated to this value (and the weight of a link is stored at the two ends for the pages).

4) Also in the other direction, if the weight of an inverse link changes, the weight of the same link is updated for the page at the other end 5) If the extended set of inverse links from a page changes, the extended forward links of pages that had appeared in it or that had disappeared from it are updated.

The inverse of 5 is not necessary because the only way of discovering a new forward virtual link is to firstly find the corresponding backward link.

When the weights of links used in the calculation of the scores of authority pages are changed, this score has to be recalculated:

6) When a request is made for authority scores for a support group, the system will verify if the weight of links starting from the pages of R− have changed, and if they have it will restart a distillation. It only checks if the latter is old enough.

As an example of the behaviour of this dependence network, the following describes the behaviour of the system when the user makes a request to have the right authority pages of a support group.

Therefore the system will start by requesting the ReqBF set of this support group.

Due to the push dependences relating Req to ReqB then ReqB to ReqBF, the system worked immediately after construction of the support group to construct all these support group attributes and page scores. If the construction of sets is not complete at the time of the request, the system will not reply to the user until it is terminated (because they are strong dependences).

Then, when the user asks for authority page scores, he can restart the distillation algorithm if the system notices that the weights of links or the links themselves have changed. (This verification is only made if the previous verification is old enough). If the distillation algorithm is restarted, the user will only receive a reply when it is complete.

Dependences Between Glassbox Servers

We will now briefly describe dependences between glassbox servers.

If two glassboxes are on different glassbox servers and the first is a derivative of the second, some dependences will be located between the two glassbox servers.

A support super-group means the corresponding support group located in the super-glassbox.

Considering that these dependences transport relationships to pages, if an update of a support group is transmitted from one glassbox to a sub-glassbox located on another machine, the pages concerned must be transmitted with it.

Specifically, this means that the union of R, $R^-$, $R^{--}$ (the subset that is known to them—this is used to calculate the weight of links from $R^-$ to $R^{-+}$), $R^{-+}$ and $R^{-+-}$ (the subset of that it is known). For each page, the set of forward and backward links. However, there is no point in sending scores of pivot or authority pages, nor sending the weights of links, because they can be calculated quickly once the links are known and can be different from one server to another.

In order to avoid useless traffic, the super-glassbox can attempt to send only variations of page links for this union (which would require that the date of the last change that occurred in these links should be stored for each page).

Variant (Second System)

We will now describe a second system using some of the methods according to the invention. Note that the descriptions given for each system may be applied alternately in the other system. In other words, practically every section of the description of the first system may be adopted for the second system and vice versa, each section in the description of the second system can be adopted for the first system.

Furthermore, methods of searching for the relevance score (relative distillation) or transclusion may also be replaced in this description by the methods (pipes and transclusions) described in the first part of the report and vice versa.

We will firstly introduce the approach:

Associative Memory

The user can modify an original page[129] —for example he can associate annotations with it—and save the modifications as a page derived from the original page. The derived page is simultaneously presented to it by the system when it revisits the original page.

[129](or start page)

The system is also capable of determining the degree of relevance of pages with respect to each other and with respect to the user's navigation context, by using links located in Web pages. Using this, the system can:

1. provide the user with annotations associated with pages that are relevant to the visited current page[130].

[130](more precisely, associations contained in derived pages relevant to the current visited page)

2. and when several pages derived from the original page exist, the system can select the most relevant of these pages considering the user's navigation context.

Thus, for each visited page, the system can present firstly the most relevant derived page for the navigation context and secondly relevant annotations, to the user[131].

[131]Obviously, the user can also display the relevant pages themselves (or their derived pages containing annotations).

An annotation may particularly be a link to an data resource (such as a document). The user can thus find data resources simply by putting himself in their relevance context: when the user browses and gets closer to the context of the resource that he is looking for, the system will propose it to him spontaneously. The system is thus an "associative memory".

The system can also communicate modifications and page creations between users using a system that is called a glassbox and that is described in the following.

Manipulation of Pages

The content of derived pages[132] is automatically kept up to date with respect to their origin. A page can be derived from a page that was derived itself, and so on. In a page, a view of a page[133] can be created that itself has a view of another page[134]. Modifications of the source are automatically propagated in cascade. Conversely, modifications made in derived pages may be "suggested" to the owners of their original pages for acceptance. The modifications will thus be propagated in both directions: from upstream to downstream and from downstream to upstream.

[132]A page means any information resource independently displayed by the user, such as a word processing document, an image, a file or even a database

[133](or an element of a page)

[134]A view can also be inserted within an existing view in a page

Each new propagation will be accompanied by the propagation of new data (particularly "virtual incoming links", described in the following) used to determine new relationships for pages. Thus, the associative memory function mentioned above is extended to pages created by the user himself: to find a resource, the user can simply view his own pages (and not necessarily browse on the Web).

Use of Derived Pages and Associative Memory

Web Pages May be Modified

The system that we will describe makes it possible to start from any page[135] (regardless of whether or not the user has a write permission), and to open it in an editor, to make modifications to it and to save it in the form of a derived page (from said arbitrary page). The derived page may keep references to the page from which it is derived and then remains automatically updated with regard to this page.

[135]This might be a Web page, a word processing page, a view of a data in a database, etc.

Every time that the user creates a new derived page, he can specify the "glassbox" in which he wants to put it. In practice, this is done using a current glassbox concept in which every new derived page is placed.

Glassbox

The Web is an oriented graph in which nodes are Web pages and arcs are hypertext links located in the Web pages. A glassbox is a "box" in which modifications of this graph made by users are saved; it is also a glassbox through which it sees the Web thus modified.

Since these changes are not saved on web pages themselves, but instead in the form of pages derived from the web pages, a glassbox is an extension (i.e. an enriched view) of the web composed of all these derived pages.

Note that a glassbox can also contain new pages (i.e. pages that are not derived from another page but are created from nothing).

A glassbox is also characterised in that centres of interest (or categories) called "support groups" are associated with it, such that the system can associate scores for relevance to these support groups with the pages.

Display the Derived Page Instead of the Visited Page

When the user visits a page through a glassbox, the system displays the derived page (derived from this page) which may be saved in this glassbox[136], instead of this page. If several pages are derived from this visited page, the glassbox selects the page which is most relevant to the user's navigation context[137].

[136](or in an upstream Glassbox, as will be described later).

[137] When a new derived page is recorded in a glassbox: its relevance context becomes a combination of the relevance of the original page and the user's current navigation context; the content of the page (e.g. its word distribution) may be characterised: the user can create links to it from other pages by simple drag-drop operations, and thus more explicitly indicate other pages to which it is relevant; and in particular, the user can insert views of other pages, particularly external Web pages and thus inherit their own relevance context (see the "Inheritance of relevance relationships" section). These means thus provide a way of characterising derived pages and therefore the glassbox can subsequently select the page derived from a page that is most relevant to the user's navigation context. This approach was described in the framework of the first system.

Annotation

Each modification to an original page is shown to the user at the same time as the derived page in which said modification was saved, except for the case of annotations[138] that can also be displayed independently (i.e. adjacent to or superposed on another displayed page).[139]

[138]The annotation is used as a special case of a page modification. Thus, each annotation associated with a page is saved in the framework of a page derived from this page. By clicking on an annotation with the mouse right button, the user can (select the option in the context sensitive menu enabling him to) view the entire derived page containing this annotation. Starting from the derived page, he can return to the original page with which the annotation was associated.

[139]Create an annotation that consists simply of highlighting part of a page. Typically, the user selects a part of a page (by keeping the mouse button pressed while moving the mouse to make the selection) and notifying the system that it is an annotation associated with this page. The system then creates a page derived from this page, in which he specifies the location of this annotation in the page. Obviously, the user can also modify the content of the annotation thus created, or also create an annotation containing new information (for example a link to another resource, see next section "virtual desktop"). Said created derived page then also contains these modifications or this new information.

Thus, in addition to the derived page that is presented instead of the visited page[140], the system is capable of presenting annotations contained in other pages that were derived from the same visited page, to the user[141]. These annotations are superposed on the displayed page by default, at the location at which they were created.

[140](as described above in the <<display derived page instead of the visited page>> section).
[141](and annotations contained in pages derived from the derived page displayed instead of the visited page, and so on).

The system is also capable of displaying annotations associated with relevant pages[142] (as described below in the "Relevant links" and "Navigation context" sections). By default, these annotations can in particular:

be displayed adjacent to the displayed page occupy spaces reserved for advertising in the page be positioned in accordance with the specifications given by the user at the time that the annotation is created[143]

or be arranged in a particular manner specified or chosen by the user (by selecting one of the display configuration options).

[142](more precisely, annotations in derived pages that are relevant to the current visited page)
[143]Typically, the user creates an annotation associated with a page by selecting the part of the page (by keeping the mouse button pressed while moving the mouse to make the selection) and/or provides the system with one (or more) comments (possibly containing a link) and optionally gives a set of keywords (or a display position). A derived page containing this information is then created. When the user accesses a page for which this derived page is selected as being relevant, the system searches in the page for the occurrence of one of these keywords (if applicable) and displays the selection and/or the comment adjacent to the position of this keyword and as unobtrusively as possible (the keyword is underlined and the annotation appears by rolling the mouse over the annotation).

Virtual Desktop

An annotation may contain a link to a data resource[144]. For example, the annotation may consist of an icon representing a document (and comprising a link to this document) that the user has associated with the page by doing a drag-drop (of this icon) from his desktop.

[144](such as a word processing or spreadsheet document, an image or an audio-visual document)

The system provides the option of downloading the resource located at the end of this link onto the server (glassbox server), such that when the annotation containing this link is presented, the user can automatically download this resource onto his client station and open it directly simply by clicking on it (as he usually does to open such a document).

Derived Glassbox

In the same way as a glassbox extends the web, a glassbox can extend another glassbox by containing additional derived pages (and possibly different support groups).

Thus, starting from an existing glassbox that he can access, the user can "derive" another glassbox that is an extension to it.

Glassboxes can thus be derived in cascade, in the direction from the upstream side to the downstream side.

Each glassbox represents (and covers) an "extended Web" composed of the web and all extensions provided by upstream side glassboxes and by itself.

When the user visits a page, the derived pages and annotations saved in the glassboxes are presented to him following the glassbox derivation chain, in the order from the downstream side to the upstream side. In other words, preference is given to derived pages (and their annotations) further on the downstream side.

Relevant Links

The system proposes links to pages relevant to the page displayed on the screen[145] and to the user's navigation context, through a glassbox.

[145](that maybe a page derived from the page that the user declared that he wants to access)

These links are sorted by relevance score.

The system distinguishes the "authority page" score (i.e. relevance of a page cited by other pages) from the "pivot page" score (i.e. relevance of one page citing other pages). The system is capable of displaying the most relevant pivot pages and/or the pivot page used to discover it, with each proposed relevant page.

In order to determine relevance scores, the system crawls the extended Web covered by said glassbox around a set of categories called support groups specific to said glassbox[146], and with respect to each support group, determines relevance scores for pages that are co-cited with pages that characterise this support group[147].

[146]When the user creates a new glassbox by deriving it from an existing glassbox (upstream glassbox), support groups of the existing glassbox are automatically derived in a new glassbox. The user can then modify them. The relevance score calculation algorithm (see "Absolute/relative distillation" section) is incremental in the sense that it can reuse the upstream glassbox calculation results and refine them as a function of differences originating from said modifications.
[147]This is the "backward relative distillation" algorithm described later. Other methods are also used, particularly symmetric methods that consist of measuring the extent to which a candidate page cites pages cited by pages in the support group (this is the "forward distillation algorithm").

For each page displayed on the screen, support groups for which it has a good score (considering its navigation context) are taken into consideration and links to pages with the best relevance scores for these support groups are presented to the user as "relevant links". This is done as already described for the first system, but for a glassbox.

For each page that might be suggested, a score is calculated that depends on the current page and the context, the pages that had obtained the best global scores being selected. Then for each page, the support group(s) is (are) selected as a function of the relevance of the selected page to them. The user can reject a result for a support group, in which it will no longer be proposed in the future (while maintaining the possibility of cancelling this operation by editing support groups).

Relevant links are presented to the user following the glassbox derivation chain, in order from the downstream side to the upstream side. In other words, links to relevant pages saved in a glassbox are given preference when they are further downstream[148].

[148]In other words, this list of relevant links begins with the modified versions located in the user's glassbox (grouped by support element), then those located in the glassbox inherited by the user's version (still grouped according to the support groups) until reaching the public Web pages that are presented last.

Each support group may be presented to the user as a link to a support element located in a page of a site (for example in a site belonging to the owner of the glassbox).

Taking Account of the Context

A navigation context relative to a glassbox is defined by an association of a score with each support group of the glassbox as described above in the framework of the first system, but relative to a glassbox. Ditto for the edit context.

Delegation to Another Server in Peer-to-Peer In the case in which the glassbox (and upstream side glassboxes) do not have a support group for which the current page has a good score, and therefore no relevant link has been proposed to the user, the system delegates the supply of relevant links to another glassbox. This is done using a peer-to-peer approach[149]

[149]Each glassbox is managed by a glassbox server (as described later). Each glassbox server knows a number of other glassbox servers.

Each server can say whether or not it is capable of suggesting relevant links for a page (without actually giving them).

When such a situation (failure to supply relevant link) occurs, the server will firstly ask if it hosts another glassbox capable of proposing relevant links. If this is not the case, it will send the request to other servers that it knows, that can do the same thing themselves, until a server capable of managing the request is found, or until the entire network is covered without finding any response. Each server replies to these requests, to the server that sends it (rather than to the initial server directly), so as to leave a trace in the caches (described below) of intermediate servers.

A server may also have a list of servers that it refuses to propose in response to a request, and that it will therefore remove from the results that it obtained.

The server can store the servers that were capable of providing relevant links for a particular page in a cache, in order to avoid useless traffic. This cache has a maximum capacity and when it is saturated, the page that has been in the cache for a sufficiently long time and that has been least requested recently will be removed from the cache.

If the system (i.e. a glassbox server) observes that a page to which no glassbox in the system can provide relevant links is requested frequently, he can suggest that glassbox owners (with the right to add support groups to the glassbox) should create a new support group for this page.

Associative Memory

The relevant links described above can actually be links to a modified version of relevant pages (located in the current glassbox or an upstream glassbox). The user can thus take advantage of their enrichments.

Furthermore, the most relevant annotations are presented directly (in extenso) with the page[150] displayed on the screen.

[150](original or derived)

Thus, by visiting a page such as a Web page, the user can find an annotation such as a link[151] (or a text or audiovisual message that he had saved, or that was saved in an upstream glassbox and that is relevant to the page that he is currently visiting.

[151](to an information resource such as a file, a word processing document or spreadsheet)

The glassbox thus provides a means of accessing resources simply by putting itself in their context. When the user browses on the web and approaches the context of the resource for which he is searching, his glassbox proposes it to him spontaneously. His glassbox is thus an "associative memory".

Inheritance of Relevance Relationships

When a view of a source page is created in a destination page (a page means any data resource displayed independently by the user, such as a word processing document, a file or even a database), relevance scores (with respect to categories or support groups) of the source are inherited by the destination page. Thus, the associative memory is extended to the user's "private" data resources: for example when the user visits a document in which there is a view of a public web page[152], the system spontaneously presents (when applicable) annotations that are relevant to this public web page[153], to him. The method and the mechanism have already been described above in the framework of the first system (incoming virtual links), but they are now applicable to a glassbox.

[152](or a view of an element of another document in which there is a view of a public Web page, etc.)
[153]Remember that the system automatically associates relevant scores to Web pages, by analysing links directed to these pages, and the links that they contain. Thus the system can determine relevant annotations, etc.

Communication Through an Upstream Glassbox

Each derived glassbox implicitly contains all pages located in the glassbox from which it is derived, and also its own pages[154].

[154]More precisely, glassboxes contain page references and not the pages themselves with their contents. It is said that a glassbox "contains" pages to facilitate readings.

Pages added in a glassbox (downstream glassbox) that is derived from another glassbox (upstream glassbox) may be suggested (by the user of the downstream glassbox[155]) to the upstream glassbox. Pages that are accepted (by the upstream glassbox manager) will then be included in it and are therefore made available to users of all downstream glassboxes[156].

[155](or optionally, these pages can be suggested automatically)
[156]Note that when a page (suggested through a downstream glassbox) is accepted in an upstream glassbox, it forms part of it and no longer forms part of the downstream glassbox through which it was suggested.

Figure 46:
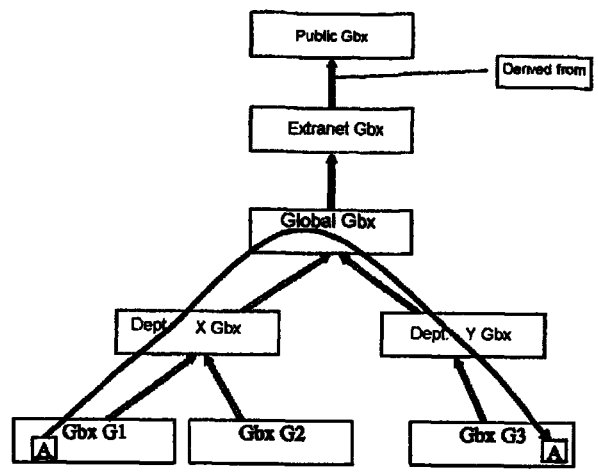
FIG. 46 shows a scenario according where a derived page is suggested upstream and then downstream.

As in the example presented diagrammatically in FIG. 46, in a company there will typically be:
  a first glassbox (Public Gbx) in which public derived pages are stored,
  a glassbox (Extranet Gbx) that is derived from it to contain pages to which some customers and partners of the company can access (access on the web restricted by password or other authentication means),
  a glassbox (Global Gbx) to hold pages accessible on the company's Intranet,
  a glassbox (Dept X Gbx; Dept Y Gbx) by company department or by theme and containing derived pages intended for employees in the Department in question, or persons affected by the theme in question,
  finally one glassbox per individual (Gbx G1, Gbx G2, Gbx G3).[157]

[157]It should be emphasized that pages contained in the furthest upstream glassbox (Public Gbx) can be presented by all glassboxes downstream from it (particularly by all individual glassboxes: Gbx G1, Gbx G2, Gbx G3), while the reverse is not true: for example a page contained in the glassbox of the company's global intranet (Global Gbx) will not be presented to customers (through Extranet Gbx) or to the public (through Public Gbx).

FIG. 46 presents the scenario according to which a new derived page (in fact an annotation A) created at an individual glassbox (Gbx G1) is suggested to the upstream side (Dept X Gbx, then Global Gbx) and is then automatically presented to another user through his own individual glassbox on the downstream side (Gbx G3).

Obviously, as mentioned in the "Relevant links" section, the user can refuse the annotation or the derived page suggested to him by a glassbox. In this case, it will no longer be suggested to him. If a large number of users refuse it (through other glassboxes in the system), it will not be presented to users who configured their glassbox to filter suggestions that were rejected by more than a given number of persons during a given time period.

A user can also derive his glassbox from several upstream glassboxes.[158] Thus, the user can then receive suggestions from multiple sources, and even from multiple servers.

[158]More precisely, the glassbox is derived from a single glassbox but it can import the content of other glassboxes.

Data Manipulations

The Approach

Data structures were designed to enable the system to efficiently replace a current page by a relevant derived page (derived from this current page), or to replace a "view" of a source page by a view of a relevant derived page (derived from this source) and to supply links to (and annotations from) other relevant pages. Thus, the granularity of manipulations is designed more for pages than for elements contained in the pages. In particular, incoming links (and virtual incoming links—as described below) are considered at the level of pages and not at the level of elements.

The Derived Page is Defined by its Differences from its Original Page

The structure (for example in XML) of a page derived from an original page is not a copy of an original page, but only contains differences between the derived page and the original page. In order to present the derived page to the user, the system applies differences of the derived page onto the data on the original page.

Figure 47:
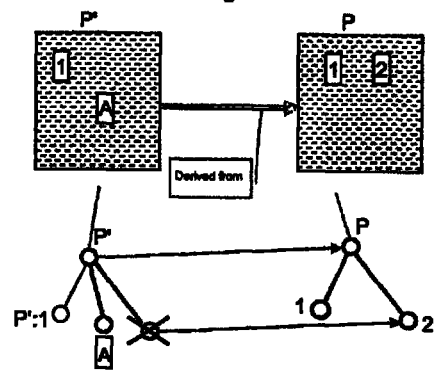

FIG. 47 diagrammatically illustrates a page (P') derived from an original page (P) and their XML data structure[159]. In this example, the only differences between the derived page and the original page are that the derived page also has an annotation (A) and that it has deleted the second element (2) (it is said to be "rejected".

[159]Legend: nodes in thin lines (in this case the element 1 in page P') represent data that do not appear in XML data (saved on disk) but that do implicitly exist in the structure (i.e. they can be derived (in other words automatically recreated) from explicit data).

Note that if another element is added in P in the future, it will be automatically reflected in P'. Since P' is defined by its differences from P, any element of P that is not rejected in P' implicitly forms part of P'. Thus, P' remains continuously up to date with respect to its source P.

Link and Guided Visit

The system is capable of creating a link on a page that prompts the user to make a "guided visit" of an original target page, in other words a link to a page derived from the original target page (this derived page may itself contain links to derived pages and so on).

When the user clicks on this link, the target is replaced by a page[160] that further specialises the guided visit and/or adds annotations.

[160](derived from said page derived from the original target page)

We will now illustrate page presentation cases after a link is clicked. It will be seen later that the data structure is actually identical to the case of views presented in the following section (since the choice of placing a view or placing a link is usually implemented in the code by transforming XML data into a user presentation code, in other words into HTML, scripts, etc.).

Presentation of a Link

Figure 48:
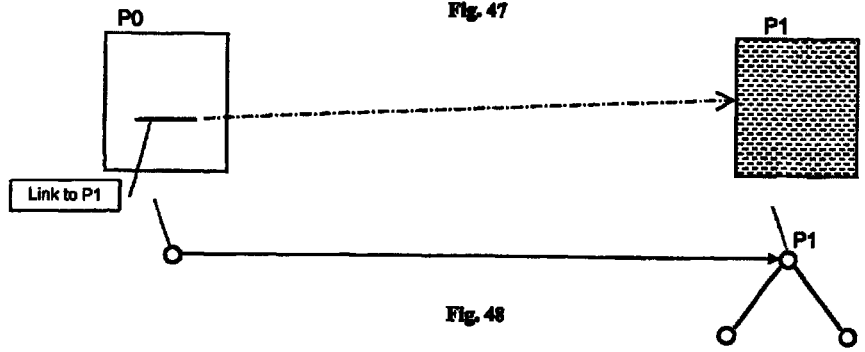

FIG. 48 illustrates an example in which there is a link to a page P1, on page P0.

Figure 49:
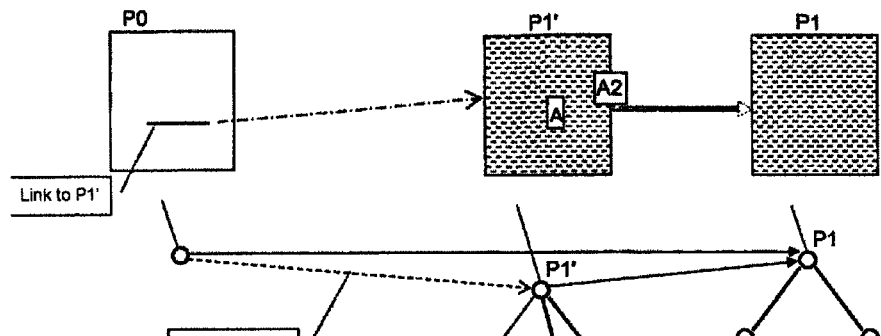

FIG. 49 illustrates an example in which, when the user visits page P0 through a glassbox and clicks on the link to P1 located on this page, the system presents a page (P1') derived from P1 to him, located in this glassbox[161]. Page P1' has an annotation (A). Furthermore, an annotation[162] (A2) relevant to P1' (considering the navigation context) or associated[163] with P1 and relevant to the navigation context, is presented with P1.[164]

[161](or in an upstream glassbox—which will be understood in the following)
[162] (or several)
[163]"Associated with" means "contained in another page derived from"
[164]In the illustration of the XML structure, the element to the right of A is specifically shown (thick line) to act as a guide. This is described in the chapter dealing with algorithms.

Guided Visit

Figure 50:
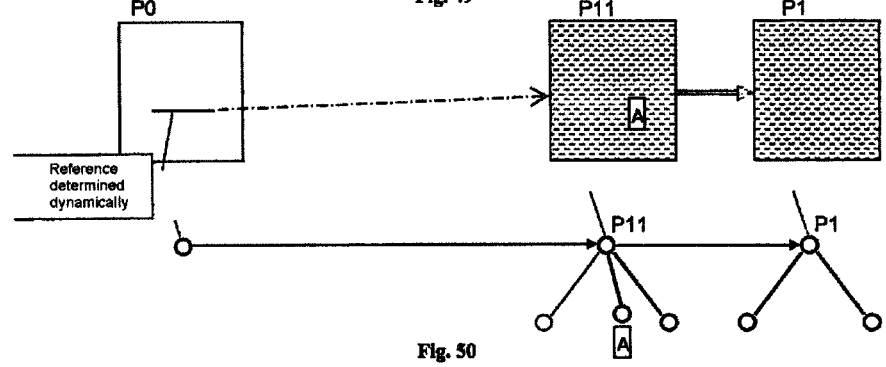

FIG. 50 illustrates an example in which page P0 contains a link to a modified version (P11) of a page P1. An annotation (A) is located in the content of the derived page P11.

Figure 51:
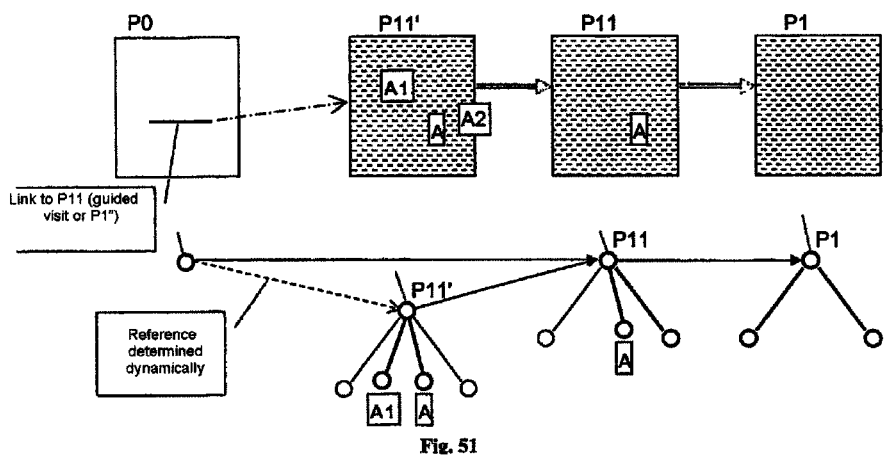

FIG. 51 illustrates an example according to which, when the user visits page P0 through the glassbox or clicks on the link to P11, the system presents a page (P11') derived from P11 and located in this glassbox. Observe that in this example, P11' has an additional annotation A1.

Furthermore, an annotation[165] (A2) relevant to P11' (considering the navigation context) or associated with P11 and relevant to the navigation context, is presented with P11.

[165](or several).

View

When editing a page (P0), the system can be used to display a view of a source page (P1) (or an element of a source page) within this page (P0). When the user visits the modified page (P0) through a glassbox, the system will replace this view by the view of the most relevant page (P1') derived from the source page (P1)—if there is one in this glassbox.

The source page (P1) presented through the view may be modified directly through this view (in other words in P0). This modification will lead to a page (P11) derived from the source page (P1), particularly in the case in which the user does not have the right to modify the source page (P1). When the user visits page P0 through a glassbox, the system replaces this view (of P11) by a view of the most relevant page (P11') derived from the modified source page (P11)—if there is one in this glassbox.

Furthermore, the system presents relevant annotations (A2) in relation to this view (of P1' or P11').

We will now use examples to illustrate view presentation cases. The data structure is shown diagrammatically in the form of parts of XML trees and references between XML nodes.

View Presentation Case

FIG. 52 illustrates a page P0 in which there is a view of a page P1. This view is provided with a link (e.g. entitled "For further information") to its source. The dashed line represents the link (hypertext).[166]

[166]The user interface is used to create such a view by dragging-dropping a graphic object representing the source page (P1) to/into the destination page (P0). Later in this description (in the "view of an element of the page" section), we will also describe the drag-drop operation of an element of the source page) instead of dragging-dropping the entire page).

FIG. 53 illustrates an example according to which, when the user visits page P0 through a glassbox, the system replaces the view of P1 by the view of a page (P1') derived from P1 and located in this glassbox.

Consequently, the "For further information" hypertext link changes target and points to P1'.

An annotation[167] (A2) relevant to P1' considering the navigation context, or associated with P1 or even with P1' (and which is relevant to the navigation context) is presented with this view.

[167] (or several)

Modified View Presentation Case

FIG. 54 illustrate an example according to which page P0 contains a modified view of a page P1.[168] It is assumed here that either the user does not have the right to modify P1 (for example P1 may be an external web page) and in this case a derived page (P11) is automatically created, or he can modify but instead decides to create a derived page (P11) and modify this derived page instead (this could be the default option).[169] The system presents the view of the derived page (P11) in P0.

[168]This example represents the typical case of an extract from a page for which the content of the original page had to be remodeled to fit into a restricted space.
[169]The system is capable of modifying the view directly in the page (P0) in which it is located, and the source (P1 or P11) is modified accordingly and transparently.

An annotation (A) is located in the content of the derived page P11 and is thus presented in the view in P0.

The view has a "For further information" link directed to its source P11.

Figure 55:
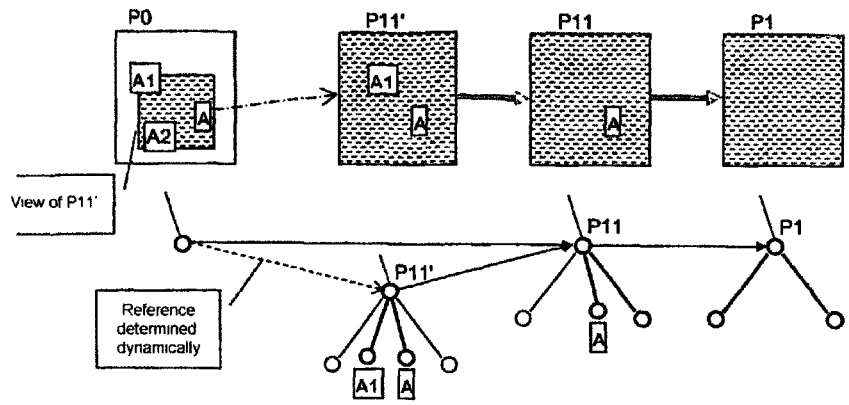

FIG. 55 illustrates an example according to which when the user visits page P0 through the glassbox, the system displays the view of a page (P11') derived from P11 and located in this glassbox. Observe that in this example, P11' has an additional annotation A1 that is thus reflected in the view in P0. The view has a "For further information" link now directed to its source P11'.

Furthermore, an annotation (A2) relevant to P11' considering the navigation context, or associated with P11 or even with P11' (and that is relevant to the navigation context) is presented with this view.

Virtual Incoming Links

We have mentioned above that the system determines the relevance score of each page with respect to each glassbox support group. Different scores may be calculated, particularly including the relevance score calculated by an analysis of co-citations (that indicates the extent to which the page is co-cited with the pages that characterise the support group in question). In this case, the calculations are made by counting links directed to the page, that are called "incoming links" to the page.

For relevance calculations, each derived page inherits incoming links from the original page[170].

[170]In other words, each derived page inherits links located on other pages pointing to the page from which it was derived.

Furthermore, each page inherits incoming links from pages for which it has a view.

These inherited links are called "virtual links" or "virtual incoming links".

Each page also inherits virtual links from the page from which it is derived and virtual links of the pages of which it has a view.

Figure 56:
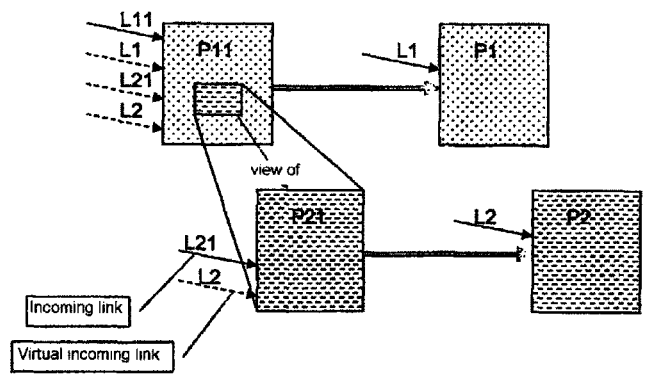
FIGS. 56 to 68 illustrate different cases with inheritance of incoming links.

FIG. 56 diagrammatically illustrates the case of a page (P11) derived from a page (P1) and with a view of a page (P21) derived from another page (P2). It can be seen that P21 inherits the incoming link (L2) of P2 and that P11 inherits the incoming links (L1) of P1 and (L21) of P21 and the virtual link (L2) of P21.

Optionally (particularly in the case of annotations), pages also inherit incoming links (and virtual links) of pages to which they contain a link.

Thus, the fact of inheriting incoming links allows derived pages to have a score with respect to glassbox support groups so that they can be selected to be displayed instead of the current page.

In the same way as the modifications to derived pages propagate (automatically) in the upstream to downstream direction and (if suggested) in the downstream to upstream direction for derivations, the virtual incoming links (inherited through derivations and views) propagate from one derivation to the next.

View of an Element of a Page

Figure 57:
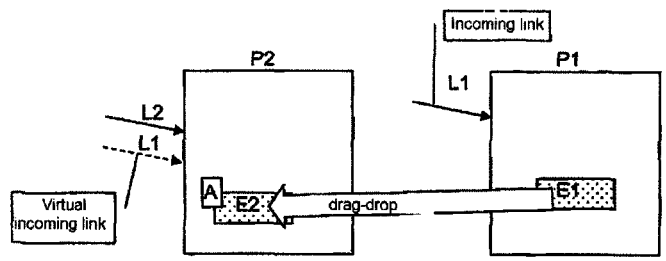

FIG. 57 diagrammatically illustrates a drag-drop operation of an arbitrary element (E1) of a source page (P1) such as a paragraph or an image located in a word processing document, so as to reproduce it in a destination page (P2)[171].

[171]Note that the source page and the destination page may be the same page, and the drag-drop operation may take place within the same page.

Figure 58:
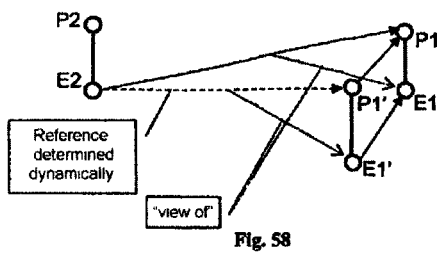

When a final user visits the destination page (P2), the system replaces this view by a view of a page (P1') derived from the source page (P1) (this is not shown in FIG. 57, but is shown in FIG. 58).

The system also presents annotations (A) relevant to the source page (P1), or associated with P1 or with P1' (and that are relevant to the navigation context), in relation to this view (e.g. adjacent to the view).

FIG. 58 diagrammatically illustrates the XML structure of the example described above. Node P1 contains element E1. Element E2 (in P2) represents the view in question. Since element E1 is targeted by the view and not the entire page P1, although E2 points to P1[172], it also has a "view of" attribute that is a reference to element E1.

[172]According to this approach, a view points to a page such that the system can replace the targeted page by a derived page and can also determine pages relevant to the targeted page. Nevertheless, the view has an attribute indicating which is the source element (of which the user took a view by the drag-drop operation).

The system selects a derived page P1' in the glassbox (as always, if there are several pages it selects the page most relevant to the navigation context) that contains an element E1' referencing E1 so as to replace the view of P1 by a view of P1', with the "view of" attribute pointing to the element E1'.

Figure 59:
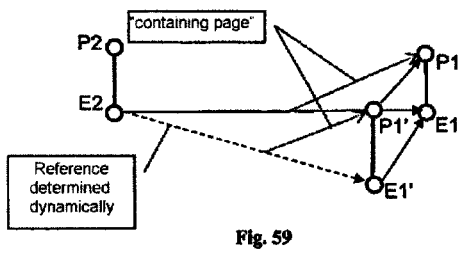

FIG. 59 presents a variant[173] of this approach, consisting of using a "containing page" attribute instead of the "view of" attribute. The reference to the element (rather than to the page) will be placed, and the "containing page" attribute is used to specify the containing page[174]. Therefore this variant is equivalent.

[173]This variant is used in the resolver described later in the chapter presenting the algorithms used. However, the "view of" approach will be used in the following figures in this chapter.
[174](that will be used to calculate virtual incoming links, etc.)

FIG. 57 illustrates the fact that the incoming links (L1) of the page (P1) containing the source element (E1) are inherited by the destination page (P2).

Figure 60:
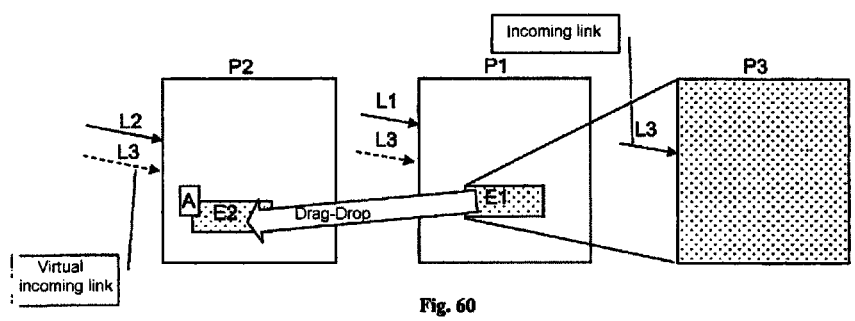

FIG. 60 illustrates the fact that in the case in which the element (E1) of which a view is inserted in the destination page (P2) is itself a view of another page (L3) (or an element of another page), the incoming links (L3) of said other page are inherited by the destination page.

Thus, the incoming link L1 of page P1 is not inherited by P2. This avoids inheriting incoming links that do not correspond to the reused content.

Modified View of an Element of a Page

Figure 61:
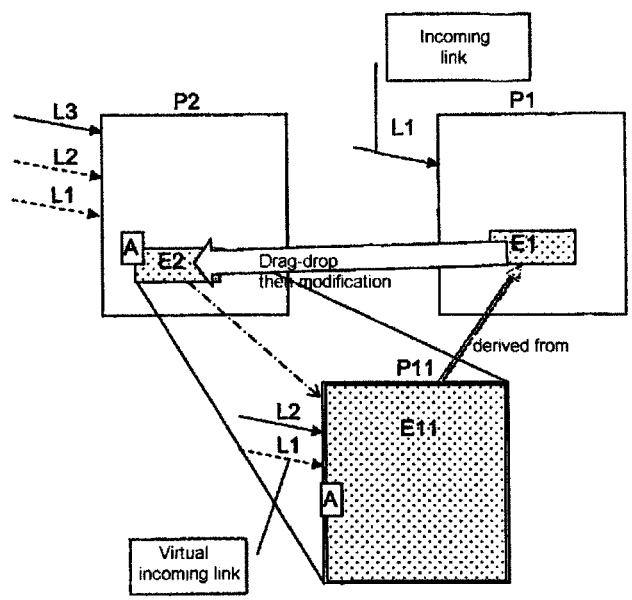

FIG. 61 illustrates the option according to which, when the user modifies the view inserted in the destination page P2, the system creates[175] a new[176] page (P11) derived from the source page (P1), and places a link (shown in dashed lines in FIG. 61) to this derived page (P11) in the destination page (P2), this link being placed at the level of the deposited element (E2)[177].

[175](in the current glassbox)
[176]If the current glassbox already contains a page derived from said source page to which the user has a write access permission, he can modify it directly through the view that he created; the system will then not create a new derived page.
[177](or in relation to)

As already described, the new derived page (P11) inherits incoming links from the source page (P1). When a final user visits the destination page (P2), by default[178] the system replaces the view (E2) by a view of the page (P11') derived from said new derived page (P11). Furthermore, the system presents annotations (A) related to this view relevant to the derived page (P11') (taking account of the navigation context) or annotations associated[179] with the source page (P1) or with said new derived page P11 and which, obviously, are relevant to the navigation context[180].

Figure 62:
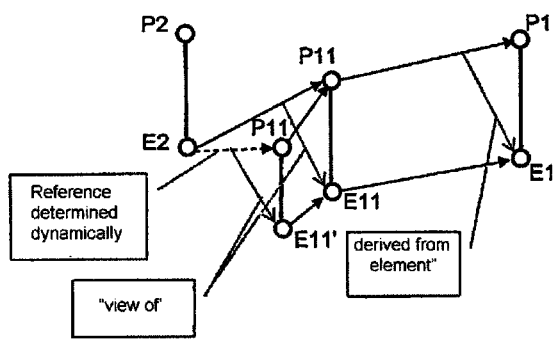

[178](but the user can change the default options; see "user interface" section)
[179](in other words contained in other pages derived from)
[180]Obviously, these actions take place when these pages or annotations exist in the glassbox FIG. 62 diagrammatically illustrates the XML structure of the example described above. Node P1 (representing page P1) contains the element E1. Node P11 (representing page P11) contains the element E11 that represents the modified content of the view and that has a reference to E1. Element E2 represents the view located in the destination page P2 and has a reference to the derived page P11 and a "view of"[181] attribute pointing to the target element E11. When a final user visits the destination page P2, the system replaces the view E2 by a view of a derived page P11', the "view of" attribute then pointing to E11'.

[181](see possible variant mentioned above)

Catalogue Type Application

Figure 63:
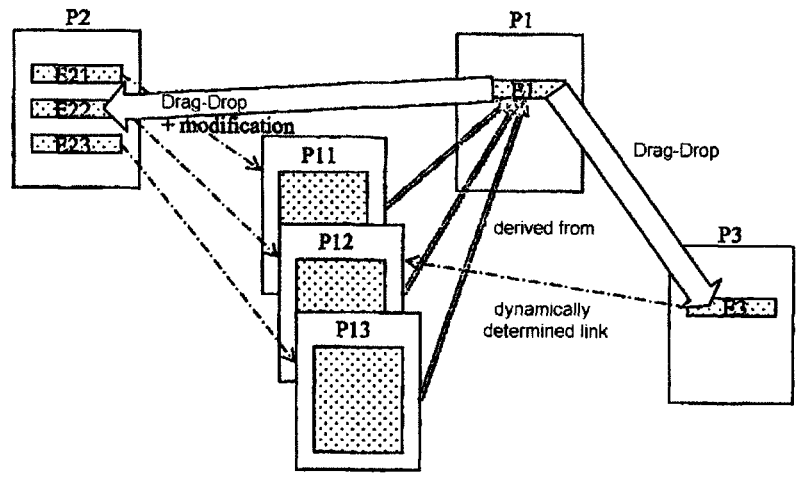

One application of this approach is the creation of a product catalogue. FIG. 63 diagrammatically illustrates creation of a catalogue page (P2). Element E1 (in page P1) is a product model (i.e. a presentation of a default product). The user reproduces and modifies this model in page P2 several times (E21, E22, E23)—and reproduces it once for each product corresponding to this model—and thus constructs the catalogue page (P2). As a result, the user has a derived page (P11, P12, P13) for each product and all these derived pages are accessible through links from page P2 (page P2 thus acts as a product grouper).

Furthermore, the user publishes a page P3 containing a view (unmodified) of this product model (E1).

When the final user visits page P3 through the glassbox in which the catalogue was constructed, or through a glassbox derived from this glassbox, the system presents the product (E21, E22 and E23) that is most relevant to his navigation context[182], to him.

[182](or then the model itself (i.e. presentation of a default product) if the navigation context is empty).

Figure 64:
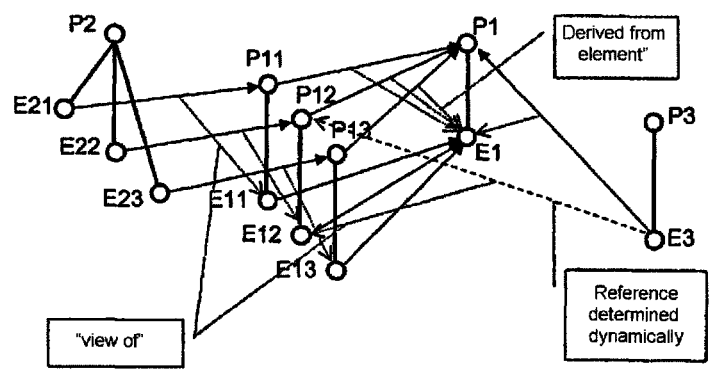

FIG. 64 presents the XML structure of the example in FIG. 63. When the user displays page P3, the system automatically determines the reference to P12 (with the "view from" attribute pointing to E12) as being the most relevant to the navigation context.

View in a View

Figure 65:
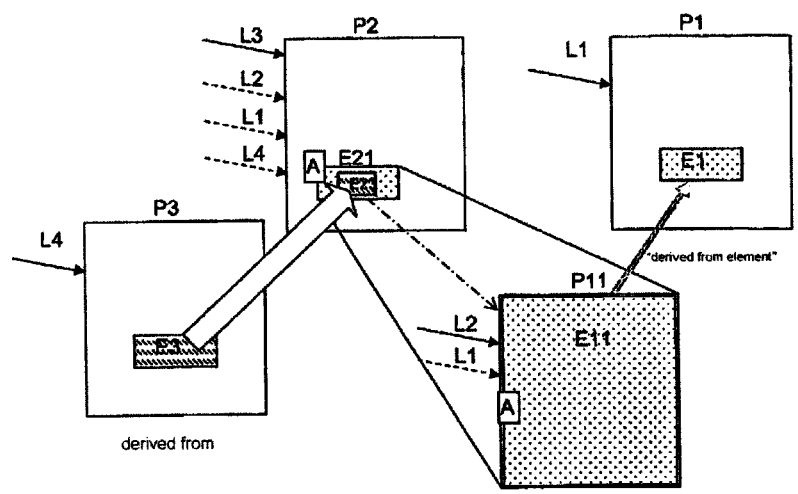

FIG. 65 diagrammatically illustrates the fact that another view can be inserted in a first view (of a page or an element of a page).

Figure 66:
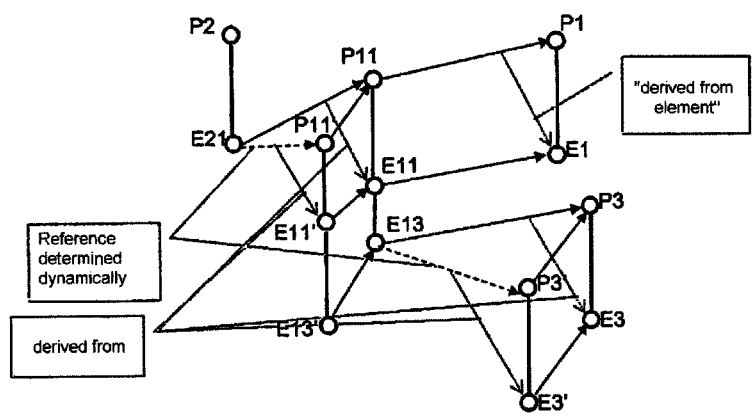

FIG. 66 diagrammatically illustrates the XML structure of the example described above. Note that the new inserted element (E23) actually appears (E13) in the derived page (P11)[183]. When the system replaces the derived page P11 by a page (P11') derived from the page P11 at the time of the display, it also replaces view E13 (and indirectly E23, which cannot be seen in the figure), by the corresponding view of an element (E3') located in a page (P3') derived from the page (P3) containing the source element (E3).

[183](and it is automatically reflected in E21, which cannot be seen in the figure)

Modified View in a View

Figure 67:
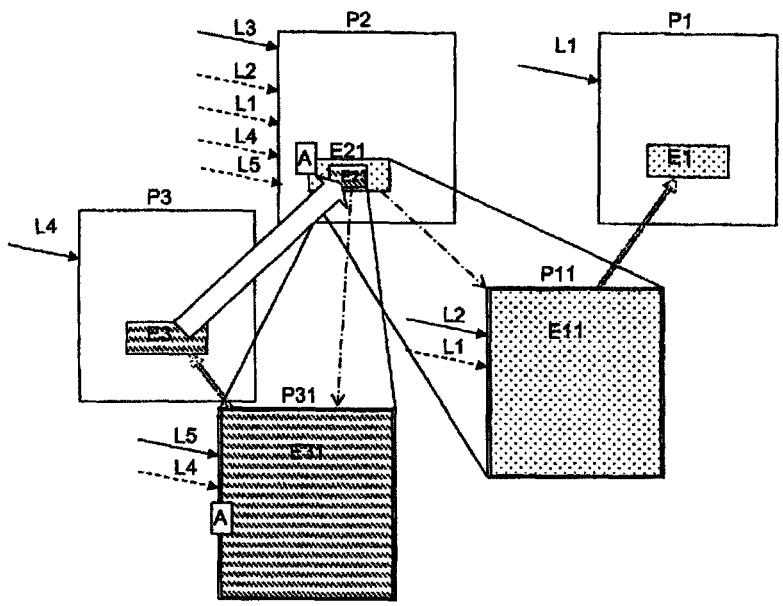

FIG. 67 diagrammatically illustrates that a new derived page (P31) is automatically created when a view (E23) inserted in another view (E21) is modified.

Figure 68:
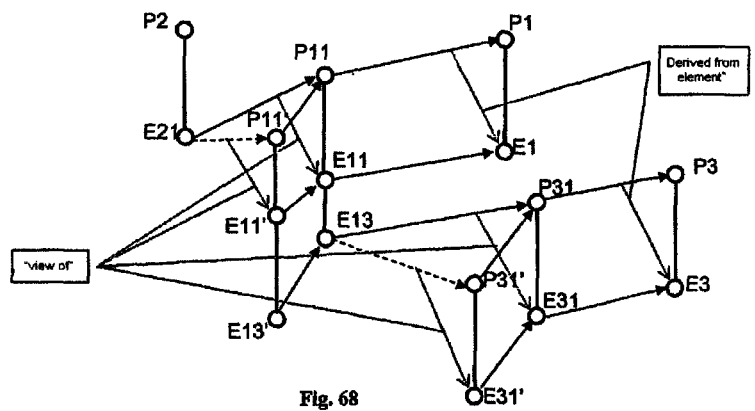

FIG. 68 diagrammatically illustrates the XML structure of the example described above. It can be seen that the content of the view E13 (and indirectly view E23 that is not shown in the figure) is no longer replaced by the content of a page (P3') derived from P3, but rather by the content of a page (P31') derived from P31.

User Interface

Visit a Page

Illustration

Figure 69:
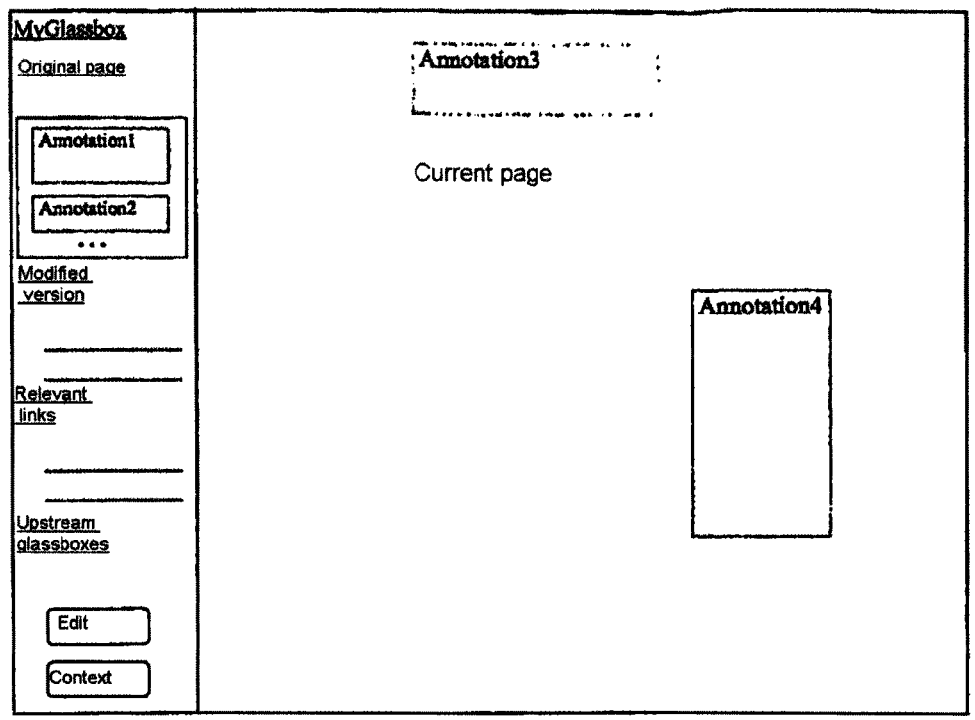
FIG. 69 diagrammatically illustrates an example of a user interface of the system.

FIG. 69 diagrammatically illustrates an example of a user interface. In addition to the displayed web page, the following are displayed:

a "MyGlassbox" link (this is the name given by the user to his glassbox), particularly to display and modify the support groups and other components of the current glassbox;

a link to the original page of the current page (if it is a derived page);

a "Modified versions . . . " link (or button) used to display and reorganize the set of modified versions (derived pages) of the current page, and a few direct links to the pages that are most relevant to the navigation context;

a "Relevant links . . . " link (or button) used to access links to the best pages (as a function of the navigation context) derived from relevant pages, classified in support groups, and a number of direct links to the best pages (as a function of the navigation context) derived from the most relevant pages;

an "Upstream glassboxes . . . " link, that displays the versions derived from the current page and different links proposed by the glassboxes on the upstream side (presented in the downstream to upstream order);

a button used to edit the displayed page;

and a button used to reinitialise[184] or manipulate the context.

[184](i.e. reinitialise all scores for all support groups)

In addition, and as shown in FIG. 69, annotations (Annotation1, Annotation2, etc.) are presented on the current page and/or adjacent to it, and will be associated with the current page or with relevant pages with a very good score (in relation to the current page and the navigation context).

Connect to a Glassbox

When the user wants to view Web pages through a glassbox and obtain suggestions through it, he logs into this glassbox (by inputting a password).

Display Options for a Page Required by URL of by a Click on a Link by URL

When the user enters the URL of a page directly, the system will present its most relevant modified version (relative to the user's navigation context) to the user.

When the system chooses the most relevant modified version of a page, it will also replace each view contained in it by its most relevant modified version (relative to the user's navigation context).

The system offers a "display original version" option to change this default behaviour globally and to ask that the original page should be displayed. Relevant links will be displayed in all cases.

By Clicking on a Link

If the user clicks on any link (with the left button), the system will display the most relevant modified version of the target page to the user, but there is an option in the context sensitive menu (displayed by a right click) that enables him to display the target page in the normal manner. If the "display original version" option is activated, the behaviour is inverted, the original page is displayed by a left click and the context sensitive menu can show up a modified version.

Suggestions for Relevant Links

For each visited Web page (current page), the system also presents a set of relevant links, adjacent to the page.

By default[185], relevant links are selected as follows. For each page that can be suggested, a score is calculated dependent on the current page and the navigation context. Pages that obtained the best global scores are selected. Then, for each of these pages, the system chooses the support group(s) with which it will be presented, as a function of its relevance with respect to this support group. The system firstly presents (links to) relevant derived pages located in the user's glassbox (grouped by support group), then those located in the glassbox inherited by the user's glassbox (still grouped according to the user's support groups) until reaching the web pages presented last. Each relevant link is presented with links to the best pivot pages on which it was found. It is also presented with a link to the original page, if the viewed page is a modified version.

[185] The user can change the method for selection and presentation of relevant links.

The user can reject a result for a support group for which it will no longer be proposed in the future (but this operation can always be cancelled, by editing support groups).

Modifying a Page Using a Tool Internal to the System

The interface offers a button to enter edit displayed page mode, and a means of displaying a support group editor.

In edit mode, the system provides means of adding elements into a page, and modifying, deleting or moving them.

There is a button for performing these various operations adjacent to each element that can be modified, moved or deleted.

A button is placed at each location at which a new element can be stored, so as to add the element.

An element editor is opened when the user wants to either modify or create an element. It is like a text editor, and is used to add images, etc. The user can also modify the XML code directly.

The system will only store differences from the original page, which means that when the user looks at his modified page again, then if the original page has changed in the meantime, his changes will be applied on the current original page.

Modifying a Page Using an External Tool

The following describes a scenario for modifying a current page in the case in which an extension to the browser such as a toolbar is available on the client station. We then present a scenario in which no extension is installed or used.

Case of an Extension Installed on the Browser

1. The user visits a page on an arbitrary site http://www-.somewebsite.com/somewebpage[186]

[186] It is assumed herein that in order to obtain a derived version of the requested page, the user must ask for it explicitly, for example by clicking on a button named "derived page", included in the browser extension. In this case, in the next step, he must either ask to edit the derived page rather than the original page (and the remainder of the method remains unchanged except that it is applied to the derived page instead of the requested page), or ask to see the original page and then perform all the other steps. As a variant, the system can directly present a relevant derived version that the user also wants to modify, as a variant.

2. The user would like to make a modified version of it; he does this by clicking on the "Edit" button that forms part of the extension to his browser. The browser extension will automatically provide the following request (to the "someglassbox.com" server managing the user's current glassbox: http://someglassboxserver.com/?glassbox=myglassbox&url=http://www.somewebsite.com/somewebpage[187]

[187] In this step, the system can optionally present the user with a relevant derived version instead of the required page. Same comments as in the previous note.

3. In response to this request, the someglassboxserver.com glassbox server clones the www.somewebsite.com/somewebpage page and returns the cloned page someglassboxserver.com/page123456 to the user.

4. The user modifies it using his favourite editing tool, and then saves his modified version on the someglassboxserver.com server (for example using the webdav protocol) by using classical means available through the editing tool (for example by pressing on the Ctrl and S keys).

5. The system (someglassboxserver.com) compares the modified version with the version before modification, and thus determines the modifications made by the user (i.e. the differences) and creates a derived version[188] of http://somewebsite.com/somewebpage defined by these differences: http://someglassboxserber.com/?glassbox=myglassbox&page=myvers ion.htm

[188] (that will subsequently be used to replace the page when the user makes the request)

6. The derived version created in the previous step can optionally be returned (in edit mode[189]) to the user for correction and for validation if required[190]—note that by default the system interprets copies of elements as genuine copies and that in this step, the user can transform them into deports/imports (described later) that are kept up to date with respect to their source.

[189] (as described in the previous section)
[190] (before validating, if the user wishes, he can correct the interpretation that the system made of his modifications).

7. In the special case in which the user has a write permission on the http:/www.somewebsite.com/somewebpage page and he would prefer to modify this page directly, the someglassboxserver.com system transmits said derived page defined by these differences to the http://somewebsite.com server that then automatically merges these differences (this is the case of acceptance of a suggestion made in the upstream direction by http://www.somewebsite.com/somewebpage. Said derived page can then be deleted.

8. Else (the user does not have write permission), if http://www.somewebsite.com/somewebpage is capable of receiving suggestions from the downstream and the user can also submit said derived page defined by these differences and a notification (such as an email) will then be sent to the manager of this page to ask to accept or refuse to merge these differences (globally or partially).

Case without an Extension Installed on the Browser

1. The user firstly asks to be able to manipulate his http://someglassboxserver.com/?glassbox=myglassbox glassbox 2. He specifies the http://www.somewebsite.com/somewebpage page that he wants to visit. The request sent to the server automatically becomes http://someglassboxserver.com/?glassbox=myglassbox&url=http://www.somewebsite.com/somewebpage[191]

[191] He could also have given it directly.

Steps 3 to 8 are the same as in the case with extension to the browser (described above). Optionally, the http://www-.someotherwebsite.com/someotherwebpage links contained in the pages thus visited are automatically transformed into http://someglassboxserver.com/?glassbox=myglassbox&url=http://www.someotherwebsite.com/someotherwebpage such that the user does not need to specify the URL of a link in which he is interested in his glassbox[192], and all he needs to do is simply to click on it to access the clone that he can modify.

[192] (http://someglassboxserver.com/?glassbox=my glassbox as described in step 1)

Obviously, many variants or modifications could be made to the different aspects of this invention as described above. Furthermore, those skilled in the art would be able to make use of their general knowledge in the subject to form any appropriate combination of the features or steps that have been described independently of each other in the above.

TABLE OF CONTENTS

Introduction
Transclusion
    State of the art
    Summary of the invention
    Enriched transclusion
    Semantic relationship associated with a transclusion
    Semantic characterisation of objects
        Direct approach
        Indirect approach Manipulation of objects
　Reify a selection
　Presentation of reified selections to the user
　Reification method
　Transclusion by "click & drag"
　　"Click" step
　　"Drag" step
　Modify the result of a transclusion
Search for information
　Explicit search
　Search by score propagation
　　Normalisation
　　Preferred variant
　　　Absolute scores
　　　Global scale
Customisation method
　User profile
　Profile of each object
　Score of an object with respect to the user profile
　Selection of an option as a function of the user profile
Algorithms used for transclusions
　Identifiers
　Transclusions
　Implicit transclusions, internal transclusions
　Equivalence of identifiers
　Sources of an object
　Data present in an object
　Calculation of an object
　Calculation of path priorities
　Determination of objects to be calculated
Pipe network
　Principle of the calculation of relevance scores
　　Numerical example
　Presentation of results to the user
　Navigation context
　User interface
　Document editor
　Network viewer
　Requests
　Context manager
Main components of the system
　The crawler
　　Anti-nepotism
　The piper
　　Special pipes between selections and requests
　Preference for new pages
　　Definitions
　　Construction of reliable regions
　The distiller
　　Authority selection algorithm
　　Optimised relative calculation algorithm
　　　Numerical example
　The request handler
　　Numerical example
　Architecture
　　Extension of know edge of the Web
　　　Network extension algorithm
　　　Network reduction algorithm
　　　Peer to peer delegation
　　Distributed architecture
　Derived resources (first system)
　　Suggestion of another resource
　　　How are relevance scores determined
　　　How are relevance scores of derived resources produced
　　　　Incoming link inheritance mechanism
　　　What are the other resources and how does the system
　　　　select them
　　Replacement of the content of views
　　Taking account of the navigation context
　　Taking account of the edit context
　　Selection of resources for which the content has changed
　　Annotation
　Calculating the relevance score with respect to a support
　　group
　　Homogeneity
　　　Scalar equation
　　　Equation by reasons to like
　　Absolute / relative distillation
　　　Absolute distillation in a given page domain
　　　Relative distillation to a set of pages R
　　　Extension to $R^{+-}$
　Production and maintenance of derived resources
　　Introduction
　　How to identify an element that has to be referenced
　　Differences XML
　　Content of Legacy XML
　　Example of XML structures
　　Manipulation of views in a page
　　Construction of the XML file starting from a modified
　　　HTML version of an existing HTML version
　　　1) Setting up correspondences
　　　2) Detection of structure changes
　　　3) Detection of content changes
　　Propagations in the upstream direction
　　Construction of the XML to be sent to the user
　　　Construction of a node from its definition
　　　List of children of a previously resolved element
　　　Search for an element from its identifier
　　　Search for the parent of an element
　Description of the system implementation
　　Glass box
　　Construction and updates of the corpus
　　Architecture
　　　Corpus, support groups
　　Dependences between entities
　　　Formalism
　　　Dependences
　　Dependences between glassbox servers
　Variant (second system)
　　Associative memory
　　Manipulation of pages
　　Use of derived pages and associative Memory
　　　Web pages may be modified
　　　　Glassbox
　　　　Display the derived page instead of the visited page
　　　　Annotation
　　　　Virtual desktop
　　　　Derived glassbox
　　　　Relevant links
　　　　Taking account of the context
　　　　Delegation to another server in peer-to-peer
　　　　Associative memory
　　　　Inheritance of relevance relationships
　　　　Communication through an upstream glassbox
　　　Data manipulations
　　　　The approach
　　　　The derived page is defined by its differences from its
　　　　　original page
　　　　Link and guided visit
　　　　　Presentation of a link
　　　　　Guided visit
　　　　　View Virtual incoming links
View of an element of a page
Modified view of an element of a page
Catalogue type application
View in a view
Modified view in a view
User interface
  Visit a page
    Illustration
    Connect to a glassbox
    Display options for a page required by URL of by a click on a link By URL
  Suggestions for relevant links
  Modifying a page using a tool internal to the system
  Modifying a page using an external tool
    Case of an extension installed on the browser
    Case without an extension installed on the browser

The invention claimed is:

1. A method for use in a data processing environment comprising processing means, memory means, user input means and display means to produce a current view of a data source from a memorized data source that can vary, each source being in the form of hierarchical structure of data objects, the method comprising the following steps:
determining and storing a reference of the view to the data source,
locally applying by the user input means at least one tool for modifying at least one data object of the data source, to produce a transformed data object,
storing a set of difference data (diff) in the memory means, representing the effect of the modification actions made by the user using the one or more tools, and
generating a current view of the data source from the current version of the data source and said set of difference data, said current view including the current versions of the objects in the data source except that any changes in the smallest source objects encompassing said modifications are not reflected in said current view, whereby local modifications are prioritized over source changes for said smallest source objects.

2. The method according to claim 1, wherein the at least one tool for modifying the representation of the source data object comprises a document editing program.

3. The method according to claim 2, wherein the editing program is able to generate a log of the modifications made to each document, and the storing set of the difference data step is implemented using the log.

4. The method according to claim 1, wherein at least one tool for modifying the representation of the source data object comprises a plurality of modification operators which can be individually chosen by the user.

5. The method according to claim 1, wherein the method is implemented on a source data object itself consisting of a current view generated by a prior use of the same method.

6. The method according to claim 1, wherein the current view is generated within a larger data object containing said view.

7. The method according to claim 6, wherein the larger data object comprises several views and the method is repeated for each of the generated current views.

8. The method according to claim 1, wherein the current view has a reference to the source data object, said reference being associated with a container.

9. The method according to claim 8, wherein the reference consists of a hypertext link.

10. The method according to claim 1, further comprising: determining and storing a relationship between a data object containing said view directly or indirectly, and the source data object.

11. The method according to claim 10, wherein said relationship is a semantic relationship.

12. The method according to claim 1, further comprising: determining and storing a relationship between the view and the source data object.

13. The method according to claim 12, wherein the relationship is a semantic equivalence relationship.

14. The method according to claim 13, further comprising: implementing an inference method based on a plurality of semantic relationships.

15. The method according to claim 1, wherein the source data object is derived from another data object.

16. The method according to claim 1, wherein the reference of the view to the source data object consists of a query (request) in reply to which one or more source data objects are delivered.

17. The method according to claim 16, wherein the query is a request applied to a search engine that delivers the one or more source data objects.

18. The method according to claim 16, wherein the query consists of a group of data objects, and the method comprises a search step of at least one other data object having the best relevance score with respect to said group.

19. The method according to claim 1, further comprising: storing the generated current view, and said set of difference data contains one or more pointers towards one or more data objects for which content and position are contained in the current view.

20. The method according to claim 1, wherein said difference data comprise a difference data item for an object, reflecting a change to an attribute of said object.

21. The method according to claim 20, wherein said attribute is an object name.

22. The method according to claim 20, wherein said difference data comprises a difference data item for an object, reflecting a change to a position of said object.

23. The method according to claim 1, wherein the set of difference data for an object contains modified/non-modified status attributes for each sub-object of said objects.

24. The method according to claim 1, wherein each data object has an object identifier.

25. The method according to claim 24, wherein each object identifier is unique in the data processing environment.

26. The method according to claim 24 or 25, wherein the step to generate a current view refers to a modification identifier.

27. The method according to claim 26, wherein each modification identifier is unique in the data processing environment.

28. The method according to claim 24, wherein each current view has at least one composite identifier comprising a modification identifier and an object identifier, to which the modification by the corresponding set of difference data applies.

29. The method according to claim 26, wherein a current view has an identifier referring to a plurality of modification identifiers and a plurality of object identifiers to which the modifications by the corresponding sets of difference data apply.

30. The method according to claim 24 wherein if an initial source data object is itself to be obtained from application of a set of difference data to an other source data object, then a corresponding composite identifier comprises an object identifier held by said other source data object and a double identifier of sets of difference data.

31. The method as claimed in claim 1, implemented in a network environment for generating a current view of a source data object which is a customized view of said source data object, further comprising:
  loading the source data object as an original data object from a site that supplies said source data object to the user,
  saving a working data object obtained from a copy of the original data object, in a memory,
  using tools to modify the data object, to produce a modified data object from said working data object,
  saving a set of data representative of differences between the original data object or the working data object, and the modified data object, in a memory, as said set of difference data (diff),
  during a subsequent access to the original data object, generating a new modified data object starting from the current version of the original data object and said set of data representing said differences.

32. The method according to claim 31, wherein the working data object comprises a plurality of contents belonging to the original data object and identifiers allocated to the corresponding contents, and the differences represented by said data set are given identifier by identifier.

33. A method implemented in a data processing environment comprising data objects having a hierarchical structure with references to other data objects having a hierarchical structure, and in particular having first contents with at least one reference to a second content such as a link to the second content or such as a transclusion of the second content, for management of such references as a function of the existence of modifications made to the data objects by the user, comprising the following steps:
  the user views a second current content via a reference held by a first content, in a mode enabling modification of said second content,
  when said second content is modified in said mode, a new version of the smallest sub-object in the second content is automatically generated and stored in a set of difference data and said reference is replaced by a reference to this new version, and generating a current view of the data objects from the current version of the data objects and said set of difference data, said current view includes the current versions of the objects except that any changes in the smallest objects encompassing said modifications are not reflected in said current view, whereby local modifications are prioritized over larger hierarchical changes for said smallest objects.

34. The method according to claim 33, wherein said reference is a request such as a request in a standard language, to a database.

35. The method according to claim 33 or 34, wherein said new version of the second content is represented by a structure of markers containing the differences between said new version of the second content and said current second content, so as to present the user with a second content in which said differences have been applied to the current version of the second content.

36. A data processing comprising processing means, memory means, user input means and display means to produce a current view of a data source from a memorized data source that can vary, each source being in the form of hierarchical structure of data objects, said means being configured for:
  determining and memorizing a reference of the view to the data source,
  locally applying by the user input means at least one tool for modifying at least one data object of the data source, to produce a transformed data object,
  storing a set of difference data (diff) in the memory means, representing the effect of the modification actions made by the user using one or more tools, and
  generating a current view of the data source from the current version of the data source and said set of difference data, said current view including the current versions of the objects in the data source except that any changes in the smallest source objects encompassing said modifications are not reflected in said current view, whereby local modifications are prioritized over source changes for said smallest source objects.

* * * * *